United States Patent [19]

Kobayashi et al.

[11] Patent Number: 5,214,983

[45] Date of Patent: Jun. 1, 1993

[54] CONTROLLING DEVICE FOR NON-STAGE TRANSMISSION FOR VEHICLE WITH FAULT DETECTION

[75] Inventors: Akio Kobayashi; Hiroshi Tanaka; Shoji Yamashita, all of Saitama; Yasumasa Fujita; Koichi Hikichi, both of Tokyo; Chiaki Kumagai, Saitama, all of Japan

[73] Assignee: Honda Giken Kogyo Kabushiki Kaisha, Tokyo, Japan

[21] Appl. No.: 823,311

[22] Filed: Jan. 21, 1992

Related U.S. Application Data

[62] Division of Ser. No. 670,252, Mar. 15, 1991, which is a division of Ser. No. 388,021, Jul. 31, 1989, Pat. No. 5,025,685.

[30] Foreign Application Priority Data

| Jul. 29, 1988 | [JP] | Japan | 63-190161 |
| Aug. 12, 1988 | [JP] | Japan | 63-200031 |
| Aug. 30, 1988 | [JP] | Japan | 63-213793 |
| Oct. 25, 1988 | [JP] | Japan | 63-269226 |

[51] Int. Cl.$^5$ ............... B60K 41/18; F16H 63/00
[52] U.S. Cl. .................... 74/866; 74/857; 364/424.1
[58] Field of Search ........... 74/866, 844, 856, 857; 364/424.1; 474/28

[56] References Cited

U.S. PATENT DOCUMENTS

| 3,640,156 | 2/1972 | Mori et al. | 74/866 |
| 3,788,063 | 1/1974 | Kempson et al. | 60/19 |
| 3,886,819 | 6/1975 | Lentz | 74/864 |

(List continued on next page.)

FOREIGN PATENT DOCUMENTS

| 0231059 | 8/1987 | European Pat. Off. |
| 0243004 | 10/1987 | European Pat. Off. |
| 60-98254 | 6/1985 | Japan |
| 60-249759 | 12/1985 | Japan |
| 60-249761 | 12/1985 | Japan |
| 62-216836 | 9/1987 | Japan |
| 62-224770 | 10/1987 | Japan |
| 62-273189 | 11/1987 | Japan |
| 63-53343 | 3/1988 | Japan |
| 63-53344 | 3/1988 | Japan |
| 63-53345 | 3/1988 | Japan |
| 63-53346 | 3/1988 | Japan |

OTHER PUBLICATIONS

U.S. patent application Ser. No. 581,393, filed Sep. 11, 1990 (continuation of Ser. No. 252,860, filed Sep. 30, 1988).

Primary Examiner—Leslie A. Braun
Assistant Examiner—Khoi Q. Ta
Attorney, Agent, or Firm—Lyon & Lyon

[57] ABSTRACT

A controlling device for controlling the transmission ratio of a non-stage transmission in a vehicle. The transmission ratio is controlled according to a forecast output power of the vehicle. The output power is forecast based on an operating condition of the vehicle, such as atmospheric pressure. The control considers various operating parameters. A comparison of a predetermined increases of engine speed or throttle opening with actual ratios of increase of engine speed or throttle opening may be made in controlling the transmission ratio. An uneven road surface is detected and a transmission ratio of the transmission is controlled accordingly to substantially eliminate hunting. An engine speed is controlled so that the engine speed may not exceed a predetermined rotational speed when the transmission gear ratio is fixed. A target engine speed or target transmission ratio is corrected in response to an output signal of a comparison device which compares an actual vehicle velocity with a set vehicle velocity during automatic fixed vehicle velocity running.

4 Claims, 39 Drawing Sheets

U.S. PATENT DOCUMENTS

| | | | |
|---|---|---|---|
| 4,023,442 | 5/1977 | Woods et al. | 74/863 |
| 4,102,131 | 7/1978 | Reynolds | 60/431 |
| 4,158,290 | 6/1979 | Cornell | 60/445 |
| 4,232,572 | 11/1980 | Ross | 74/859 |
| 4,318,312 | 3/1982 | Morimoto et al. | 74/863 |
| 4,335,428 | 6/1982 | Miki et al. | 364/424 |
| 4,515,040 | 5/1985 | Takeuchi et al. | 74/866 |
| 4,541,052 | 9/1985 | McCulloch | 364/431.07 |
| 4,545,265 | 10/1985 | Abo et al. | 74/864 |
| 4,564,906 | 1/1986 | Stephan et al. | 364/424.1 |
| 4,589,302 | 5/1986 | Oda | 74/866 |
| 4,594,666 | 6/1986 | Cornell | 364/424.1 |
| 4,635,508 | 1/1987 | Tatsumi | 74/866 |
| 4,637,279 | 1/1987 | Itoh | 74/866 |
| 4,642,068 | 2/1987 | Osanai | 474/11 |
| 4,649,487 | 3/1987 | Osanai et al. | 74/866 X |
| 4,653,006 | 3/1987 | Osanai | 364/424.1 |
| 4,671,138 | 6/1987 | Nobumoto et al. | 74/862 |
| 4,679,466 | 7/1987 | Kumura et al. | 74/863 |
| 4,693,081 | 9/1987 | Nakamura | 60/448 |
| 4,700,590 | 10/1987 | Omitsu | 74/857 |
| 4,710,879 | 12/1987 | Vahabzadeh | 74/866 X |
| 4,713,764 | 12/1987 | Klatt | 364/424.1 |
| 4,716,791 | 1/1988 | Ohzono | 74/867 |
| 4,739,483 | 4/1988 | Ina et al. | 74/863 |
| 4,745,748 | 5/1988 | Hayashi | 60/489 |
| 4,764,156 | 8/1988 | Ohkumo | 74/866 X |
| 4,771,656 | 9/1988 | Itoh et al. | 74/866 |
| 4,781,022 | 11/1988 | Hayashi | 60/489 |
| 4,793,217 | 12/1988 | Morisawa | 74/866 |
| 4,796,489 | 1/1989 | Nogamatsu et al. | 74/862 |
| 4,804,074 | 2/1989 | Kori | 192/0.044 |
| 4,817,469 | 4/1989 | Shigematsu et al. | 74/866 |
| 4,819,163 | 4/1989 | Shimizu et al. | 364/424.1 |
| 4,823,642 | 4/1989 | Iwaki et al. | 74/863 |
| 4,846,019 | 7/1989 | Kumura | 74/866 |
| 4,893,526 | 1/1990 | Tokoro | 74/866 |
| 4,905,786 | 3/1990 | Miyake et al. | 180/179 |
| 4,933,859 | 6/1990 | Tsuyama et al. | 74/866 X |
| 4,938,101 | 7/1990 | Maki et al. | 74/866 |
| 4,961,315 | 10/1990 | Ishikawa et al. | 74/844 X |
| 4,967,610 | 11/1990 | Sasajima et al. | 74/866 |
| 4,976,169 | 12/1990 | Sasajima et al. | 74/866 |
| 4,976,170 | 12/1990 | Hayashi et al. | 74/866 |
| 4,999,774 | 3/1991 | Tokoro et al. | 74/866 X |
| 5,001,900 | 3/1991 | Sasajima et al. | 364/424.1 X |
| 5,025,685 | 6/1991 | Kobayashi et al. | 74/866 |
| 5,040,114 | 8/1991 | Ishikawa et al. | 364/424.1 |
| 5,069,083 | 12/1991 | Hirano et al. | 74/844 |
| 5,073,859 | 12/1991 | Suzuki | 364/424.1 |
| 5,114,383 | 5/1992 | Hirano et al. | 74/866 X |
| 5,136,495 | 8/1992 | Tokoro | 74/866 X |

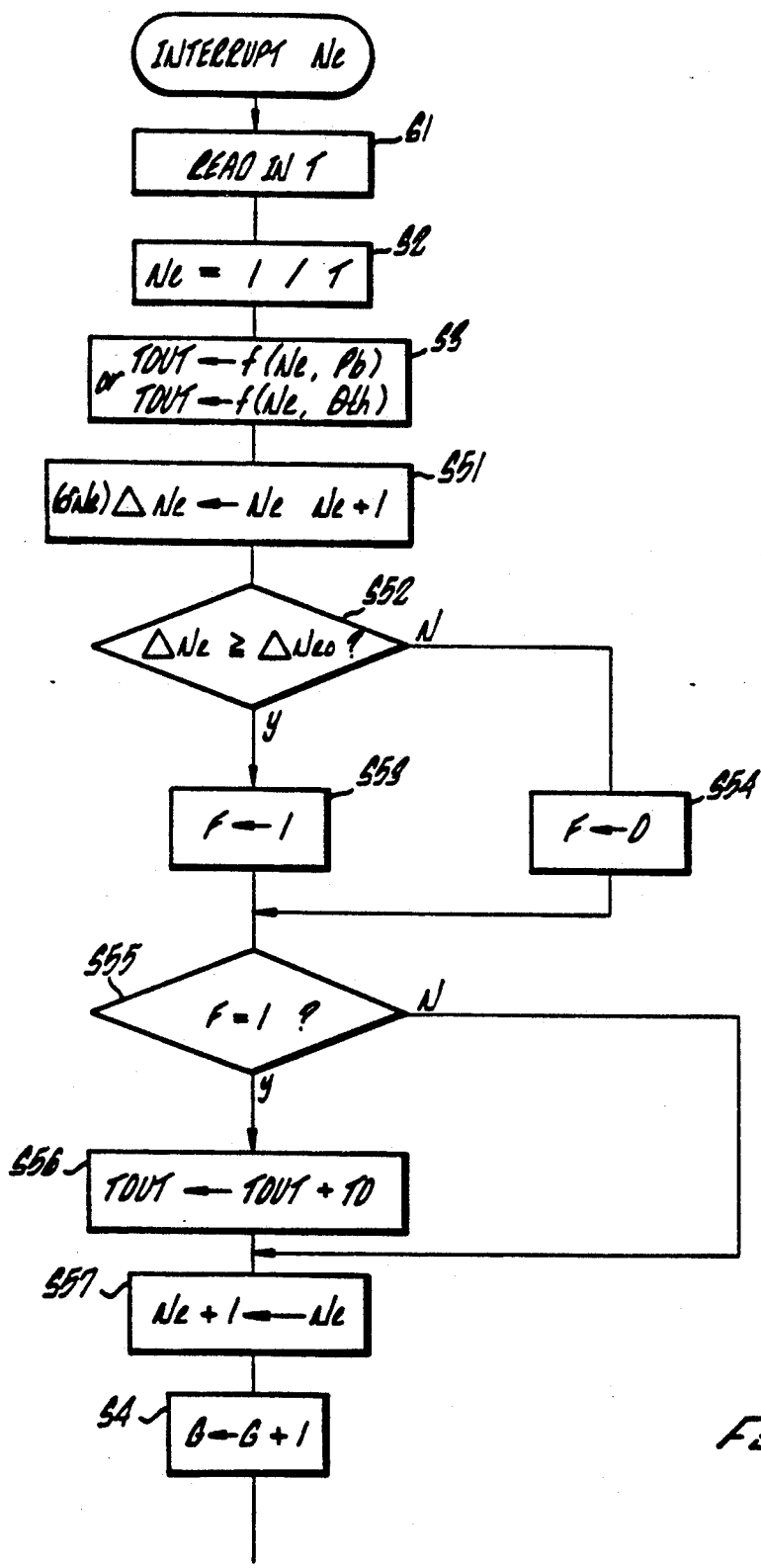
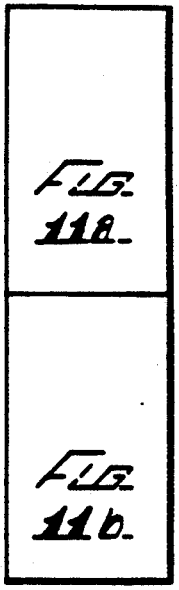
FIG. 11a.

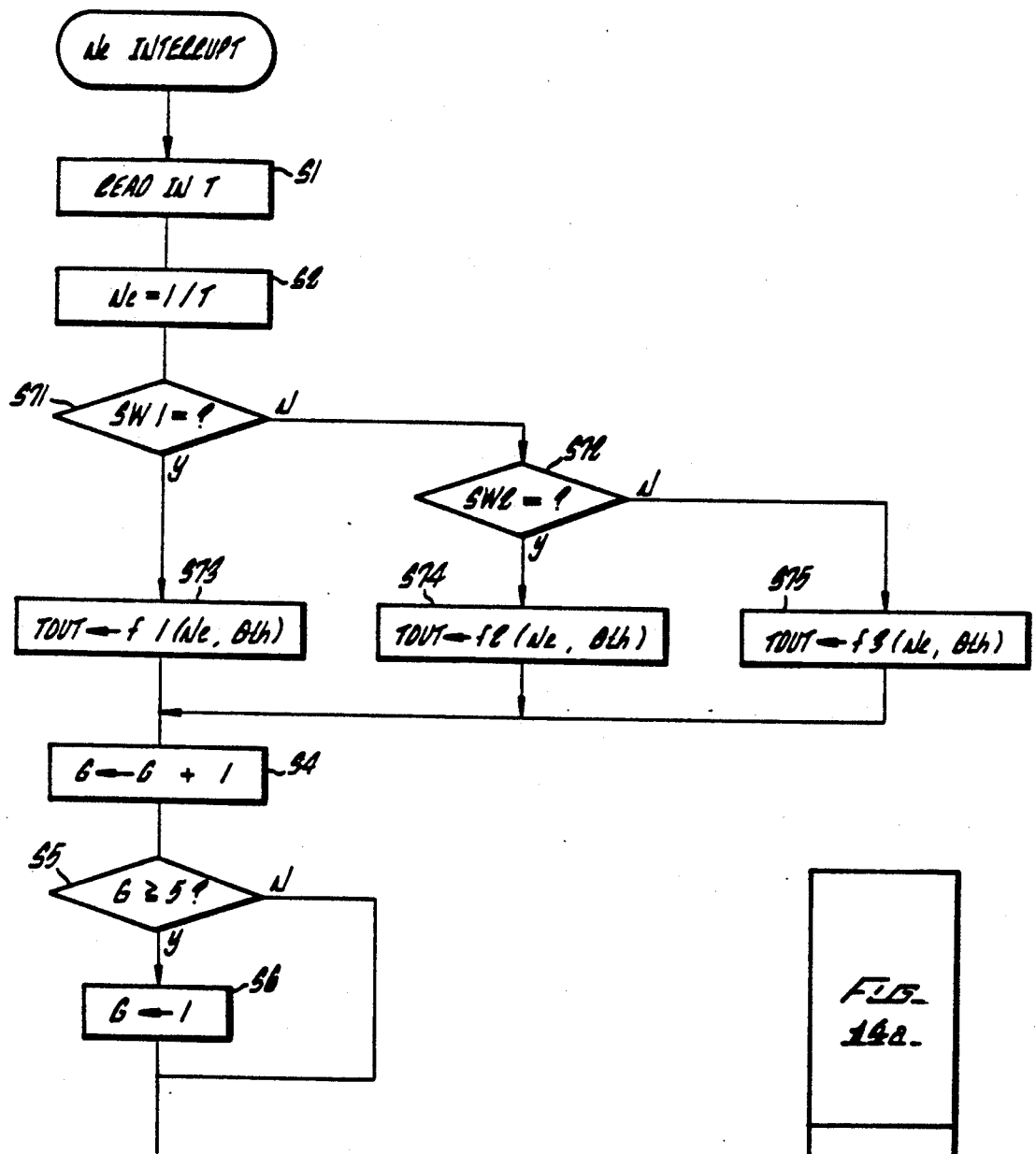
FIG. 14a.
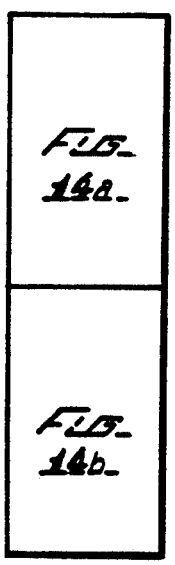
FIG. 14a.
FIG. 14b.

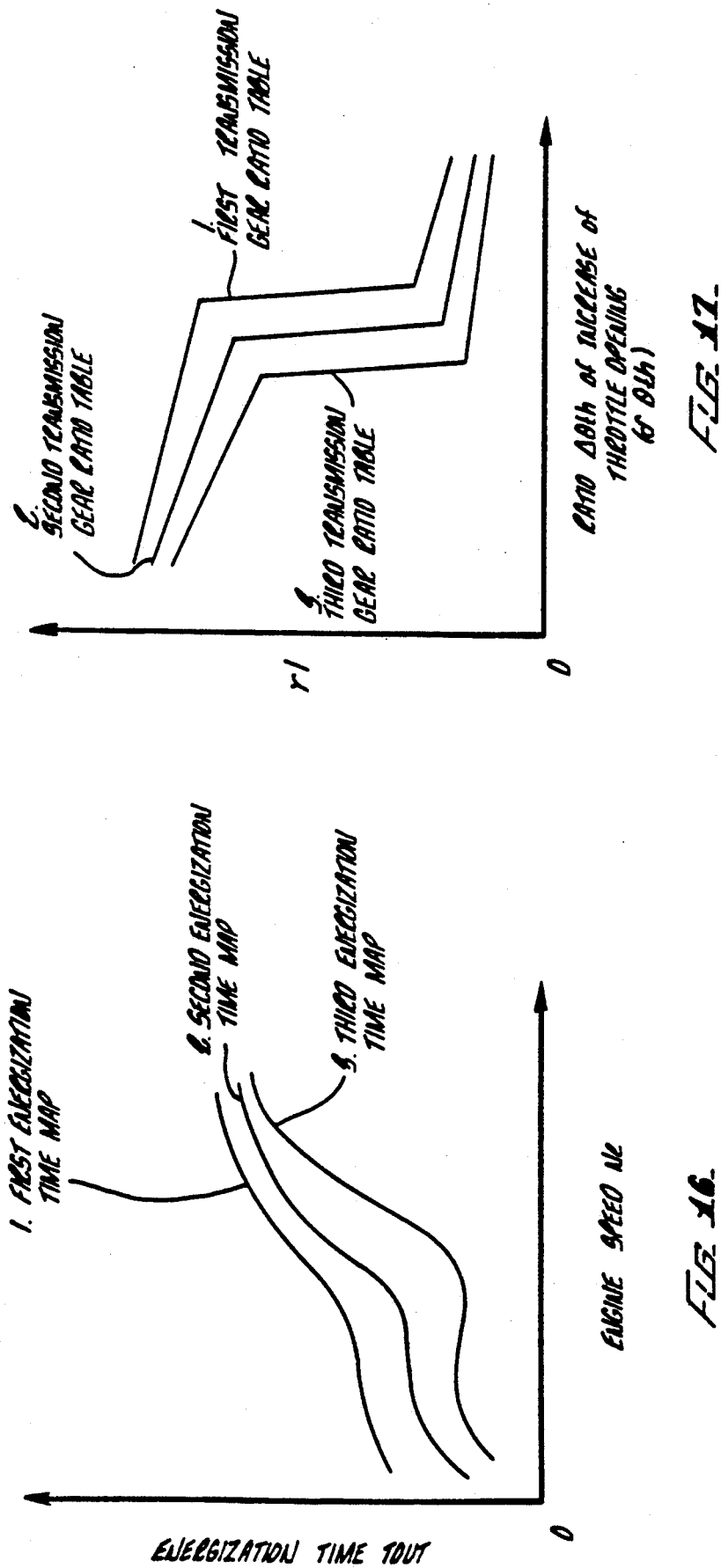

FIG. 27.

| $\Delta\theta th_i$ | $\Delta RA_i$ | $R_i$ |
|---|---|---|
| $\Delta\theta th_1$ | $\Delta RA_1$ | $R_1$ |
| $\Delta\theta th_2$ | $\Delta RA_2$ | $R_2$ |
| $\Delta\theta th_3$ | $\Delta RA_3$ | $R_3$ |
| ⋮ | ⋮ | ⋮ |
| $\Delta\theta th_{n-1}$ | $\Delta RA_{n-1}$ | $R_{n-1}$ |
| $\Delta\theta th_n$ | $\Delta RA_n$ | $R_n$ |

FIG. 31.

| $T_i$ |
|---|
| $T_1$ |
| $T_2$ |
| $T_3$ |
| ⋮ |
| $T_{n-1}$ |
| $T_n$ |

CONTROLLING DEVICE FOR NON-STAGE TRANSMISSION FOR VEHICLE WITH FAULT DETECTION

CROSS-REFERENCE TO RELATED APPLICATIONS

This application is a division of applicant' copending application Ser. No. 07/670,252, filed Mar. 15, 1991, which application is itself a division of applicant's application Ser. No. 388,021, filed Jul. 31, 1989, which application issued as U.S. Pat. No. 5,025,685 on Jun. 25, 1991.

BACKGROUND OF THE INVENTION

1. Field of the Invention

This invention relates to a controlling device for an engine and a controlling device for a non-stage transmission for a vehicle, and more particularly to a controlling device for a non-stage transmission for a vehicle by which the transmission gear ratio control is enabled appropriately in response to a running condition of the vehicle.

This invention further relates to a controlling device for a non-stage transmission for a vehicle by which the vehicle will not suffer from hunting when it runs on an uneven road surface (e.g., a rough road).

This invention relates to an engine controlling device which has a fail-safe function for a fixed transmission gear ratio running condition of a motorcycle, an automobile or the like, which includes a non-stage transmission.

This invention also relates to a vehicle controlling device for a motorcycle, an automobile, or the like, which includes an automatic fixed velocity running means, a non-stage transmission, and a non-stage transmission controlling means.

2. Description of the Prior Art

A non-stage transmission which is carried on an automobile, motor-bicycle, a motorcycle, or the like (hereafter referred to only as a "vehicle") changes the speed of a power of an internal combustion engine at a predetermined transmission gear ratio (ratio) to enable an efficient running of the internal combustion engine, by which it is enabled to attain improvements in fuel cost. Control of such a non-stage transmission for a vehicle is executed commonly such that the actual transmission gear ratio may coincide with a target transmission gear ratio which is calculated from a throttle opening, an engine speed or the like. Such a controlling device for a non-stage transmission for a vehicle is disclosed, for example, in Japanese Patent Laid-Open No. 62-273189. The controlling device controls a non-stage transmission in response to velocity information of the vehicle and throttle opening information.

The prior art described above has the several problems. In particular, the conventional controlling device for a non-stage transmission for a vehicle as disclosed in Japanese Patent Laid-Open No. 62-273189 relies upon the detection of current velocity information of the vehicle and current throttle opening information, in other words, a current running condition of the vehicle, and executes control of the non-stage transmission in response to a result of a current running condition. Accordingly, the control response of the non-stage transmission is low.

In the vehicle on which the non-stage transmission is carried, fuel injection to the engine is controlled in response to throttle opening information, engine speed information and so on, and the velocity of the vehicle is controlled thereby. Since control of the non-stage transmission is then executed using vehicle velocity information and so on, some delay in response takes place in control of the non-stage transmission, and a comparatively long period of time is required until the vehicle is brought into a running condition that is intended by the driver, which leads to deterioration in running performance.

Accordingly, when it is intended to suddenly open the throttle valve to achieve rapid acceleration, or when the vehicle is running in high altitudes or the like and the atmospheric pressure is different from that at a lower elevation, or else when the vehicle is provided with a running mode change-over switch for setting the running mode of the vehicle (e.g., a switch for setting sport running, fuel cost save running, and so forth) and the vehicle is controlled to run in response to a position of the control switch, control of the non-stage transmission cannot respond promptly to the running condition of the vehicle.

The present invention has been made to resolve the problems described above, and it is an object of the present invention to provide a controlling device for a non-stage transmission for a vehicle that can execute control of the non-stage transmission instantaneously and appropriately in response to a condition of an output power of an engine of the vehicle to improve the running performance.

Where a non-stage transmission is carried on a vehicle, the non-stage transmission is controlled such that the transmission gear ratio thereof may coincide with a target transmission gear ratio calculated in accordance with an engine parameter or the like during running of the vehicle, or the engine speed of the vehicle may coincide with a target engine speed calculated in accordance with an engine parameter or the like during running of the vehicle.

Such a controlling device for a non-stage transmission for a vehicle as described above is disclosed, for example, in Japanese Patent Laid-Open No. 62-273189.

In the case of the prior art described above, when the vehicle runs on an uneven road surface (e.g., a rough road), there is the possibility that the vehicle may suffer from hunting. The reason for the possibility of hunting will now be described.

FIG. 19 is a view illustrating a relationship between a vehicle which runs on an uneven road surface while maintaining an accelerator fixed and a transmission gear ratio of a non-stage transmission carried on the vehicle. It should be noted that, in FIG. 19, the degree of the unevenness of a road surface 905 is represented in an exaggerated manner in order to make the view easy to see.

In the figure, if a vehicle runs on an uneven road surface 905 while maintaining an accelerator thereof fixed, when the vehicle runs on an uphill road as denoted by reference numeral 901, the load to the engine is high. Accordingly, the transmission gear ratio of the non-stage transmission is set to a low side value (that is, a high transmission gear ratio side value). When the vehicle is running on a horizontal road as denoted by reference numeral 902, the engine load is low, and accordingly, the transmission gear ratio of the non-stage transmission is changed to a high side value (that is, a low transmission gear ratio side value). When the vehicle is running on a downhill road as denoted by reference numeral 903, the engine load is reduced further, and the transmission gear ratio is changed to a further higher side value.

FIG. 20 is a view showing a change in transmission gear ratio of a non-stage transmission when a vehicle runs on a level ground, an uneven road surface, a downhill road and an uphill road while maintaining a accelerator thereof fixed. In a table shown at the bottom of FIG. 20, a mark + indicates that the transmission gear ratio is being increased while another mark − indicates that the transmission gear ratio is being decreased, and 0 indicates that the transmission gear ratio does not vary.

As shown in FIG. 20, when a vehicle is running on level ground while an accelerator is maintained fixed, the transmission gear ratio is fixed, but when the vehicle runs on a downhill road or an uphill road, the transmission gear ratio is set from a low side value to a high side value or from a high side value to a low side value. When the vehicle runs on an uneven road surface (e.g., a rough road) while the accelerator is maintained fixed, the transmission gear ratio fluctuates between a low side value and a high side value as shown in the figure.

Generally, control of a non-stage transmission is executed for each predetermined sampling cycle, and depending upon a relationship between such sampling cycle and a cycle of the unevenness of a rough road, even if a controlling device for the vehicle judges, for example, that the vehicle is running on an uphill road and sets the transmission gear ratio to a low side value, the vehicle may actually begin to run on a downhill road. Then, if the controlling device judges that the vehicle is running on a downhill road and sets the transmission gear ratio to a high side value, the vehicle may actually begin to run on an uphill road. If such a situation as just described occurs repetitively, the vehicle will suffer from hunting, and there is a disadvantage in that a disagreeable feeling upon running on an uneven road surface is increased. The present invention resolves the problems discussed above.

A non-stage transmission which is carried on a vehicle typically changes the speed of a power of an internal combustion engine at a predetermined transmission gear ratio (ratio) to enable an efficient running of the internal combustion engine, by which improvements in fuel cost may be attained. Such a non-stage transmission is controlled so that, for example, the actual transmission gear ratio may coincide with a target transmission gear ratio which is calculated in accordance with a running condition of the vehicle. Such a controlling device for a non-stage transmission is disclosed, for example, in Japanese Patent Laid-Open No. 62-273189. A technique of fixing the transmission gear ratio of a non-stage transmission in a special condition such as reversing is disclosed, for example, in Japanese Patent Laid-Open No. 62-203830. The fixed transmission gear ratio is set to a comparatively high value on the low side so that starting of the vehicle and running of the same after then may be enabled.

The prior art just described has the following problems. In case the transmission gear ratio of a prior-art non-stage transmission is fixed, the transmission gear ratio is set to a comparatively high value on the low side as described above. Accordingly, when a running condition is entered after starting the vehicle, the engine speed likely becomes higher than that when the transmission gear ratio is not fixed (i.e., than when the transmission gear ratio is automatically controlled by a controlling device for the non-stage transmission). Accordingly, if running continues for a long period of time in this condition, there is the possibility that the engine may suffer from overheating. The present invention has been made to resolve the problems described above.

Some vehicles on which a non-stage transmission is carried have a device for automatically controlling the opening of a throttle valve so that an actual running velocity of the vehicle may coincide with a set running velocity to maintain a fixed velocity running, in order to reduce possible fatigue of a driver during running of the vehicle on an express-highway or the like. Such an automatic fixed velocity running device is disclosed, for example, in the official gazette of Japanese Patent Laid-Open No. 62-216836.

If, during automatic fixed velocity running, a vehicle begins to run on an uphill road having an excessively high inclination so that, consequently, the running condition of the vehicle changes, the load to the output side of an engine will be excessively high with only control of a throttle valve opening. Accordingly, in such an instance the automatic fixed velocity running control must necessarily be canceled. Thus, in conventional vehicles, transmission ratios of a non-stage transmission are set to rather high values in advance over all running conditions in order to widely follow a change in such running conditions.

The prior art described above has the following problems, which will now be discussed. Where transmission gear ratios of a non-stage transmission are set to rather high values compared to those for an ordinary case, the vehicle can execute automatic fixed velocity running against wide changes in a running condition of the vehicle due to running on an uphill road or the like as described above. However, when running the vehicle on level ground, the transmission gear ratio will then be excessively high. Consequently, the fuel cost will be high. In particular, since automatic fixed velocity running control and control of a non-stage transmission are executed independently of each other in a conventional vehicle, the fuel cost of the vehicle is sometimes high depending upon a running condition of the vehicle. Furthermore, since automatic fixed velocity running control in conventional vehicles is executed only by control of the opening of a throttle valve, the vehicle generally suffers from hunting.

SUMMARY OF THE INVENTION

It is therefore an object of the present invention to provide a controlling device for a non-stage transmission for a vehicle that overcomes the above-discussed problems of the prior art. It is an object of the present invention to provide a controlling device for a non-stage transmission for a vehicle that forecasts into what condition an output power of an engine will be put, and a target transmission gear ratio or a target engine speed of a non-stage transmission is modified in accordance with a result of such forecast. In other words, in the present invention, control of the non-stage transmission is executed in response to a parameter of the engine and a condition in which an output power of the engine is produced. Forecasting of an output power of the engine is made by detecting an increasing amount of fuel for acceleration. Detection of an increasing amount of fuel for acceleration is achieved by detecting an increase of a throttle opening and/or increase of increase of the engine speed. A condition wherein the output power of the engine is decreased is detected and forecasting of the output power of the engine is made in accordance with a result of such detection, even if the vehicle is in such a situation wherein the output power of the engine is decreased. A condition wherein the output power of the engine is decreased is judged using an atmospheric pressure data detected by an atmospheric pressure detecting means. Consequently, the non-stage transmission can be controlled promptly following a change in output power of the engine.

Since a condition wherein the output power of the engine is decreased is detected and forecasting of the output power of the engine is made in accordance with a result of such detection, even if the vehicle is in such a situation wherein the output power of the engine is decreased, deterioration of the running performance involved in such decrease of the output power can be prevented.

Since the condition wherein the output power of the engine is decreased is judged using an atmospheric pressure data detected by an atmospheric pressure detecting means, forecasting of a condition of the output power of the engine can be effected readily, and an additional sensor or the like is not required.

Further, since forecasting of an output power of the engine is made by detecting an increasing amount of fuel for acceleration, the acceleration of the vehicle can be achieved smoothly.

Since such detection of an increasing amount of fuel for acceleration is achieved by detecting a ratio of increase of a throttle opening and/or a ratio of increase of the engine speed, forecasting of an output power of the engine can be made readily, and an additional sensor or the like is not required.

Since forecasting of an output power of the engine is made in response to a setting condition of a plurality of running mode setting switches, running of the vehicle can be made smoothly in accordance with a setting of the running mode setting switches.

It is an object of the present invention to provide a controlling device for a non-stage transmission for a vehicle by which the vehicle does not suffer from hunting even when it runs on a rough road. Thus, it is determined whether or not a road surface on which a vehicle is running is an uneven, rough road. If it is determined that the road surface is a rough road, then a target transmission gear ratio is fixed. When control of a non-stage transmission is executed so that a target engine speed and an actual engine speed may coincide with each other, retrieval or calculation of a target engine speed is stopped and the transmission gear ratio of the non-stage transmission is fixed. Since the transmission gear ratio of the non-stage transmission is fixed in this manner when the road surface is an uneven, rough road, hunting is prevented.

It is an object of the present invention to provide an engine controlling device which eliminates the possibility that, when the transmission gear ratio of a non-stage transmission is set to a fixed value in a special running condition, the engine may suffer from overheating even if running is performed continuously.

Thus, when the transmission gear ratio of a non-stage transmission is set to a fixed value in a special running condition, the engine speed is controlled so that it may not exceed a predetermined rotational speed. Consequently, even if running is continued for a long period of time, there is no possibility that the engine may suffer from overheating.

It is an object of the present invention to provide a vehicle controlling device which can minimize any hunting upon automatic fixed velocity running of the vehicle and can attain reduction of the fuel cost of running the vehicle.

Thus, a target engine speed or a target transmission gear ratio is corrected in response to a running condition upon automatic fixed velocity running of a vehicle carrying a non-stage transmission. A set vehicle velocity for automatic fixed velocity running and an actual vehicle velocity are compared with each other, and a target engine speed or a target transmission gear ratio for the non-stage transmission is corrected in response to a result of such comparison, and then the non-stage transmission is controlled using the thus corrected target engine speed or the thus corrected target transmission gear ratio.

By controlling the non-stage transmission in association with automatic fixed velocity running control in this manner, the transmission gear ratio can be increased during automatic fixed velocity running only when the change in running condition of the vehicle is great. Furthermore, automatic fixed velocity running can be executed in control of both the throttle valve and the transmission gear ratio of the non-stage transmission.

The above and other objects, features and advantages of the present invention will become more apparent from the following description when take in conjunction with the accompanying drawings in which preferred embodiments of the present invention are shown by way of illustrative example.

BRIEF DESCRIPTION OF THE DRAWINGS

FIGS. 11A & 11B illustrates Ne interrupt control flow charts which illustrate the operation of a second embodiment of the present invention;

FIG. 14A & 14B illustrates Ne interrupt control flow charts which illustrate the operation of a third embodiment of the present invention;

FIG. 16 a graph showing an example of first to third energization times which are applied to the third embodiment of the present invention;

FIG. 17 is a graph showing an example of first to third transmission gear ratio tables which are applied to the third embodiment of the present invention;

FIG. 27 is a constructional view of a memory for storing δΘthi, δRAi and Ri therein;

FIG. 31 is a constructional view of a register for storing Ti therein;

DESCRIPTION OF THE PREFERRED EMBODIMENTS

Figure 1:
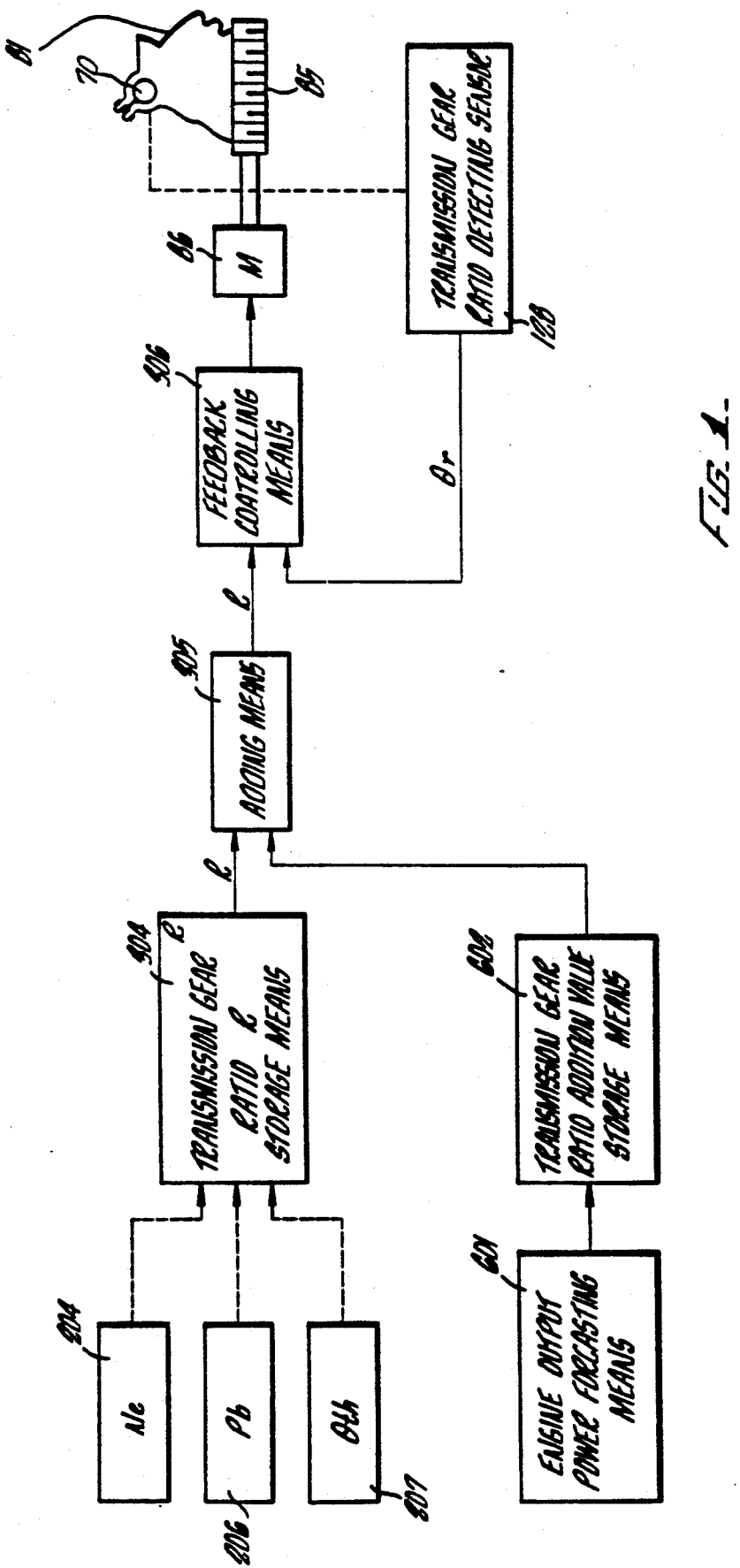
FIG. 1 is a functional block diagram showing an example of a basic construction of an embodiment the present invention.

The present invention will now be described in detail with reference to the drawings. In the description below, similar reference numerals refer generally to like or equivalent features or structure in the various drawings.

A non-stage transmission which is controlled in accordance with the present invention is preferably of the type wherein the transmission gear ratio of the non-stage transmission is determined decisively as the controlling parameters of a transmission gear ratio modifying means are determined. Such a non-stage transmission is disclosed, for example, in Japanese Patent Laid-Open No. 62-224770. The non-stage transmission disclosed in the official gazette mentioned above will now be described briefly.

The non-stage transmission disclosed in Japanese Patent Laid-Open No. 62-224770 contains a cam plate type fixed delivery hydraulic pump P and a cam plate type variable delivery hydraulic motor M.

A transmission gear ratio R of the non-stage transmission is determined in accordance with the following expression:

$$R = 1 + \frac{\text{Capacity of Hydraulic Motor } M}{\text{Capacity of Hydraulic Pump } P}$$

Accordingly, if the capacity of the hydraulic motor M is changed from 0 to a particular value, then the transmission gear ratio is changed from 1 to a certain required value. Since the capacity of the hydraulic motor M depends upon a stroke of a motor plunger, the transmission gear ratio can be changed to a certain required value by tilting a motor cam plate from an upright position to a certain inclined position, thereby varying the stroke of the motor plunger.

Figure 2:
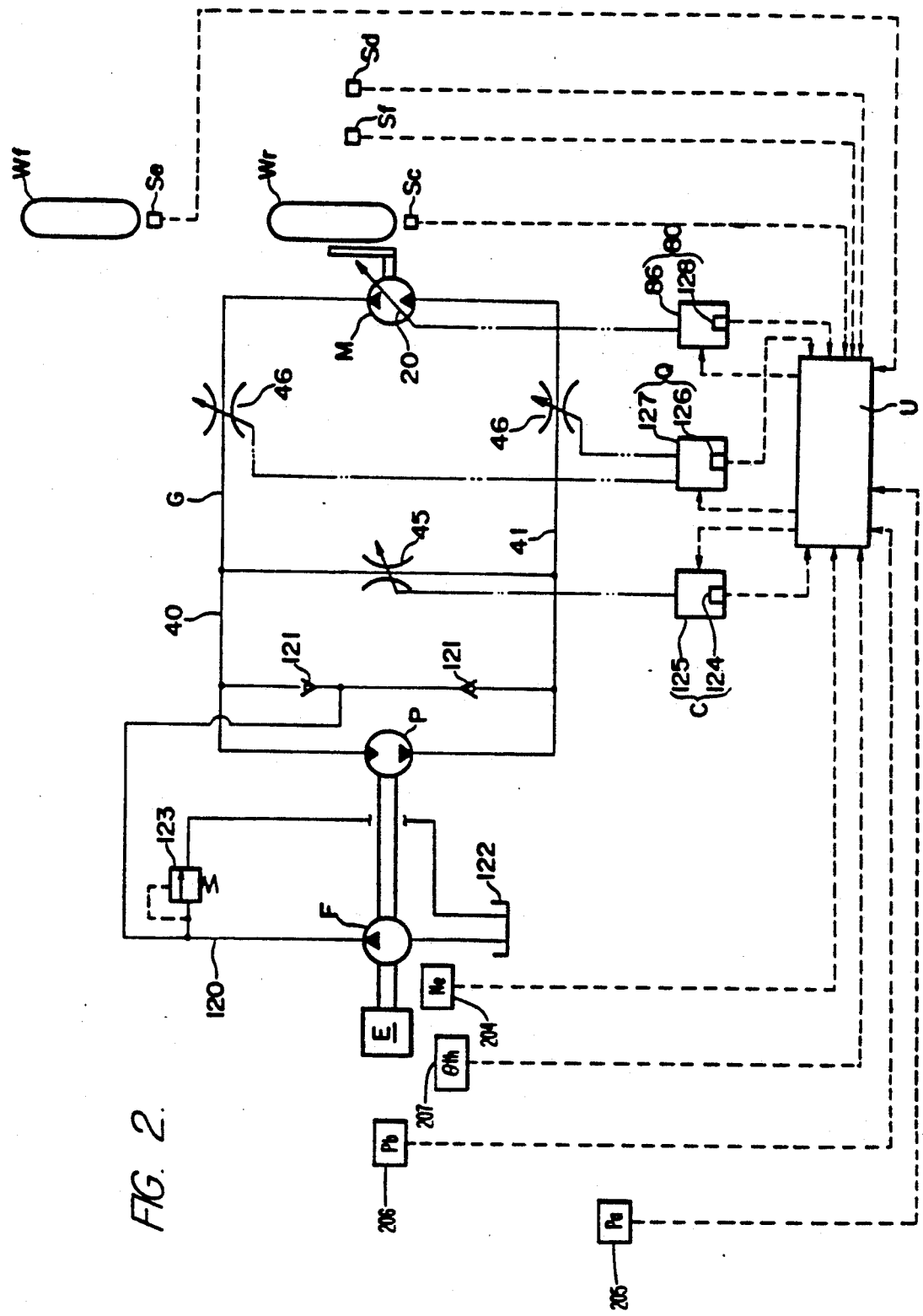
FIG. 2 is a block diagram showing a hydraulic circuit of an example of a non-stage transmission to which the present invention may be applied.

FIG. 2 is a block diagram showing a hydraulic circuit of a non-stage transmission. Referring to FIG. 2, reference character F denotes an oil pump which is driven by an engine E, C a clutch mechanism, Q a flow rate adjusting mechanism, Wr a driving wheel which is driven to rotate by an output power shaft of the non-stage transmission, and Wf a driven wheel.

A hydraulic closed circuit G is formed between the hydraulic pump P and the hydraulic motor M. The hydraulic closed circuit G includes an outer-side oil passage 41 which forms a high pressure oil passage, and an inner-side oil passage 40 which forms a low pressure oil passage. The oil pump F is connected to the inner-side oil passage 40 and the outer-side oil passage 41 by way of a supplementing oil passage 120 and a pair of check valves 121, 121 such that working oil pumped up from an oil tank 122 may be supplied by way of the supplementing oil passage 120 and the check valves 121. A relief valve 123 for adjusting the pressure of the working oil to a fixed value is connected to the supplementing oil passage 120.

The clutch mechanism C has an actuator 125 which is provided with a clutch sensor 124. The clutch sensor 124 detects an operating position of a first distributing valve 45, which first distributing valve 45 is used as a clutch valve. Alternatively, the clutch sensor 124 may detect an operating position of a first control ring. The flow rate adjusting mechanism Q has an actuator 127 which is provided with a flow rate sensor 126 for detecting an operating position of a second distributing valve 46. Alternatively, the flow rate sensor 126 may detect an operating position of a second control ring. An inclination angle controlling mechanism 80 has a electric motor 86 as an actuator and a transmission gear ratio detecting sensor ("ratio sensor") 128 for detecting a tilted position of a motor cam plate 20, that is, a transmission gear position.

A controlling means U is electrically connected to the actuators 125 and 127, the electric motor 86, the clutch sensor 124, flow rate sensor 126 and transmission gear ratio detecting sensor 128. The controlling means U is further connected to an Ne sensor 204 for detecting a speed Ne of the engine E, a Θth sensor 207 for detecting a throttle opening Θth of the engine E, a vehicle velocity sensor Sc for detecting a rotational speed of the driving wheel Wr, a brake sensor Sd for detecting an operating condition of a brake mechanism of the vehicle (such as a brake lever), another velocity vehicle sensor Se for detecting a rotational speed of the driven wheel Wf, a change switch Sf, a Pa sensor 205 for detecting an atmospheric pressure Pa, and a Pb sensor 206 for detecting a negative pressure Pb in an intake air pipe on the downstream side of a throttle valve (hereafter referred to as "intake air pipe internal negative pressure"). The controlling means U thus normally receives information from the various sensors described above. The controlling means U is provided with a function of a microcomputer 201 (described below with reference to FIG. 5), that is, a function of executing operation of the present invention, and another function of executing various controls necessary for control of the vehicle and/or the non-stage transmission other than the operation according to the present invention.

An example wherein a non-stage transmission having such a construction as described above is carried on a motorcycle is shown in FIGS. 3 and 4. The motorcycle includes a body frame 130, and engine E supported on the body frame 130, and a non-stage transmission CVT (as described above), which non-stage transmission is disposed at the rear stage of the engine E. The non-stage transmission CVT in this instance is of the hydraulic type, and an output power shaft 25 thereof is disposed in leftward and rightward directions of the body so that it may extend parallel to a crankshaft 1 of the engine E, as shown in FIG. 3.

Reference character Wf denotes a driven wheel, and Wr a driving wheel to which a driving force is applied from the engine E. A fuel tank 131 is secured to an upper location of a front portion of the body frame 130, while a seat 132 is secured to a seat rail 130a at a rear portion of the body frame 130. The driven wheel Wf is supported for rotation at a lower end of a front fork 134 which is mounted on a head pipe 133 at a front portion of the body frame 130 while a handle 135 mounted on the front fork 134 is disposed above the head pipe 133.

Figure 3:
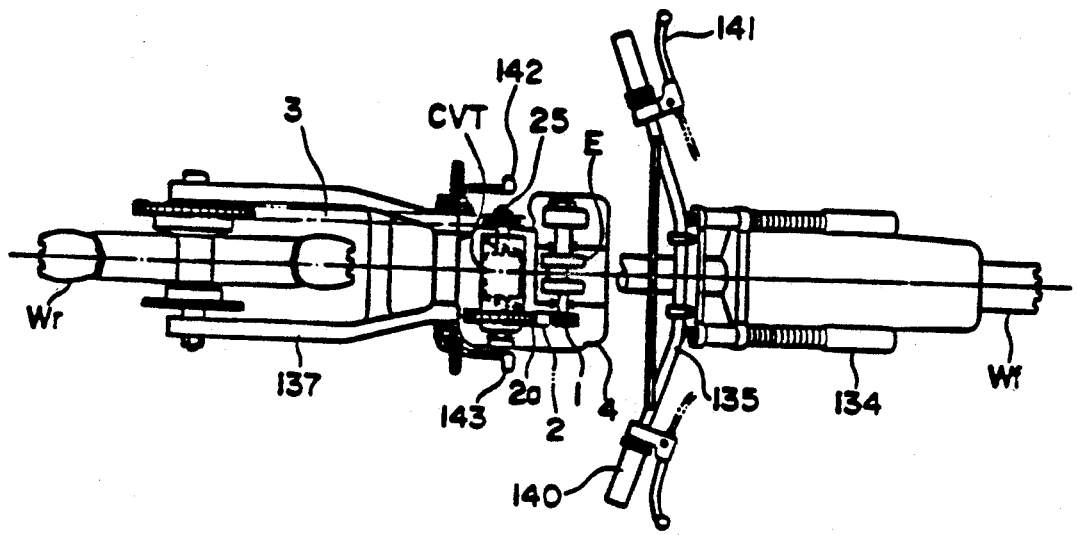
FIG. 3 is a plan view of a motorcycle on which an example of a non-stage transmission to which the present invention is applied is carried.
Figure 4:
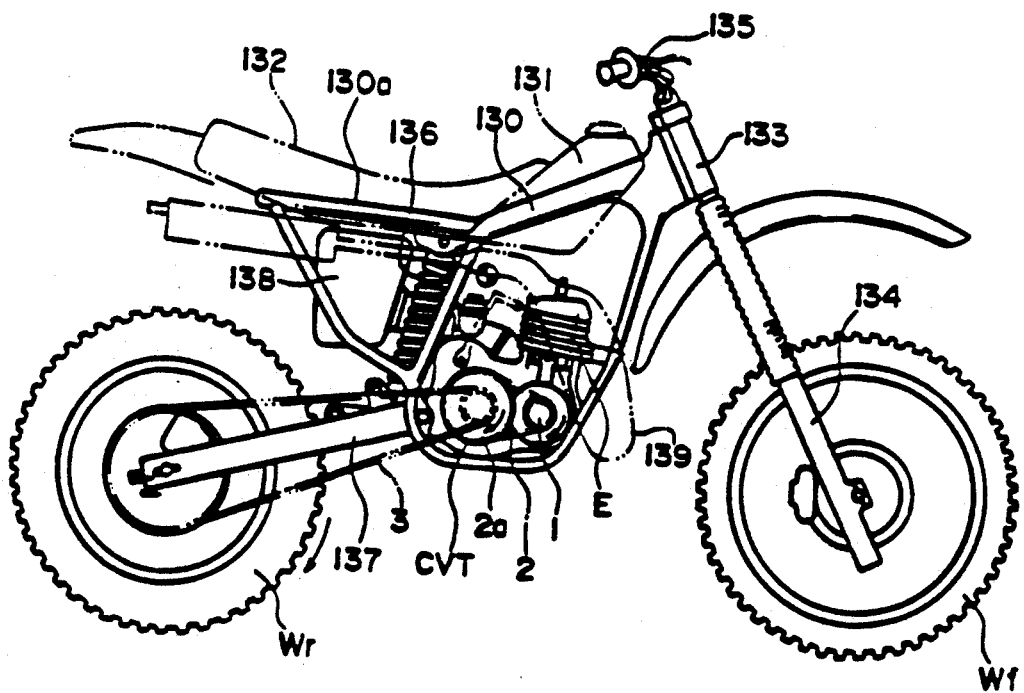
FIG. 4 is a side elevational view of FIG. 3.

The driving wheel Wr is supported for rotation at an end portion on the rocking side of a swing arm 137 which is mounted for rocking motion under a reactive force of a cushion unit 136 on the body frame 130 as shown in FIG. 4, and the driving wheel Wr is connected to the output power shaft 25 of the non-stage transmission CVT by way of a secondary reduction gear 3 disposed on the left-hand side of the body as shown in FIG. 3.

The rotation systems such as the non-stage transmission CVT, crankshaft 1 and so forth are disposed such that the center of the mass thereof may be positioned at the center in the widthwise direction of the body and the directions of rotation of input and output power shafts of the non-stage transmission CVT and the crankshaft 1 may coincide with the direction of rotation of the driving wheel Wr. Such arrangement and structure is intended to cause the vehicle to produce a moment in the pitching direction without producing a yawing moment in the leftward or rightward direction making use of an inertial reactive force of the rotation systems by changing the velocities of rotation of the rotation systems in response to an operation of an accelerator, thereby permitting arbitrary changing of loads to be applied to the front and rear wheels.

Reference character 2 denotes a primary reduction gear of the chain type, 2a an output sprocket wheel of the primary reduction gear 2, 138 an air cleaner, 139 an exhaust pipe, 140 an accelerator grip, 141 a clutch lever, 142 a change pedal for manual operation, and 143 a brake pedal. The change pedal 142 is provided in a cooperating relationship with the change switch Sf such that the change switch Sf may provide two different signals corresponding to directions of operations of the change pedal 142, one of the signals is a shift up signal for changing the transmission gear ratio to the TOP side while the other one is a shift down signal for changing the transmission gear ratio to the LOW side.

Figure 5:
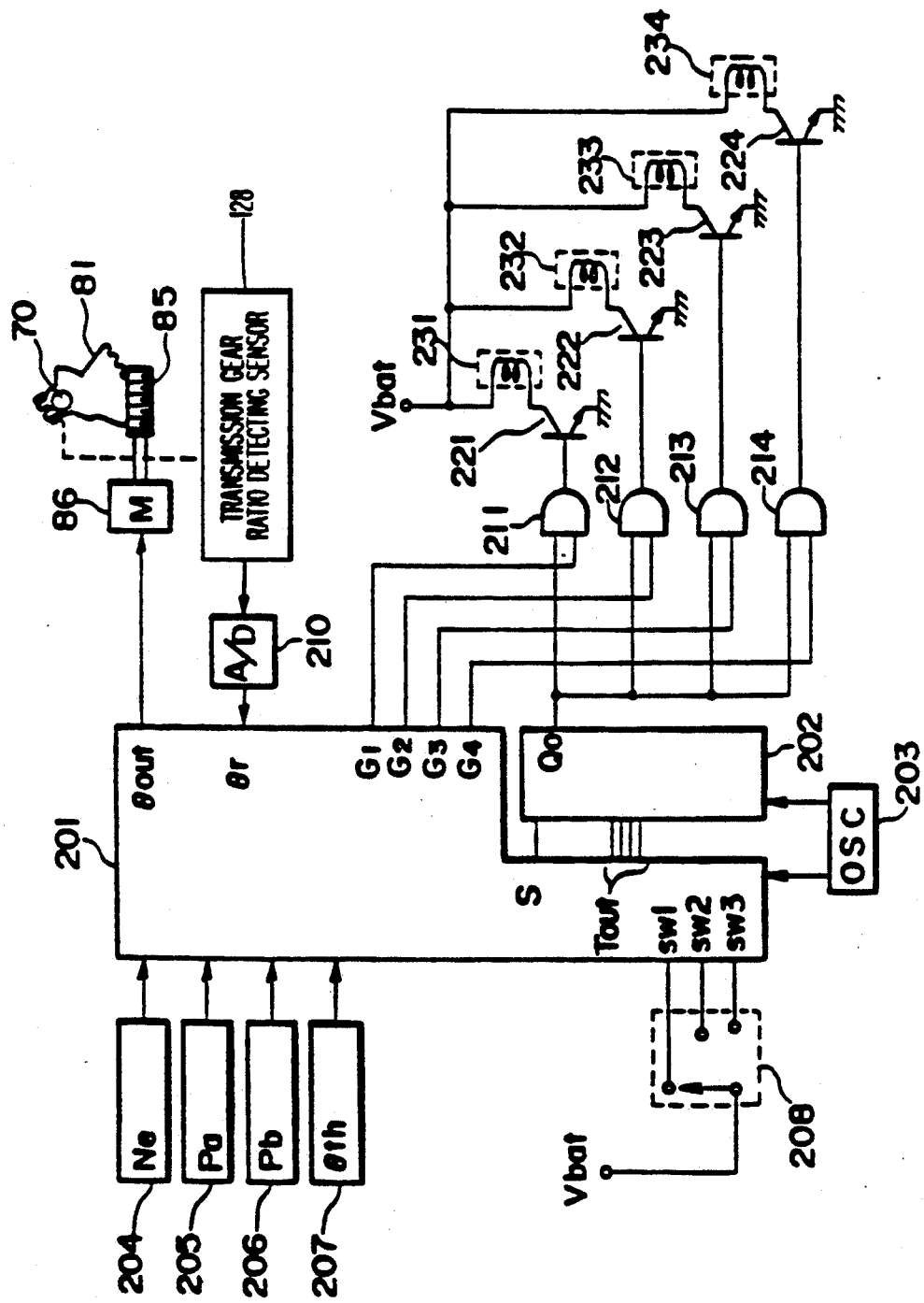
FIG. 5 is a block diagram showing an example of a construction of an embodiment the present invention.

FIG. 5 is a block diagram showing an example of construction of one embodiment of the present invention. Referring to FIG. 5, reference numerals 201, 202 and 203 denote a microcomputer (electronic controlling device), a down counter and an oscillator, respectively. The microcomputer 201 is composed of a CPU, a ROM, a RAM, an input/output interface, a common bus for interconnecting such components, and so forth, as is well known in the art.

While the embodiment of the invention being described employs a down counter 202, the function of the down counter 202 can be achieved otherwise by the microcomputer 201. In such an instance, the down counter 202 can be omitted.

The Ne sensor 204, Pa sensor 205, Pb sensor 206, and Θth sensor 207 are connected to the microcomputer 201. The Ne sensor 204 detects a plurality of pawls provided in an equidistantly spaced relationship on a crankshaft of the vehicle and calculates a rotational speed Ne of the internal combustion engine from time intervals between the detection of successive pawls as the crankshaft rotates.

A running mode change-over switch 208 is provided to set a running mode of the vehicle. In the present example, the running mode change-over switch 208 has three different contacts, and a running mode of the vehicle is determined by changing over among the contacts. (The running mode change-over switch 208 is applied to a third embodiment of the present invention which will be described below with reference to FIGS. 14 to 18.)

Figure 10:
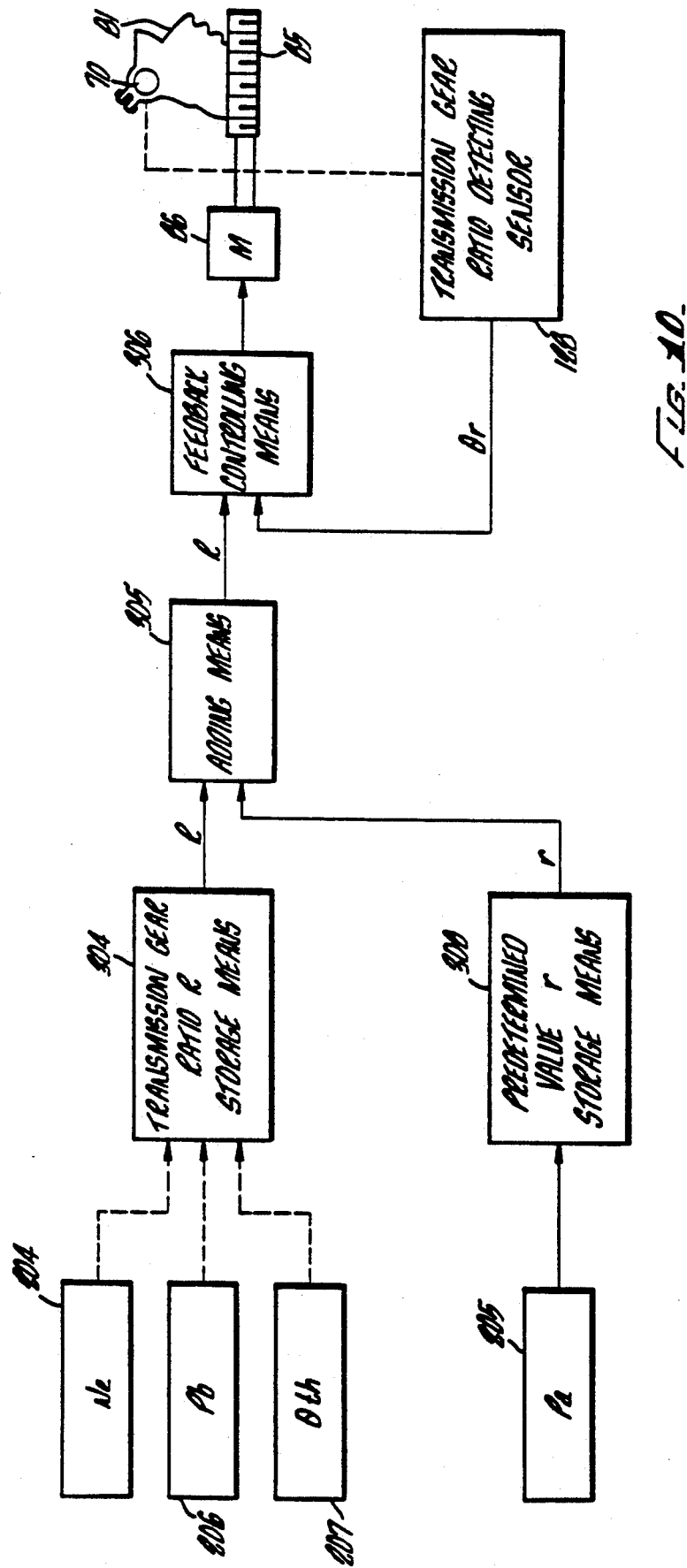
FIG. 10 is a block diagram of the modification to the first embodiment of the present invention.

Reference numerals 70, 81, 85 and 86 denote a trunnion shaft connected to the cam plate of the hydraulic motor M, a sectoral sector gear connected to the trunnion shaft, a worm gear held in meshing engagement with the sector gear, and a motor for driving the worm gear to rotate, respectively, as shown in FIG. 10 of the official gazette of Japanese Patent Laid-Open No. 62-224770 mentioned above.

A transmission gear ratio of the non-stage transmission CVT is detected by the transmission gear ratio detecting sensor 128. The transmission gear ratio detecting sensor 128 may be a potentiometer, for example, for detecting a rotational angle of the trunnion shaft 70 or the motor 86. An output signal of the transmission gear ratio detecting sensor 128 is transmitted to the microcomputer 201 by way of an analog-to-digital converter 210.

Reference numerals 231 to 234 denote first to fourth injectors, respectively, and 221 to 224 denote first to fourth injector driving transistors connected to the first to fourth injectors 231 to 234, respectively. An output terminal Qo of the down counter 202 is connected to input terminals of first to fourth AND gates 211 to 214, while output terminals G1 to G4 of the microcomputer 201 are connected to the other input terminals of the first to fourth AND gates 211 to 214, respectively. Output terminals of the first to fourth AND gates 211 to 214 are connected to the bases of the first to fourth transistors 221 to 224, respectively.

Control of the non-stage transmission and control of the injectors (first to fourth injectors 231 to 234) are executed by the same microcomputer (microcomputer 201), as seen in FIG. 5. Control of the first to fourth injectors 231 to 234 is executed each time one of the pawls provided on the crankshaft of the vehicle is detected, as described above in connection with the description of the Ne sensor 204. In the following description, a control which is executed in response to detection of a pawl will be referred to as control by "Ne interrupt." While control of the first to fourth injectors 231 to 234 is executed under Ne interrupt control, the control of the non-stage transmission is executed after each lapse of a fixed interval of time. In the following description, a control which is executed after each lapse of a fixed interval of time will be referred to as "fixed time interrupt control."

Figure 6:
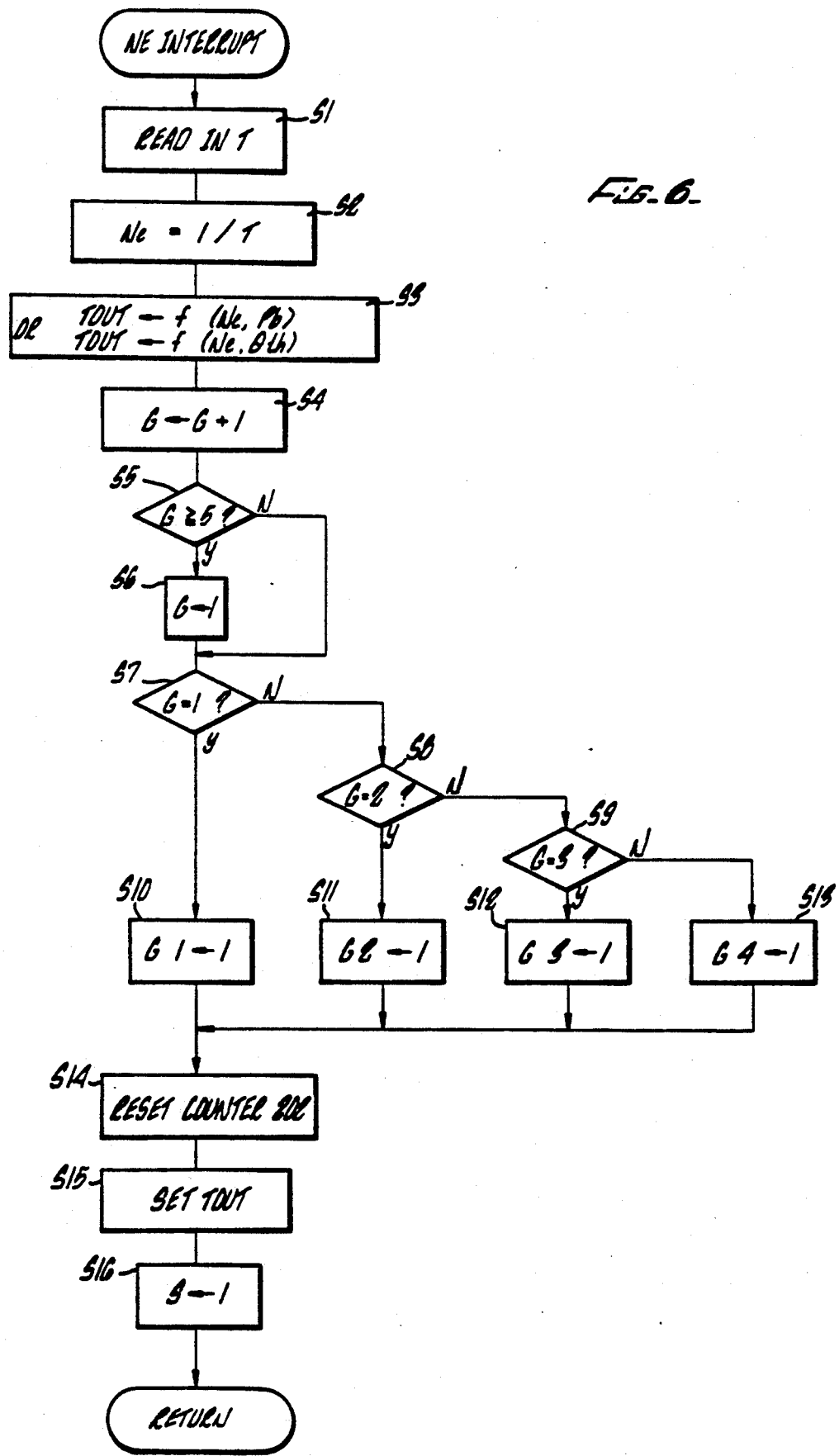
FIG. 6 illustrates Ne interrupt control flow charts which illustrate the operation of a first embodiment of the present invention.
Figure 7:
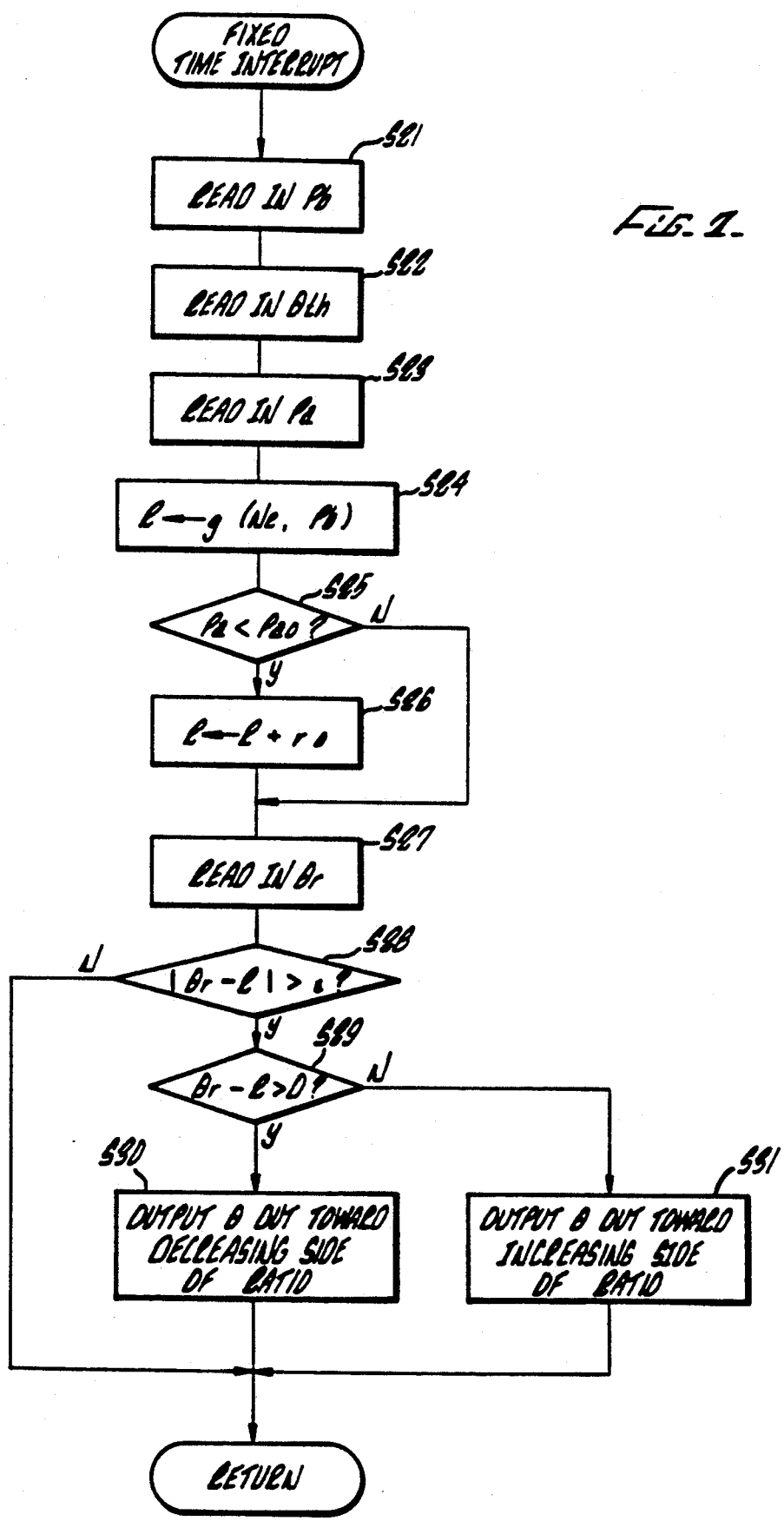
FIG. 7 illustrates fixed time interrupt control flow charts which illustrate the operation of the first embodiment of the present invention.

FIGS. 6 and 7 are flow charts illustrating operation of the first embodiment of the present invention. The Ne interrupt control is illustrated in FIG. 6 while the fixed time interrupt control is illustrated in FIG. 7.

At first, in the Ne interrupt control of FIG. 6, a detected time T between the detection by the Ne sensor 204 of adjacent ones of the plurality of pawls provided in an equidistantly spaced relationship on the crankshaft of the vehicle is read in at first at step S1. At step S2, a reciprocal of the time T is set to be an engine speed Ne.

At step S3, an energization time Tout of an injector (any one of the first to fourth injectors 231 to 234) is retrieved from a map wherein either the engine speed Ne and an intake pipe internal negative pressure Pb, or the engine speed Ne and a throttle opening Θth, are used as variables. (The intake pipe internal negative pressure Pb and the throttle opening Θth are detected in the fixed time interrupt control illustrated in FIG. 7.) Since the technique of setting the energization time Tout of an injector is already well known, a further description thereof will not be provided.

At subsequent step S4, a count value G of a stage counter for designating which one of the injectors is to be energized is incremented by one.

At step S5, it is detected whether or not the count value G is equal to or greater than 5, and in case the count value G is equal to or greater than 5, the sequence advances to step S7 by way of step S6, but if the count value G is smaller than 5, the sequence directly advances to step S7.

At step S6, the count value G is set to 1.

Steps S7 to S9 are steps at which in the count value G is determined. If the count value G is equal to 1, the value "1" is delivered, at step S10, from the output terminal G1 of the microcomputer 201 shown in FIG. 5. Similarly, if the count value G is equal to one of the values 2 to 4, the value "1" is delivered from a corresponding one of the output terminals G2 to G4 of the microcomputer 201 at a corresponding one of steps S11 to S13.

At step S14, the down counter 202 connected to the microcomputer 201 is reset.

At step S15, the energization time Tout retrieved at step S3 is set in the down counter 202.

At step S16, the value "1" is delivered from the output terminal S of the microcomputer 201 to the down counter 202, after which the process comes to an end. Consequently, a predetermined injector (one of the first to fourth injectors 231 to 234) is energized for the energization time Tout, and the injection of fuel is performed.

In the fixed time interrupt control of FIG. 7, an intake pipe internal negative pressure Pb is read in at step S21.

At step S22, a throttle opening Θth is read in.

At step S23, an atmospheric pressure Pa is read in.

At step S24, a target transmission gear ratio R is retrieved from a map wherein the engine speed Ne and the intake pipe internal negative pressure Pb are used as variables. It should be noted that the target transmission gear ratio R may otherwise be retrieved from another map wherein the engine speed Ne and the throttle opening Θth are used as variables, or else from a table wherein any one of the engine speed Ne, intake pipe internal negative pressure Pb and throttle opening Θth is used as a variable.

At step S25, it is judged whether or not the detected atmospheric pressure Pa is lower than a predetermined atmospheric pressure Pao. In case the atmospheric pressure Pa is lower than the predetermined atmospheric pressure Pao, the sequence advances to step S27 by way of step S26, but to the contrary if the atmospheric pressure Pa is not lower than the predetermined atmospheric pressure Pao, the process advances directly to step S27.

At step S26, a predetermined value (fixed value) ro is added to the transmission gear ratio R.

At step S27, an output signal of the transmission gear ratio detecting sensor 128 (i.e., an angle of the trunnion shaft 70) corresponding to the actual transmission gear ratio Θr of the non-stage transmission is read in.

At step S28, it is judged whether or not an absolute value of a difference between the actual transmission gear ratio Θr and the target transmission gear ratio R is greater than a predetermined deviation $\epsilon$. If the absolute value is not greater than the predetermined deviation $\epsilon$, the process comes to an end. In case the absolute value is greater than the predetermined deviation $\epsilon$, it is judged at step S29 whether or not a difference of the target transmission gear ratio R from the actual transmission gear ratio Θr is positive. If the difference is positive, a predetermined driving signal Θout is delivered to the motor 86 at step S30 so that the transmission gear ratio may be decreased, that is, the ratio may be lowered.

However, if the difference is negative, then a predetermined driving signal Θout is delivered, at step S31, to the motor 86 so that the transmission gear ratio may be increased, that is, the ratio may be raised. Then, the process comes to an end.

The process at steps S28 to S31 makes a routine for executing feedback control so that the actual transmission gear ratio Θr may coincide with the target transmission gear ratio R.

In this manner, as shown in FIG. 7, if the detected atmospheric pressure Pa is lower than the predetermined atmospheric pressure Pao, or in other words, in case the vehicle is running in a region located a predetermined distance above sea level, the target transmission gear ratio R is increased by a predetermined amount. Thus, in a low atmospheric pressure condition where the output characteristic of the engine is deteriorated, the target transmission gear ratio R is increased so that the output power of the engine can be well utilized in the operation of the vehicle.

It should be noted that, while in FIG. 7 the process is shown coming to an end after completion of the processing at step S30 or S31, the process may be modified such that the process returns to step S28 after completion of either of steps S30 or S31.

Figure 8:
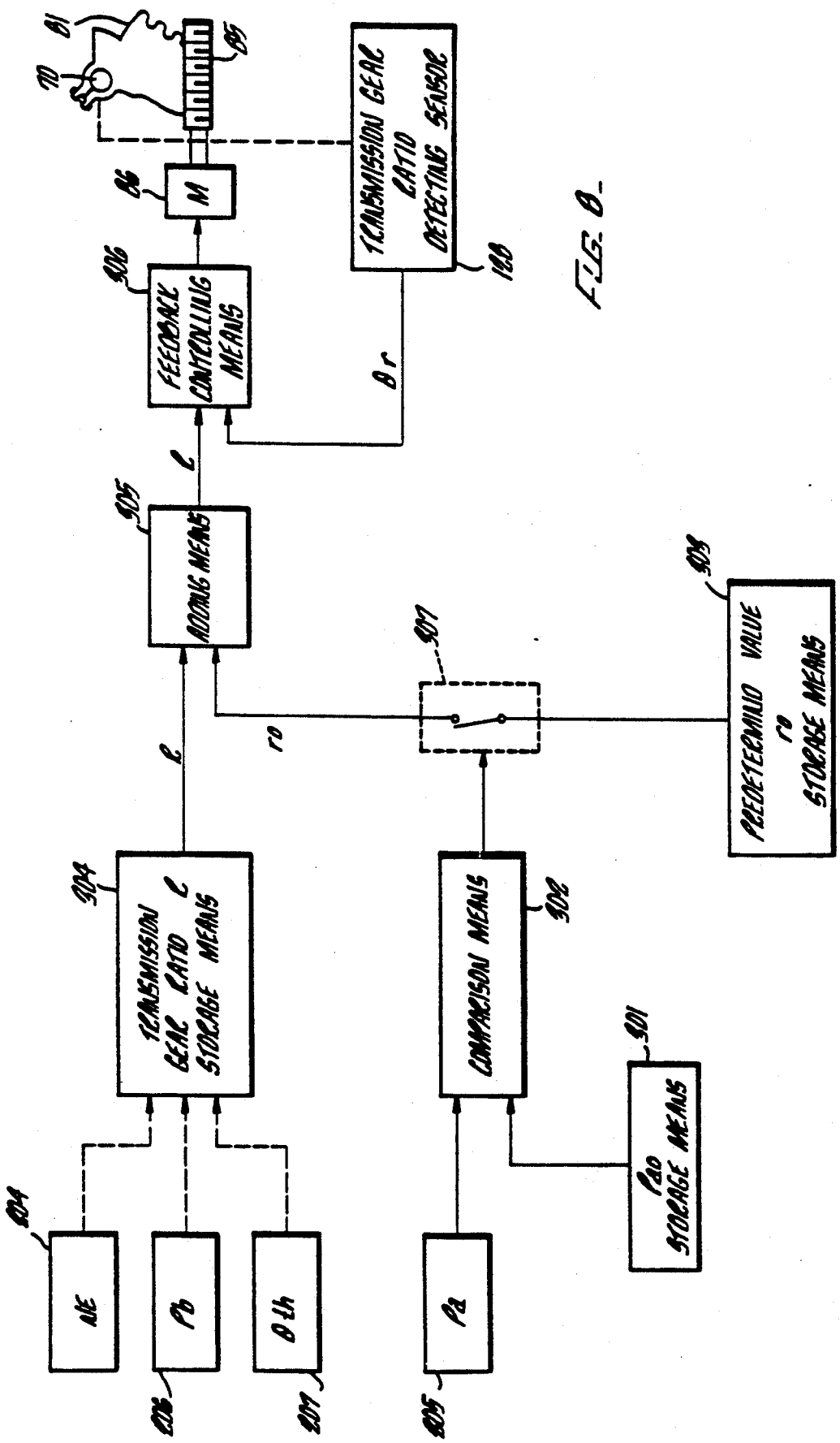
FIG. 8 is a functional block diagram of the first embodiment of the present invention.

FIG. 8 is a functional block diagram of the first embodiment of the present invention. In FIG. 8, like reference numerals to those of FIG. 5 denote like or equivalent portions.

Referring to FIG. 8, the Pa sensor 205 and a Pao storage means 301 in which a predetermined atmospheric pressure Pao is stored are both connected to a comparison means 302. The comparison means 302 compares the predetermined atmospheric pressure Pao and an atmospheric pressure Pa detected by the Pa sensor 205 with each other and energizes a switching means 307 when the atmospheric pressure Pa is lower than the predetermined atmospheric pressure Pao.

The switching means 307 is disposed between an input portion of an adding means 305 and a predetermined value ro storage means 303 in which a predetermined value ro (which is to be added to a target transmission gear ratio R when the atmospheric pressure is low) is stored. When the switching means 307 is energized by the comparison means 302, the switching means 307 interconnects the predetermined value ro storage means 303 and the adding means 305.

A transmission gear ratio R storage means 304 has transmission gear ratios R stored therein, employing at least one of the engine speed Ne, the intake pipe internal negative pressure Pb, and the throttle opening Θth as a variable. The transmission gear ratio R storage means 304 delivers a transmission gear ratio R to the other input portion of the adding means 305 in response to data detected by at least one of the Ne sensor 204, the Pb sensor 206, and the Θth sensor 207, which sensors are connected to the transmission gear ratio R storage means 304.

When the atmospheric pressure Pa detected by the Pa sensor 205 is lower than Pao, the adding means 305 adds a transmission gear ratio R delivered from the transmission gear ratio R storage mean 304 and the predetermined value ro delivered from the predetermined value ro storage means 303, and delivers the added value to a feedback controlling means 306. However, when the atmospheric pressure Pa is equal to or higher than Pao, the adding means 305 delivers a transmission gear ratio R from the transmission gear ratio R storage means 304 to the feedback controlling means 306, without changing the value of the transmission gear ratio R.

The feedback controlling means 306 compares a transmission gear ratio R delivered thereto and an actual transmission gear ratio Θr delivered from the transmission gear ratio detecting sensor 128, and feedback controls the motor 86 in accordance with a result of such comparison. Consequently, the transmission gear ratio of the non-stage transmission will assume a value delivered from the adding means 305.

Figure 9:
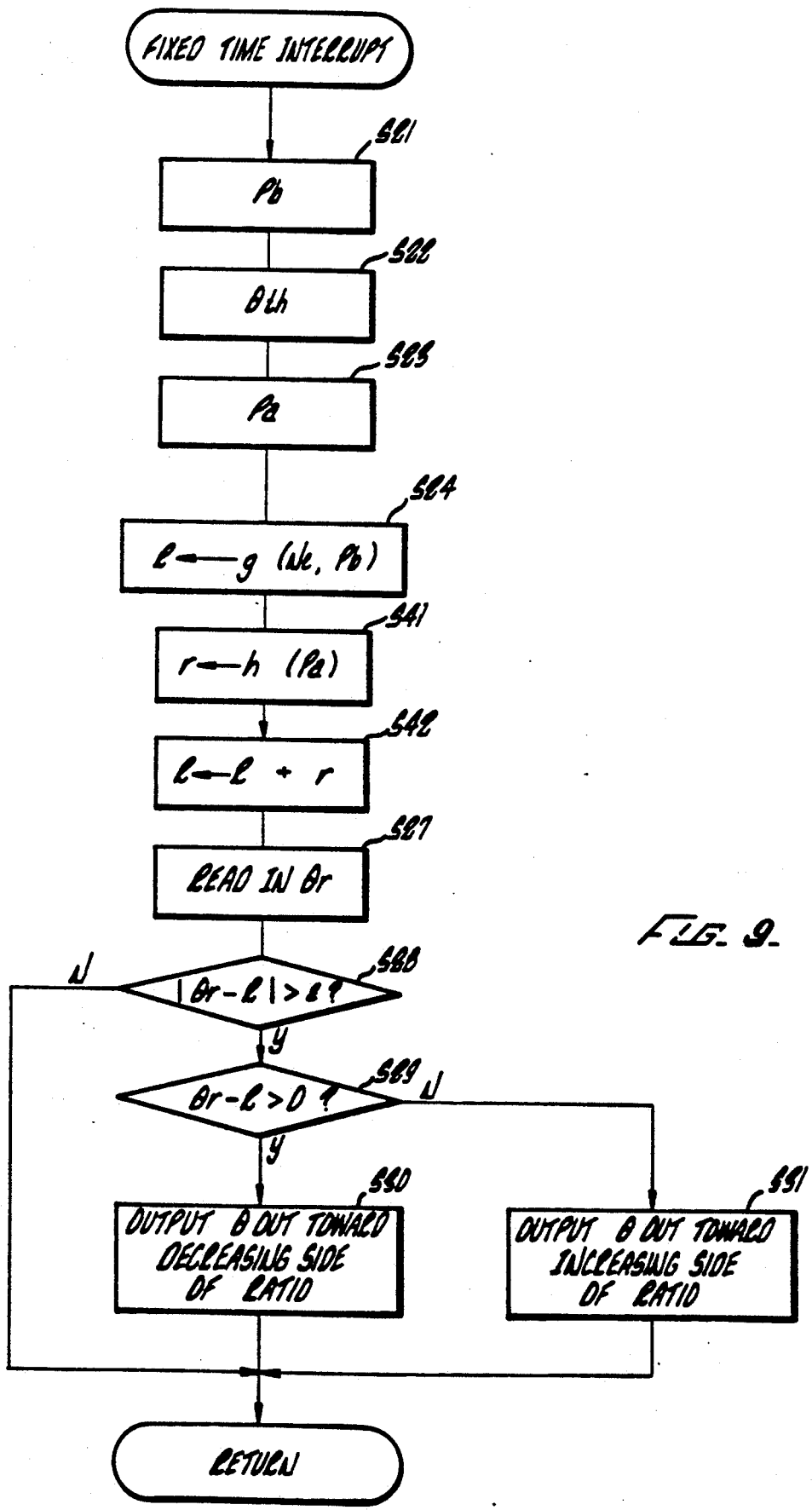
FIG. 9 illustrates a fixed time interrupt control flow charts which illustrate the operation of a modification to the first embodiment of the present invention.

FIG. 9 is a flow chart illustrating the operation of a modification to the first embodiment of the present invention and shows a fixed time interrupt control similar to that shown in FIG. 7. In this modification to the first embodiment of the present invention, the process shown in FIG. 6 is executed for Ne interrupt control. As seen from a comparison between FIGS. 9 and 7, the modification involves execution of the processings of steps S41 and S42 in place of the processings of steps S25 and S26 shown in FIG. 7.

At step S41, an atmospheric pressure correcting transmission gear ratio r is read out from a preset table in response to an atmospheric pressure Pa detected. Naturally, r may otherwise be calculated from a function h(Pa) defined for the correcting transmission gear ratio r as shown in the drawings. At step S42, the correcting transmission gear ratio r is added to the target transmission gear ratio R read out at step S24. If the correcting transmission gear ratio R is determined in response to the atmospheric pressure Pa in this manner, then more accurate control of the non-stage transmission can be attained than through the control shown in FIG. 7.

FIG. 10 is a functional block diagram of the modification to the first embodiment of the present invention and a view similar to FIG. 8. In FIG. 10, like reference numerals to those of FIG. 8 denote like or equivalent portions.

Referring to FIG. 10, a predetermined value r storage means 308 has stored therein predetermined values (atmospheric pressure correcting transmission gear ratios) r which are to be added to a transmission gear ratio in response to an atmospheric pressure Pa. If an atmospheric pressure Pa is detected by a Pa sensor 205, then a predetermined value r corresponding to the atmospheric pressure Pa is delivered from the predetermined value r storage means 308 to the adding means 305.

It should be noted that, while in the present example a transmission gear ratio R which is determined in response to an engine speed Ne, and intake pipe internal negative pressure Pb or the like is read out and a correcting transmission gear ratio r which is determined in response to an atmospheric pressure Pa is added to the transmission gear ratio R, where the control device for the non-stage transmission controls so as to make the actual engine speed Ne coincide with a target engine speed Rne determined in response to a load to the engine (for example, a throttle opening Θth), a similar effect will be attained if an atmospheric pressure correcting engine speed ne which is determined in response to an atmospheric pressure Pa is added to the target engine speed Rne so that the target engine speed Rne may be raised where the atmospheric pressure is low.

Figure 11B:
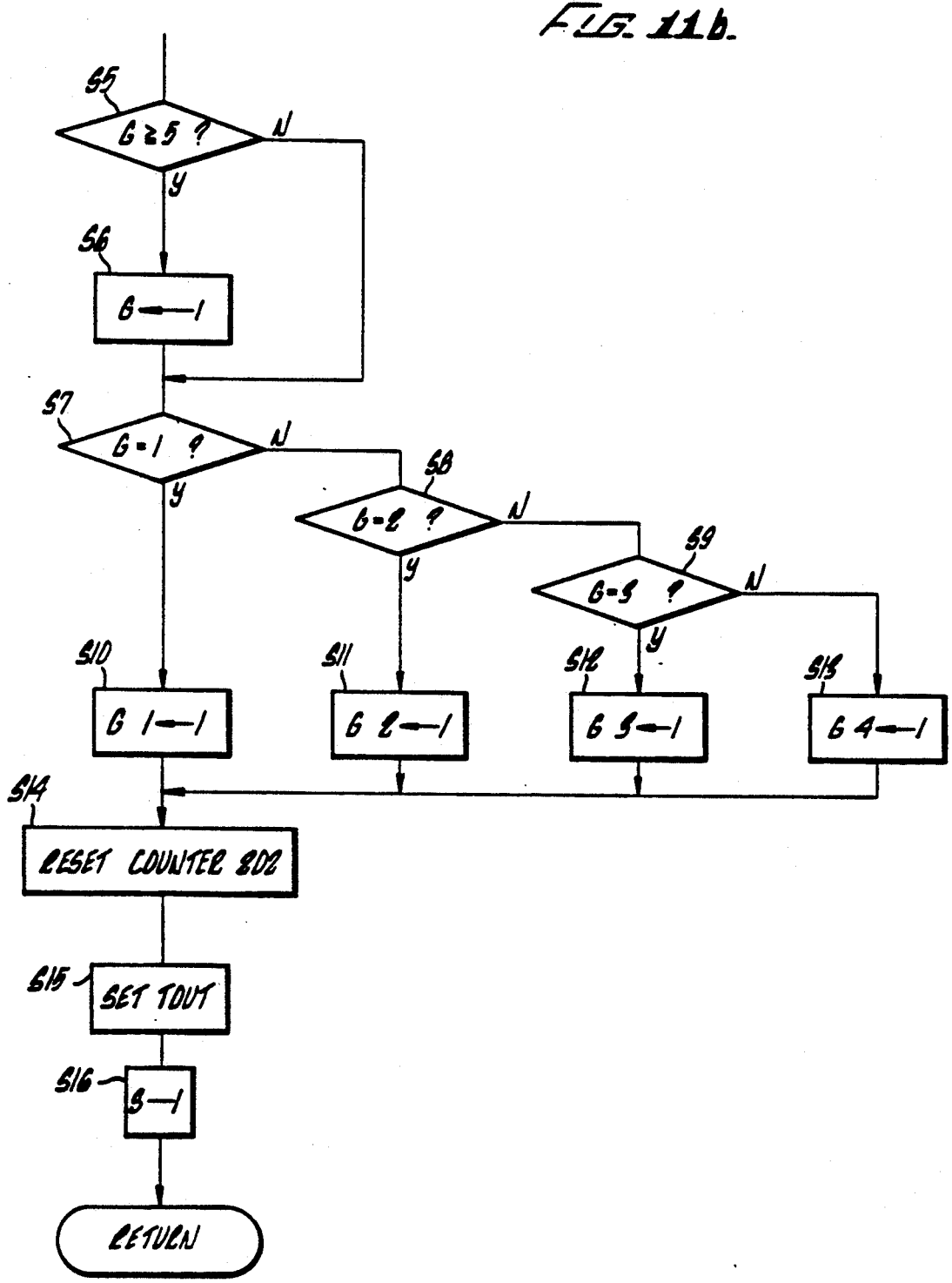
Figure 12:
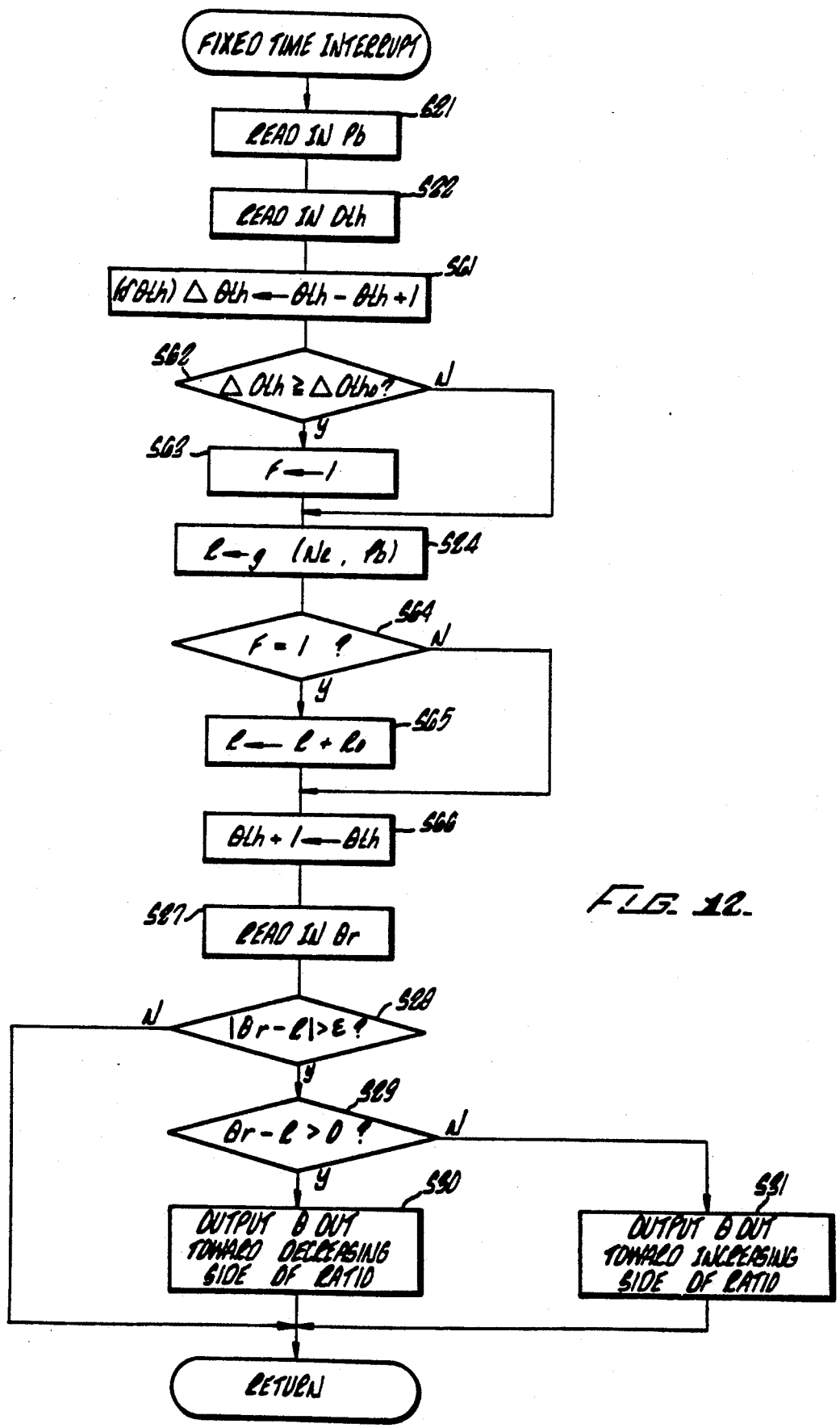
FIG. 12 illustrates fixed time interrupt control flow charts which illustrate operation of the second embodiment of the present invention.

FIGS. 11 and 12 are flow charts illustrating the operation of a second embodiment of the present invention. Ne interrupt control is illustrated in FIG. 11 while fixed time interrupt control is illustrated in FIG. 12. As mentioned above, in FIGS. 11 and 12, like reference numerals to those of other figures denote like or equivalent features.

Steps S1 to S3 are similar to steps S1 to S3 shown in FIG. 6. Subsequently, at step S51, an engine speed Ne+1 which was detected in the same process in the preceding control cycle is subtracted from the engine speed Ne detected in the process in the present control cycle, and a difference thus obtained is set to δNe. The δNe represents an increase of the engine speed Ne. (By the way, an upper case delta "Δ" and a lower case delta "δ" are used interchangeably throughout the drawings and specification; no significance is to be attached to any perceived difference between an upper case delta "Δ" and a lower case delta "δ".)

At step S52, it is determined whether or not the increase δNe is equal to or higher than a predetermined increase δNeo. In case the increase δNe increase is equal to or higher than the predetermined increase δNeo increase, a flag F is set to 1 at step S53. However, in case the increase Ne is lower than the predetermined increase δNeo, the flag F is set to 0 at step S54.

At step S55, it is determined whether or not the flag F is equal to 1. If the flag F is equal to 1, the process advances to step S57 by way of step S56, but if the flag F is equal to 0, then the process advances directly to step S57.

At step S56, a predetermined value (fixed value) To is added to the energization time Tout of an injector which is to be sent to a down counter 202 (FIG. 5).

At step S57, the engine speed Ne is set to Ne+1. Then, as shown in FIG. 11, the process advances to step S4, and steps following the step S4, wherein a count value G of a stage counter for designating which one of the injectors is to be energized is set, and then the injector designated by the count value G is energized for the energization time Tout set at step S3 or S56. Steps S4 through S16 have been discussed above.

In the fixed time interrupt control of FIG. 12, an intake pipe internal negative pressure Pb is read in at step S21. Then, at step S22, a throttle opening Θth is read in. At step S61, a throttle opening Θth+1 which was detected in the same process in the preceding control cycle is subtracted from the throttle opening Θth detected in the process in the present control cycle, and a difference thus obtained is set to δΘth. The δΘth represents an increase of the throttle opening Θth.

At step S62, it is judged whether or not the increase δΘth is equal to or greater than a predetermined increase δΘtho. In case the increase δΘth is equal to or higher than the predetermined increase δΘtho, the flag F is set to 1 at step S63, whereafter the process advances to step S24. However, if the increase δΘth is lower than the predetermined increase δΘtho, then the process advances directly to step S24.

At step S24, a target transmission gear ratio R is retrieved from a map wherein the engine speed Ne and the intake pipe internal negative pressure Pb are employed as variables.

At step S64, it is determined whether or not the flag F is equal to 1. In case the flag F is equal to 1, a predetermined value (fixed value) Ro is added to the target transmission gear ratio R at step S65, then the process advances to step S66. However, if the flag F is equal to 0, then the process advances directly to step S66.

At step S66, the throttle opening Θth is set to Θth+1. Then, as shown in FIG. 12, the process advances to step S27 and steps following step S27, wherein feedback control of an actual transmission gear ratio Θr is executed in a manner similar to that discussed with relation to FIG. 7.

In this manner, in the present embodiment, either when the throttle valve Θth is opened suddenly or when the engine speed Ne is raised suddenly, the energization time of an injector is set to a value higher than that upon low speed running, and the transmission gear ratio of the non-stage transmission is set to a value higher than that upon low speed running. As a result, when the engine speed Ne is raised suddenly or when the throttle valve Θth is opened suddenly, the acceleration performance of the vehicle is improved.

It should be noted that while it is described above that, in case the increase δΘth of the throttle opening Θth is lower than the predetermined increase δΘtho at step S62 of FIG. 12, the process advances directly to step S24 without setting the flag to 0, this is because the increase δNe of the engine speed Ne may sometimes be greater than the predetermined increase δNeo even if the increase δΘth of the throttle opening becomes lower than the predetermined increase δΘtho. In short, as long as the increase δNeo of the engine speed remains equal to or higher than the predetermined increase δNe, the flag remains set to 1, and as a result, addition of the predetermined value Ro to the transmission gear ratio R will be executed.

Figure 13:
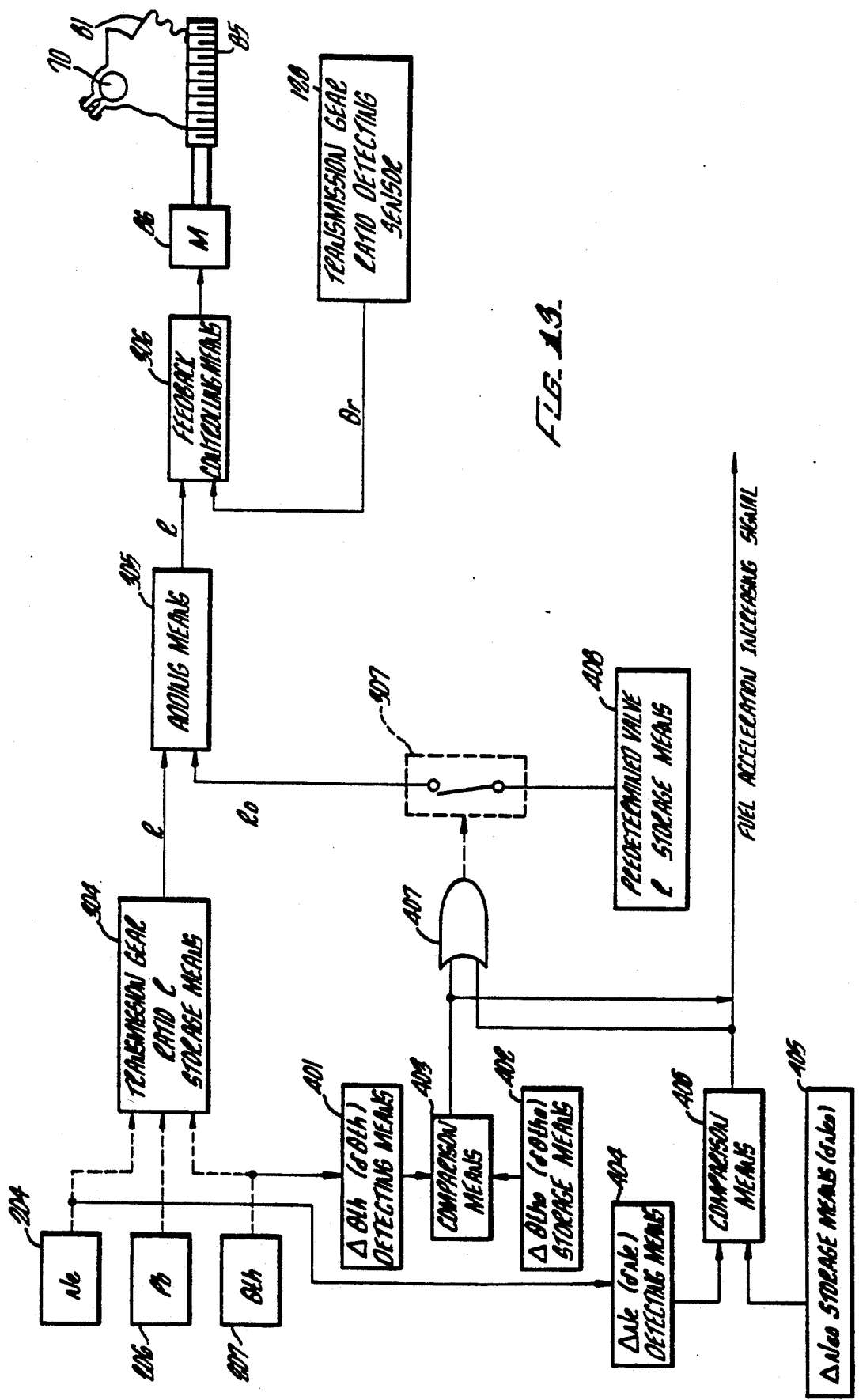
FIG. 13 is a functional block diagram of the second embodiment of the present invention.

FIG. 13 is a functional block diagram of the second embodiment of the present invention. In FIG. 13, like reference numerals to those of FIGS. 8 and 10 denote like or equivalent portions.

Referring to FIG. 13, a δΘth selecting means 401 detects, using a throttle opening Θth delivered from the Θth sensor 207, an increase δΘth, increase of the throttle opening Θth. The increase δΘth is received by a comparison means 403 together with a predetermined increase δΘtho stored in a δΘtho storage means 402. The comparison means 403 delivers a signal to one of a pair of input portions of an OR gate 407 when the increase δΘth of the throttle opening Θth is equal to or greater than the predetermined increase δΘtho.

A δNe detecting means 404 detects using an engine speed Ne delivered from the Ne sensor 204, an increase δNe of the engine speed Ne. Such ratio increase δNe is received by another comparison means 406 together with a predetermined increase δNeo stored in a δNeo storage means 405. The comparison means 406 delivers, when the increase δNe of the engine speed Ne is equal to or greater than the predetermined increase δNeo, a signal to the other input portion of the OR gate 407.

A switching means 307 is disposed between an adding means 305 and a predetermined value Ro storage means 408. When a signal is delivered from the OR gate 407, the switching means 307 interconnects the predetermined value Ro storage means 408 and the adding means 305. Consequently, the adding means 305 adds a transmission gear ratio R read out from the transmission gear ratio R storage means 304 and a predetermined value Ro stored in the predetermined value Ro storage means 408, and the thus added value is delivered to a feedback controlling means 306.

Each of output signals of the comparison means 406 and 403 is used as a fuel increasing signal for acceleration. In particular, although not shown, when a signal is delivered from the comparison means 406 or 403, a predetermined time To is read out from a storage means in which such predetermined value To is stored, and the predetermined time To is added to the energization time Tout. As a result, the amount of fuel to be injected from an injector is increased. Thus, in the present embodiment, when fuel flow is increased for acceleration, modification to a target engine speed is executed.

In the present embodiment, when either the engine speed Ne or the throttle opening Θth is increased suddenly, a predetermined value Ro is added to a target transmission gear ratio R read out from the transmission gear ratio R storage means 304. Naturally, however, a modification is possible such that a predetermined value Ro is added to a transmission gear ratio R only when one of the engine speed Ne or the throttle opening Θth is increased suddenly. Also, while the predetermined value Ro to be added to a transmission gear ratio R is a fixed value, it may also be a value which varies in accordance with δΘth or δNe.

A similar effect to that described can be obtained if the non-stage transmission is controlled to bring a target engine speed Rne determined by an engine load (for example, a throttle opening Θth) and an actual engine speed Ne into coincidence and, when either or both of the engine speed Ne and the throttle opening Θth is increased suddenly, a predetermined value Rone is added to the target engine speed Rne.

Figure 14B:
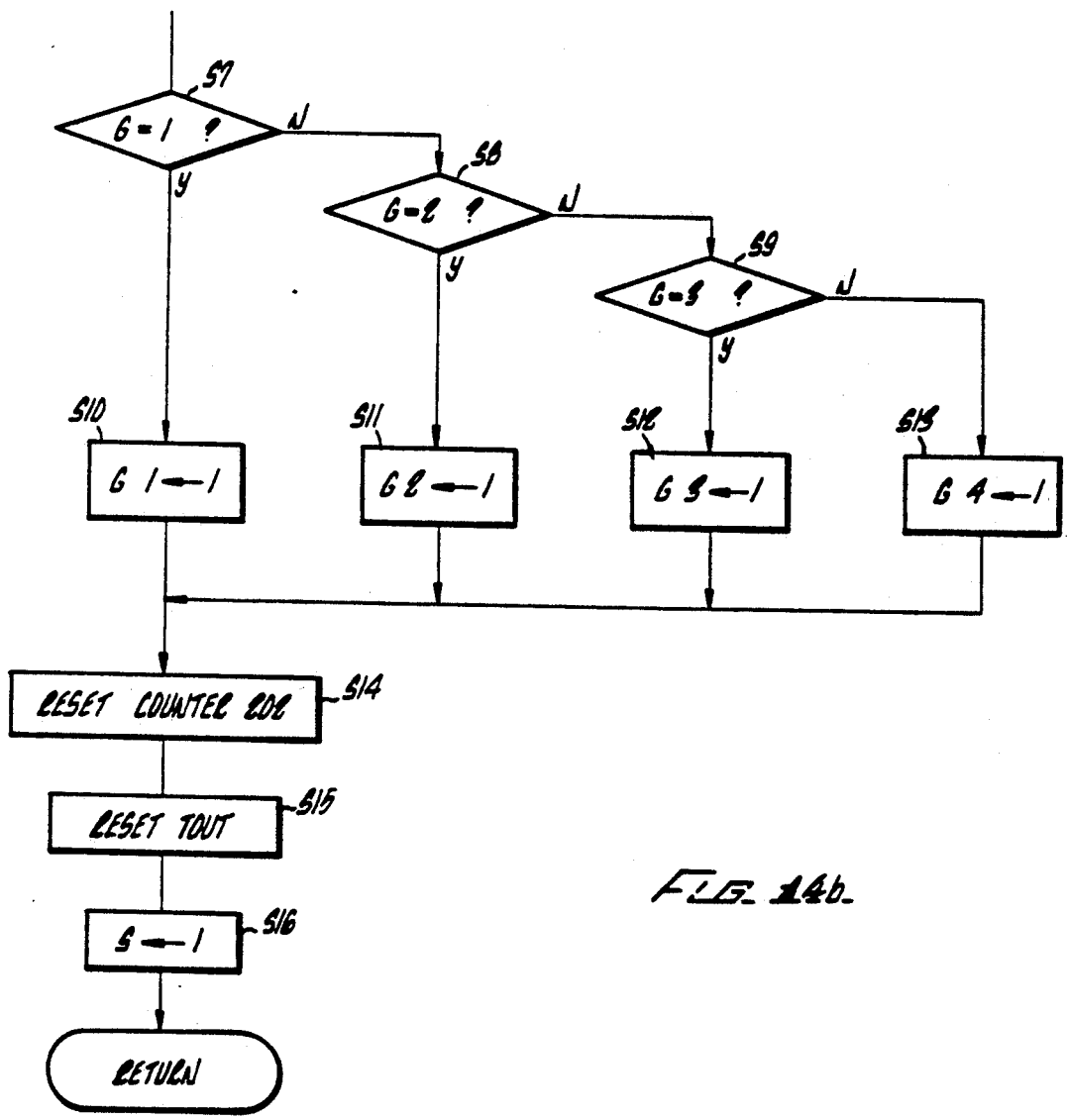
Figure 15A:
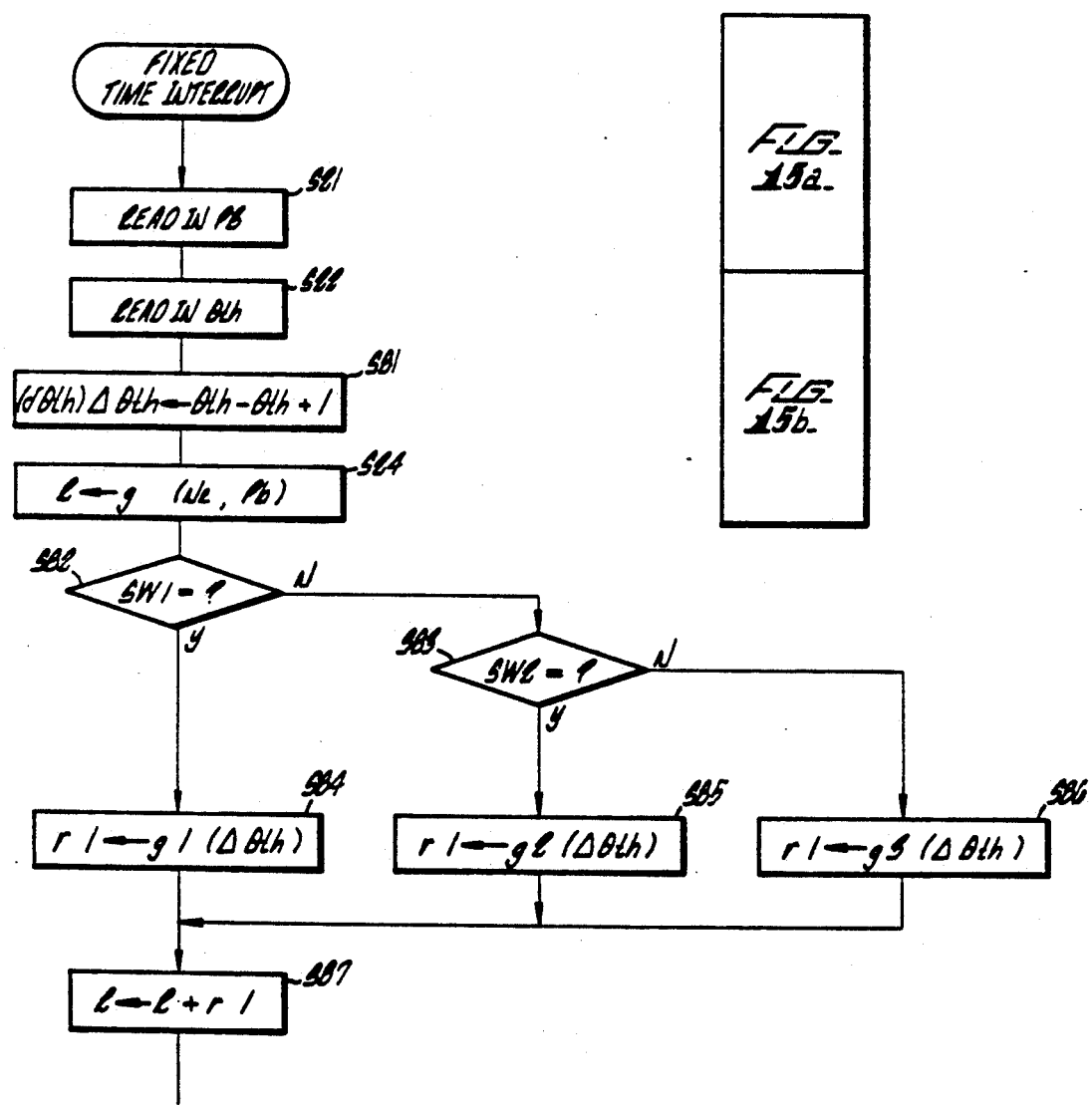
FIGS. 15A & 15B illustrates fixed time interrupt control flow charts which illustrate operation of the third embodiment of the present invention.
Figure 15B:
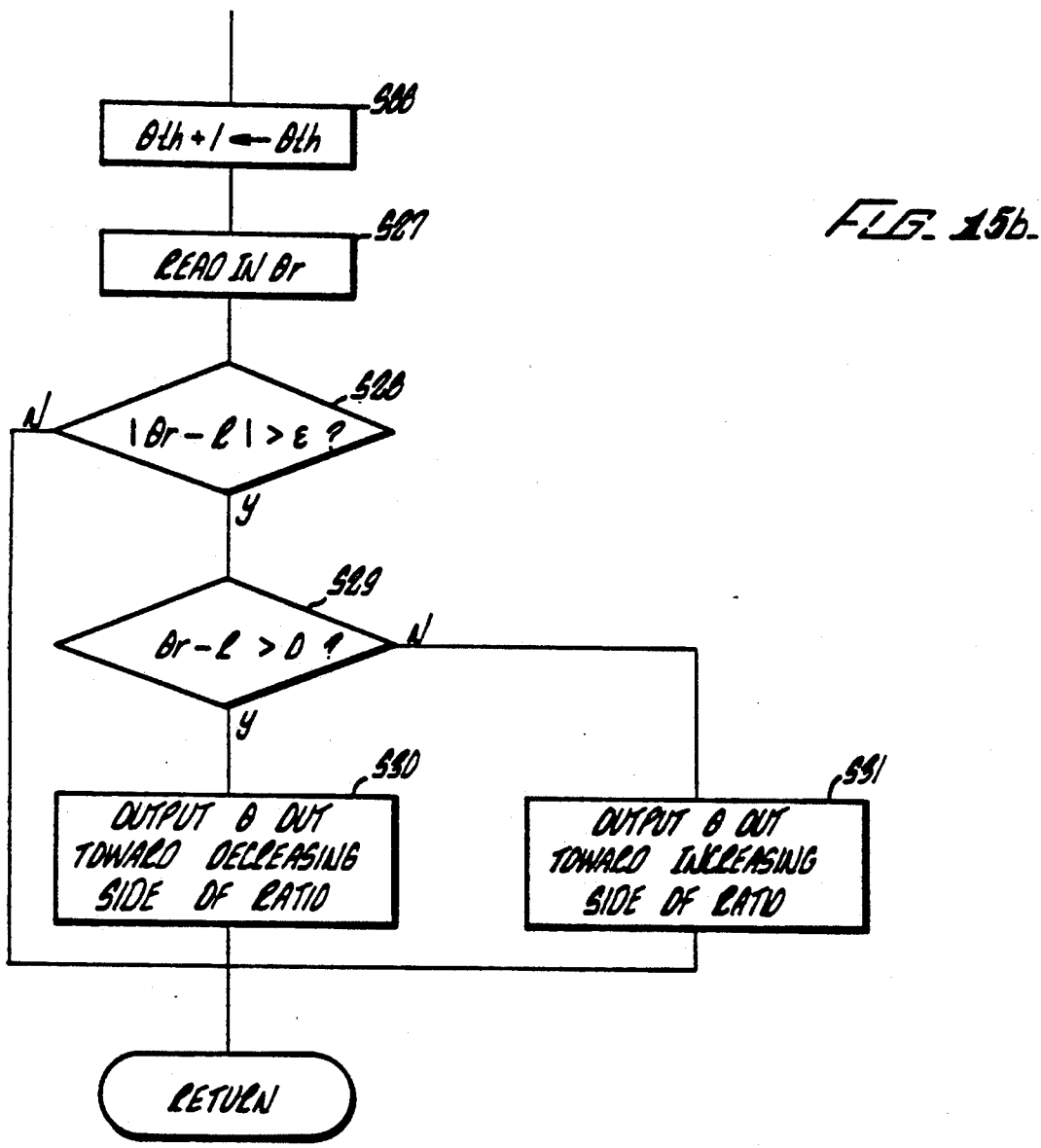

FIGS. 14 and 15 are flow charts illustrating the operation of a third embodiment of the present invention. Ne interrupt control is illustrated in FIG. 14 while fixed time interrupt control is illustrated in FIG. 15. In FIGS. 14 and 15, as discussed above, like reference numerals to those of other figures generally denote like or equivalent portions.

The third embodiment is applied to a vehicle which is provided with a plurality of running mode change-over switches 208 for designating a running mode of the vehicle, as described above with reference to FIG. 5. Control of the transmission gear ratio is changed in response to on/off states of the switches 208. The following description proceeds on the assumption that the vehicle is provided with three kinds of running mode designating switches, including a "sport running switch SW1," a "standard running switch SW2," and a "fuel cost save running switch SW3." Further, the three kinds of switches may be installed such that any one of them normally assumes an on-state.

Turning to FIG. 14, a detected time T representing a time between the detection of adjacent ones of a plurality of pawls provided in an equidistantly spaced relationship on a crankshaft of the vehicle is read in at step S1. At step S2, a reciprocal of the time T is set to be the engine speed Ne.

At step S71, it is determined whether or not the "sport running switch SW1" is in an on-state, that is, whether or not the running mode change-over switches 208 of FIG. 5 apply a battery voltage Vbat to a terminal sw1 of the microcomputer 201. If the switch SW1 is on, then an energization time Tout of an injector (any one of the first to fourth injectors 231 to 234) is retrieved, at step S73, from a first energization time map wherein the engine speed Ne and the throttle opening Θth are employed as variables (a map which is defined, for example, by a function f1(ne, Θth)).

If the "sport running switch SW1" is not on, then it is determined at step S72 whether or not the "standard running switch SW2" is on. If the switch SW2 is on, then an energization time Tout is retrieved, at step S74, from a second energization time map wherein the engine speed Ne and the throttle opening Θth are employed as variables (a map which is defined, for example, by a function f2(Ne, Θth)).

If at step S72 it is determined that the "standard running switch SW2" is not on, then the "fuel cost save running switch SW3" is on. If switch SW3 is on, then an energization time Tout is retrieved, at step S75, from a third energization time map wherein the engine speed Ne and the throttle opening Θth are employed as variables (a map which is defined, for example, by a function f3(Ne, Θth)).

Each energization time Tout stored in the first energization time map corresponding to a particular set of variables Ne, Θth is set to be longer than the corresponding time Tout stored in the second energization time map, and each energization time Tout stored in the second energization time map corresponding to a particular set of variables Ne, Θth is set to be longer than the corresponding time Tout stored in the third energization time map. Accordingly, if the "sport running switch SW1" is set in an on-state, then the acceleration performance is improved, but if the "fuel cost save running switch SW3" is set in an on-state, then fuel cost save running is enabled. An example of the first to third energization time maps where they are a function only of the engine speed Ne is shown in FIG. 16.

After completion of the processing of any one of the steps S73 to S75, the process advances to step S4 and steps following step S4, as shown in FIG. 14, wherein energization of a predetermined injector is executed. Step S4 and the steps following step S4 were discussed above.

In the fixed time interrupt control of FIG. 15, an intake pipe internal negative pressure Pb is read in at step S21. Then, at step S22 a throttle opening Θth is read in. At step S81, a throttle opening Θth+1 which was detected in the process in the preceding control cycle is subtracted from the throttle opening Θth detected in the process in the present control cycle, and a difference thus obtained is set to δΘth. At step S24, a target transmission gear ratio R is retrieved from a map wherein the engine speed Ne and the intake pipe internal negative pressure Pb are employed as variables.

At step S82, it is determined whether or not the "sport running switch SW1" is on. If the switch SW1 is on, then a predetermined value r1 which is to be added to the transmission gear ratio R at step S87 is read out, at step S84, from a first transmission gear ratio table wherein the an increase δΘth of the throttle opening Θth is employed as a variable (a table which is defined, for example, by a function g1(δΘth)). If the "sport running switch SW1" is not on, then it is determined at step S83 whether or not the "standard running switch SW2" is on. If the switch SW2 is on, then a predetermined value r1 is read out, at step S85, from a second transmission gear ratio table wherein the an increase δΘth, of the throttle opening Θth is employed as a variable (a table which is defined, for example, by a function g2(δΘth)). If at step S83 it is determined that the "standard running switch SW2" is not on, then the "fuel cost save running switch SW3" is on. If switch SW3 is on, the predetermined value r1 is read out, at step S86, from a third transmission gear ratio table wherein the ratio δΘth of increase of the throttle opening Θth is employed as a variable (a table which is defined, for example, by a function g3(δΘth)).

Each r1 stored in the first transmission gear ratio table described above corresponding to a particular value of δΘth is set to be greater than the corresponding r1 stored in the second transmission gear ratio table, and each r1 stored in the second transmission gear ratio table corresponding to a particular value of δΘth is set to be greater than the corresponding r1 stored in the third transmission gear ratio table. An example of the first to third transmission gear ratio tables is shown in FIG. 17.

After completion of the process of any one of the steps S84 to S86, the predetermined value r1 is added to the transmission gear ratio R at step S87. At step S88, the throttle opening Θth is set to Θth+1. Then, the process advances to step S27 and steps following step S27, wherein the transmission gear ratio of the non-stage transmission is feedback controlled so that the actual transmission gear ratio Θr of the non-stage transmission may become equal to the target transmission gear ratio R, as discussed above.

In this manner, in the present embodiment, if the "sport running switch SW1" is set on, then the acceleration performance is improved, but if the "fuel cost save running switch SW3" is set on, then fuel cost savings running is enabled.

Figure 18:
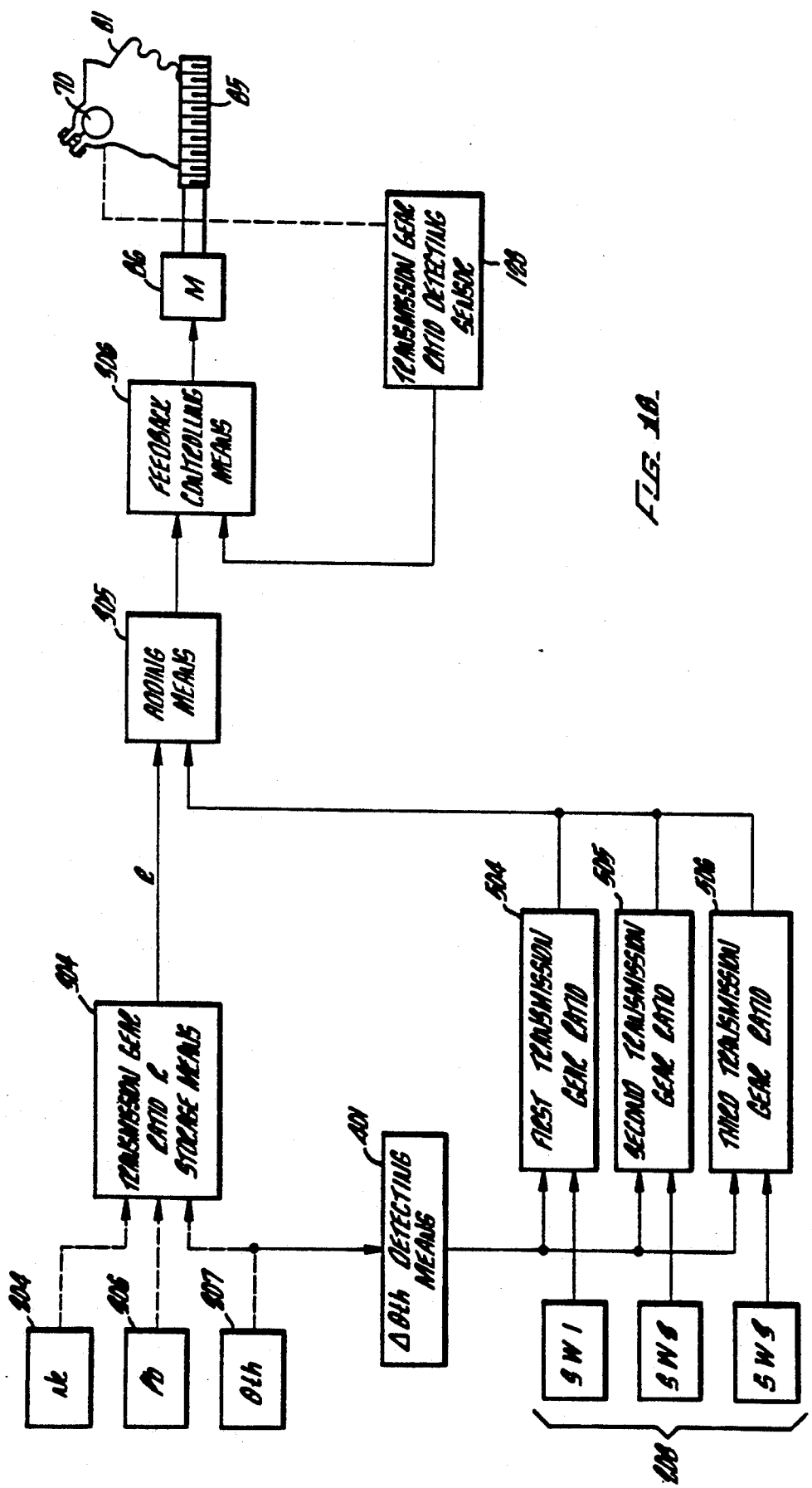
FIG. 18 is a functional block diagram of the third embodiment of the present invention.
Figure 19:
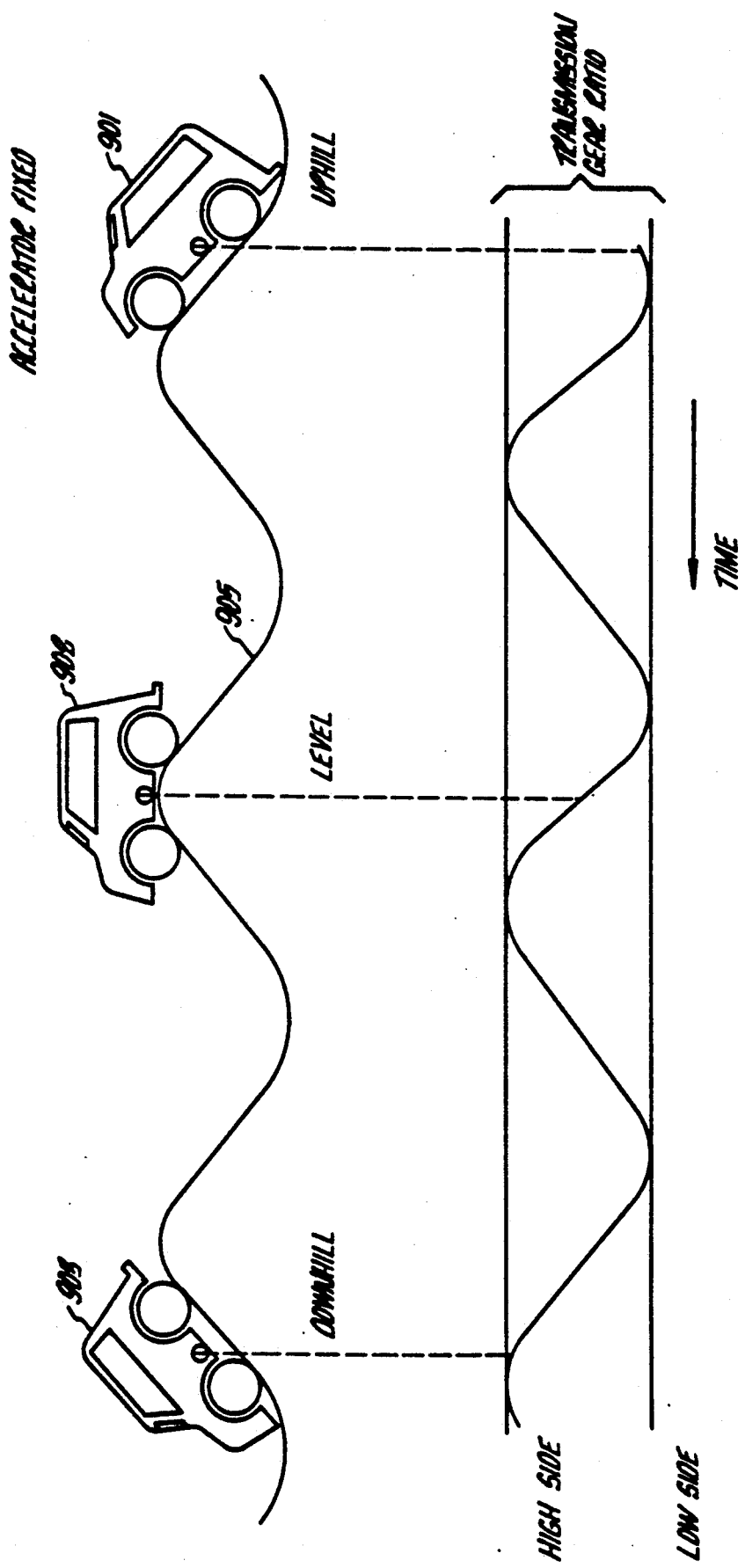
FIG. 19 is a view showing a relationship between a vehicle which runs on an uneven road surface while maintaining an accelerator fixed and a transmission gear ratio of a non-stage transmission carried on the vehicle.
Figure 20:
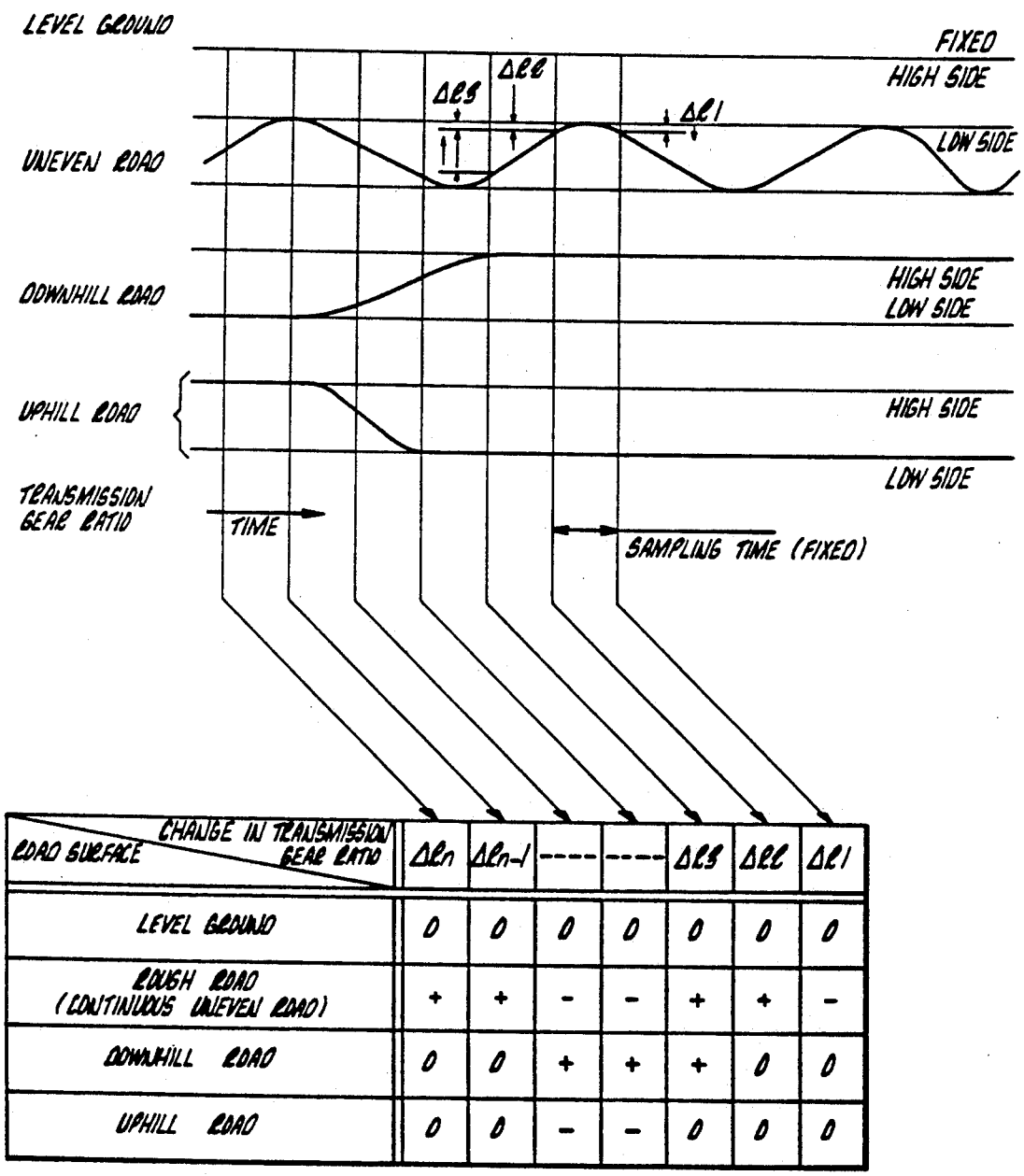
FIG. 20 is a view showing a change in transmission gear ratio when a vehicle runs on a level ground, a rough road, a downhill road and an uphill road while maintaining an accelerator fixed.

FIG. 18 is a functional block diagram of the third embodiment of the present invention. In FIG. 18, like reference numerals to those of FIGS. 8, 10, or 13 denote like or equivalent portions, as discussed above.

Referring to FIG. 18, the running mode change-over switches 208 consisting of the sport running switch SW1, standard running switch SW2 and fuel cost save running switch SW3 are connected to first to third transmission gear ratio tables 504 to 506, respectively. Values r1 to be added to a transmission gear ratio R in accordance with an increase δΘth of the throttle opening as shown in FIG. 17 are stored in the first to third transmission gear ratio tables 504 to 506.

If one of the switches SW1 to SW3 is selected (i.e., turned on), an r1 corresponding to an increase δΘth of a throttle opening Θth detected by the δΘth detecting means 401 is read out from the one of the tables 504 to 506 corresponding to the selected switch. The r1 is delivered to the adding means 305 and added to a transmission gear ratio R read out from the transmission gear ratio R storage means 304.

While, in the present embodiment, the running mode change-over switches 208 are provided for the designation of the three running modes, naturally the running mode change-over switches 208 may otherwise be provided for a designation of two kinds, or four or more kinds, of running modes.

FIG. 1 is a functional block diagram illustrating an example of the basic construction of the present invention. Referring to FIG. 1, an engine output power forecasting means 601 is a means for forecasting a condition of an output power of an engine of the vehicle, and corresponds, with regard to the individual embodiments described above, to the Pa sensor 205 for forecasting a decrease of the output power of the engine, to the δΘth detecting means 401 for forecasting acceleration running, to the δNe detecting means 404, or else to the running mode designating switches 501 to 503 for setting a running condition of the vehicle. If a condition of the output power of the engine is forecast by the engine output power forecasting means 601, then a predetermined transmission gear ratio addition amount is read out from a transmission gear ratio addition amount storage means 602 in response to the forecast condition, and the predetermined transmission gear ratio addition amount is transmitted to an adding means 305. Such a transmission gear ratio addition amount read out from the transmission gear ratio addition amount storage means 602 may be either a fixed value or a value which is determined in accordance with a condition of the output power of the engine.

As is apparent from the individual embodiments described above, a predetermined value is added to a transmission gear ratio R when there is the necessity of increasing the output power of the engine. Accordingly, in such a case, the energization time of an injector may be modified by an amount corresponding to a predetermined value to be added to a transmission gear ratio R after calculation of the value. In this instance, the modification to the energization time of an injector need not be made using various parameters of the vehicle, and accordingly, the load to the calculating device for controlling the vehicle is moderated.

Furthermore, while in the individual embodiments described above a correction amount corresponding to a forecast running condition is described as being added to a target transmission gear ratio R read out in response to an engine speed Ne, an intake pipe internal negative pressure Pb, a throttle opening Θth or the like to find out a target transmission gear ratio which is to be used in feedback control of the non-stage transmission, naturally a correction value set in response to a forecast running condition may otherwise be accumulated, for example, on a target transmission gear ratio R.

The non-stage transmission may be feedback controlled so that a target engine speed Rne which is determined in accordance with an engine load (for example, a throttle opening Θth) and an actual engine speed Ne may coincide with each other, in which control a correction amount corresponding to a forecast running condition is added to or accumulated on the target engine speed Rne.

Instead of the addition or the accumulation of a correction value, a target transmission gear ratio for actual feedback control may be determined directly from a detection map of the target transmission gear ratio R, which detection map is produced in advance employing a forecast running condition as a variable. Parameters such as the engine speed Ne, intake pipe internal negative pressure Pb, throttle opening Θth and so forth, may be used as additional variables.

Further, while the preferred embodiments of the present invention were described as being applied to a non-stage transmission which is composed of cam plate type fixed delivery hydraulic pump and a cam plate type variable delivery hydraulic motor, the present invention is not particularly limited to this and may naturally be applied to a non-stage transmission which is composed of two pulleys the width of grooves of which is adjusted by a hydraulic pressure and an endless belt stretched between and around the pulleys (as described below), or to such a toroidal non-stage transmission as is disclosed in the official gazette of Japanese Patent Laid-Open No. 62-273189, or the like.

It should be noted that, in the case of a non-stage transmission which is composed of two pulleys the width of grooves of which is adjusted by a hydraulic pressure and an endless belt stretched between and around the pulleys, a spool valve is moved to adjust the hydraulic force in an oil passage connected to each of the pulleys thereby to make an adjustment of the width of the groove of each pulley, and even if a position of each spool valve is detected, an actual transmission gear ratio cannot be found out accurately. Accordingly, in this instance, a rotational speed of the driving pulley and a rotational speed of the driven pulley may actually be measured so that a ratio between them may be adopted as an actual transmission gear ratio.

As apparent from the foregoing description, according to the present invention, the following effects can be attained.

Since a non-stage transmission is controlled in accordance with a forecast running condition before an actual running condition of a vehicle is detected, control of the vehicle can promptly respond in accordance with a will of a driver. In short, a delay in response in control of the transmission gear ratio of the non-stage transmission is eliminated, and much time is not required until the vehicle is brought into a running condition intended by the driver. As a result, the driving performance of the vehicle is improved.

Since the forecasting of a running condition is effected by detecting a condition wherein the output power of the engine is decreased necessarily, a possible deterioration of the running performance because of such decrease of the output power of the engine can be prevented. Since the condition wherein the output power of the engine is decreased necessarily is detected by detecting an atmospheric pressure, the forecasting of a decrease in the output power of the engine can be effected readily, and an additional sensor is not required. As a result, the construction of the vehicle can also be simplified.

Furthermore, since the forecasting of a running condition is made by detecting an increasing amount of fuel for acceleration, the acceleration response of the vehicle can be improved. Since a detection of an increasing amount of fuel for acceleration is achieved using at least one of an of increase of the throttle opening and a ratio of increase of the engine speed, a detection of a increasing flow of fuel for acceleration can be achieved readily, and an additional sensor is not required. As a result, the construction of the vehicle is simplified.

In addition, since a running condition of the vehicle is forecast in response to a condition of a running mode setting switch, running of the vehicle can be made appropriately in accordance with the will of a driver.

An alternate construction of a non-stage transmission will now be described with reference to FIG. 21.

Figure 21:
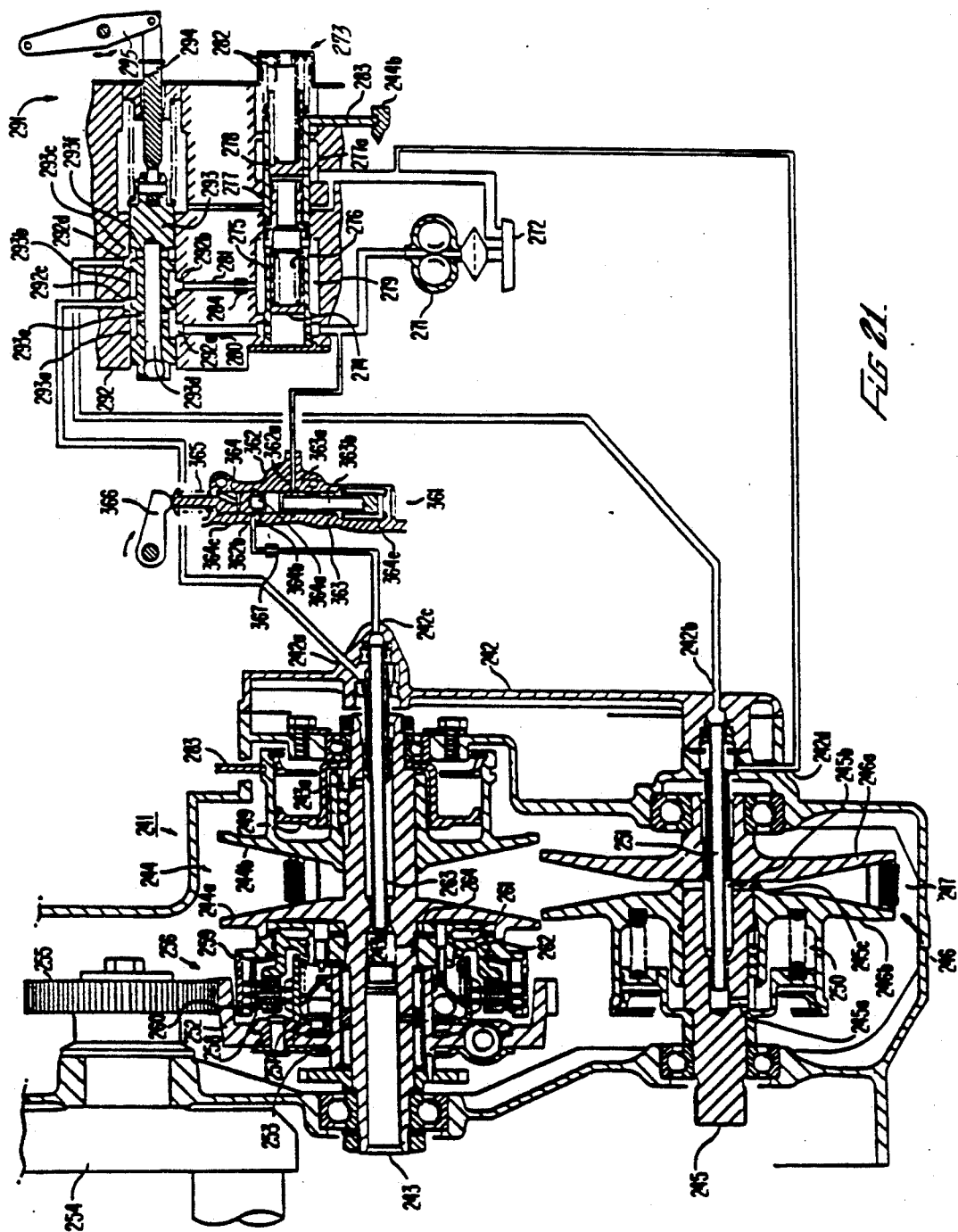
FIG. 21 is a view showing a construction of a non-stage transmission which is applied to the fourth embodiment of the present invention.

Referring to FIG. 21, the non-stage transmission 241 is constructed in a casing 242, and an endless belt 247 extends between and around a driving pulley 244 provided on a driving shaft 243 on the upper side in the figure and a driven pulley 246 provided on a driven shaft 245 on the lower side in the figure.

The driving pulley 244 is divided into two elements including a fixed side pulley half 244a integral with the driving shaft 243 and a movable side pulley half 244b separate from the driving shaft 243, and the movable side pulley half 244b is mounted for movement in the directions of arrow marks A and B in accordance with a pressure of oil supplied into a pressure chamber 249 on the rear side of the movable side pulley 244b while being prevented from rotation relative to the driving shaft 243. Accordingly, the width of a groove of the driving pulley 244 is adjusted by controlling the pressure of oil supplied into the pressure chamber 249. An introducing passage of such oil pressure is formed by an inlet port 242a formed in the casing 242, and the hollow inside and a perforation 243a of the driving shaft 243 so that an oil pressure may be introduced from the outside into the inside of the casing 242 whether the driving shaft 243 is rotating or not.

Meanwhile, the driven pulley 246 is divided into two elements including a fixed side pulley half 246a integral with the driven shaft 245 and a movable side pulley half 246b separate from the driven shaft 245, and the movable side pulley half 246b is mounted for movement in the directions indicated by the arrow marks A and B in accordance with a pressure of oil supplied into a pressure chamber 250 on the rear side of the movable side pulley half 246b while being prevented from rotation relative to the driven shaft 245. Accordingly, the width of a groove of the driven pulley 246 can be adjusted by controlling the pressure of oil supplied into the pressure chamber 250. An introducing passage of such oil pressure is formed by an inlet port 242b formed in the casing 242 and a feed pipe 251 in the hollow inside of and a perforation 245a in the driven shaft 245 so that an oil pressure may be introduced from the outside into the inside of the casing 242 whether the driven shaft 245 is rotating or not.

Meanwhile, a rotary member 253 to which a gear wheel 252 is attached is fitted for rotation on the left-hand side of the driving shaft 243, and the gear 252 is held in meshing engagement with a gear wheel 255 mounted on a crankshaft 254 of the engine. A clutch 256 is constructed between the rotary member 253 and the driving shaft 243. The clutch 256 includes a friction plate 258 on the side of a clutch inner member 257 provided on the rotary member 253 and another friction plate 260 on the side of a clutch outer member 259 provided on the driving shaft 243. The friction plates 258 and 260 are disposed in an opposing relationship to each other. Thus, as pressure oil is introduced into a pressure chamber 261 provided on the driving shaft 243 side, a clutch piston 262 in the pressure chamber 261 is moved in the direction of the arrow mark A to contact the friction plates 258 and 260 strongly with each other. Naturally, when oil of a high pressure is introduced into the pressure chamber 261 to contact the friction plates 258 and 260 strongly with each other, the clutch 256 is engaged so that the turning force of the engine is transmitted from the rotary member 253 to the driving shaft 243. An introducing passage of pressure oil into the pressure chamber 261 is formed from an inlet port 242c formed in the casing 242, a feed pipe 263 in the hollow inside of the driving shaft 243 and a perforation 243b formed in the driving shaft 243, and a pressure oil flow passage 264, so that pressure oil may be introduced from the outside of the casing 242 into the inside of the pressure chamber 261 whether the driving shaft 243 is rotating or not.

Further, an oil supply passage to the endless belt 247 is formed in the driven shaft 245. In particular, pressure oil from an inlet port 242d formed in the casing 242 is introduced into a flow passage 245b in the driven shaft 245 and then discharged from a perforation 245c extending in a diametrical direction of the driven shaft 245 to the endless belt 247 side by a centrifugal force.

In this manner, several associated mechanisms are provided in the casing 242 together with the non-stage transmission 241.

An example of construction of a fourth embodiment of the present invention wherein the non-stage transmission 241 is an object for control will be described below. The controlling device includes a mechanical section and an electrical section. Thus, at first, the mechanical section will be described with reference to FIG. 21.

In FIG. 21, reference numeral 271 denotes a pump as a pressure oil supply source, 272 a tank, and 273 a low/- high pressure setting section (pressure oil supplying section), and the low/high pressure setting section 273 admits pressure oil from the pump 271, changes two oil pressures including a high pressure and a low pressure while maintaining a fixed difference between them, and supplies the pressure oil of the high and low pressures to a change-over valve 291 which will be described below. The low/high pressure setting section 273 includes a cylinder 275 the inside of which is divided into two parts by a pressure difference regulator piston (hereafter referred to as "first piston") 274, and the left-hand side part in the cylinder 275 serves as a high pressure chamber while the right-hand side part serves as a low pressure chamber. The first piston 274 is urged leftwardly toward the high pressure chamber side by a pressure difference regulator spring (hereafter referred to as "first spring") 276, and the left-hand end of the high pressure chamber is closed by a casing while the right-hand end of the low pressure chamber is closed by a movable sleeve 277 and a ratio interlocking regulator piston 278. In such a combination as described above, as pressure oil from the pump 271 is introduced into the high pressure chamber, the pressure oil causes the first piston 274 to slide rightwardly against the first spring 276 and is thus introduced into the rightward low pressure chamber through a flow passage 279 which is communicated with the low pressure chamber by such sliding movement of the first piston 274. Accordingly, the pressure of oil supplied from within the high pressure chamber through a high pressure line 280 is higher by an amount corresponding to the urging force of the first spring 276 than the pressure of oil supplied from within the low pressure chamber through a low pressure line 281. In short, oil of pressures including a high pressure and a low pressure which have a fixed difference in pressure will be supplied.

Further, the movable sleeve 277 and the ratio interlocking regulator piston 278 which close up the low pressure chamber in the cylinder 275 can adjust the pressure of oil in the low pressure chamber. In particular, the movable sleeve 277 is fitted on the outer side of the cylinder 275 for sliding movement in the leftward and rightward directions, and the ratio interlocking regulator piston (hereafter referred to as the "second piston") 278 is fitted on the inner side of the movable sleeve 277 for sliding movement in the leftward and rightward directions. Further, the second piston 278 is urged leftwardly by a ratio interlocking regulator spring (hereafter referred to as the "second spring") 282. When the pressure of oil in the low pressure chamber becomes higher than a predetermined level, the oil pressure causes the second piston 278 to slidably move rightwardly against the second spring 282, and the pressure oil is thus relieved into the tank 272 through a perforation 277a in the movable sleeve 277 which is opened by such sliding movement of the second piston 278. Accordingly, the pressure of oil in the low pressure chamber coincides with the urging force of the second spring 282 when the perforation 277a is open. Since the position of the perforation 277a can be adjusted by slidably moving the movable sleeve 277, the pressure of oil in the low pressure chamber can be adjusted in accordance with the position of the perforation 277a.

Thus, the low/high pressure setting section 273 changes two oil pressures of a high pressure and a low pressure in accordance with the sliding position of the movable sleeve 277 while maintaining the difference between the high and low pressures fixed and supplies the oil of the high and low pressures to the change-over valve 291.

Figure 22:
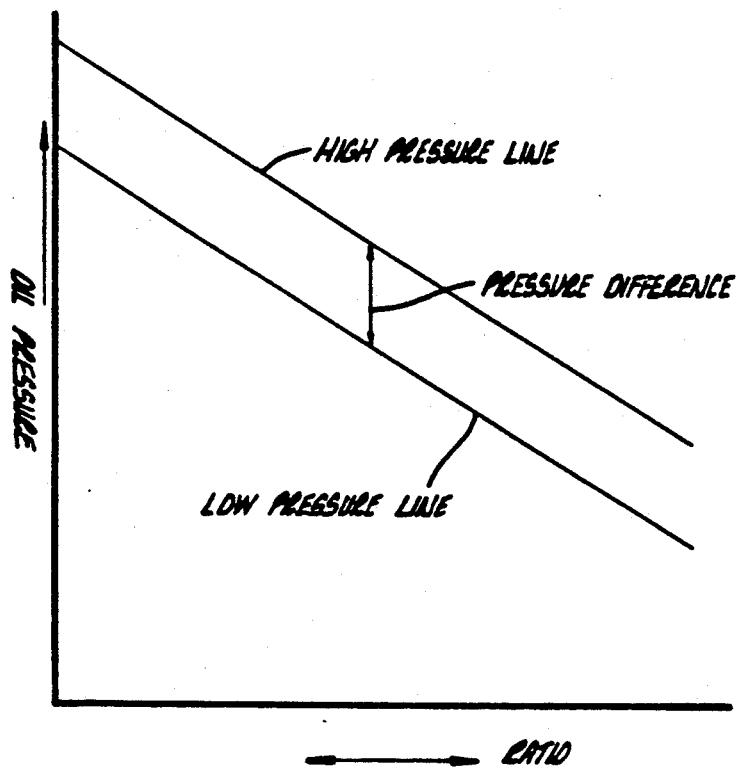
FIG. 22 is an explanatory view of a relationship between a low pressure and a high pressure led out from a low/high pressure setting section of the non-stage transmission shown in FIG. 21.

The movable sleeve 277 is connected to the movable side pulley half 244b of the driving pulley 244 of the non-stage transmission 241 described above. Accordingly, the two oil pressures of a high pressure and a low pressure will vary in response to movement of the movable side pulley half 244b while maintaining a predetermined difference in pressure. In particular, when the movable side pulley half 244b is moved in the direction of the arrow mark A to reduce the width of the groove of the driving pulley 244, that is, when the diameter of a portion of the driving pulley 244 with which the endless belt 247 is engaged is increased to increase the transmission gear ratio, the movable sleeve 277 is moved in the direction of the arrow mark A so that the two high and low oil pressures are lowered while maintaining the fixed pressure difference between them. Contrarily, when the movable side pulley half 244b is moved in the direction of the arrow mark B so that the width of the groove of the driving pulley 244 is increased, that is, when the diameter of a portion of the driving pulley 244 with which the endless belt 247 is engaged is decreased so that the transmission gear ratio is decreased, the movable sleeve 277 is moved in the direction of the arrow mark B so that the two high and low oil pressures are increased while maintaining the fixed pressure difference between them. Such a relationship is illustrated in FIG. 22. It should be noted that reference numeral 284 in FIG. 21 denotes an orifice provided in the low pressure line 281, and the orifice 284 restricts a flow rate of pressure oil.

The change-over valve 291 to which pressure oil from the low/high pressure setting section 273 having such a construction as described above is supplied is constructed in the following manner. The change-over 291 makes a changing over operation by slidably moving a spool 293 in the leftward or rightward direction within a cylinder 292. The cylinder 292 has provided therein a pair of inlet ports 292a and 292b which are connected to the high and low pressure lines 280 and 281, respectively, from the low/high pressure setting section 273 and a pair of outlet ports 292c and 292d which are connected to the inlet ports 242a and 242b of the casing 242 of the non-stage transmission 241 described above. The spool 293 has first, second and third ring grooves 293a, 293b and 293c formed on an outer periphery thereof and has an oil passage 293d formed in axial portion thereof. The first and third ring grooves 293a and 293c are communicated with the oil passage 293d by way of a pair of perforations 293e and 293f, respectively. An end of a link 295 is connected to the right-hand end of the spool 293 by way of a rod 294, and the spool 293 is slidably moved in the leftward or rightward direction by pivoting the other end of the link 295 in the direction indicated by an arrow mark by a stepping motor 371.

The change-over valve 291 can be changed over among three positions by slidably moving the spool 293 leftwardly or rightwardly from a neutral position as shown in the figure. In particular, when the change-over valve 291 is in its neutral position as shown in the figure, a series of flow passages communicating from the inlet port 292a of the high pressure line 280 to the first ring groove 293a and outlet port 292c are formed while another series of flow passages communicating from the first ring groove 293a to the perforation 293e, oil passage 293d, perforation 293f, third ring groove 293c and outlet port 292d are formed. Accordingly, when the change-over valve 291 is in its neutral position, a high pressure from the high pressure line 280 is supplied to both of the inlet port 242a on the driving pulley 244 side and the inlet port 242b for the driven pulley 246. Further, when the spool 293 is slidably moved in the rightward direction, a flow passage communicating from the inlet port 292a of the high pressure line 280 to the outlet port 292c by way of the first ring groove 293a is formed while another flow passage communicating from the inlet port 292b of the low pressure line 281 to the outlet port 292d by way of the second ring groove 293b is formed. Accordingly, when the spool 293 is in the rightwardly slid position, a high pressure from the high pressure line 280 is supplied to the inlet port 242a on the driving pulley 244 side while a low pressure from the low pressure line 281 is supplied to the inlet port 242b for the driven pulley 246. Contrarily, when the spool 293 is slidably moved leftwardly, a flow passage communicating from the inlet port 292a of the high pressure line 280 to the outlet port 292d by way of the first ring groove 293a, perforation 293e, oil passage 293d, perforation 293f and third ring groove 293c is formed while another flow passage communicating from the inlet port 292b of the low pressure line 281 to the outlet port 292c by way of the second ring groove 293b is formed. Accordingly, when the spool 293 is in the leftwardly slid position, a low pressure from the low pressure line 281 is supplied to the inlet port 242a on the driving pulley 244 side while a high pressure from the high pressure line 280 is supplied to the inlet port 242b of the driven pulley 246.

Figure 23:
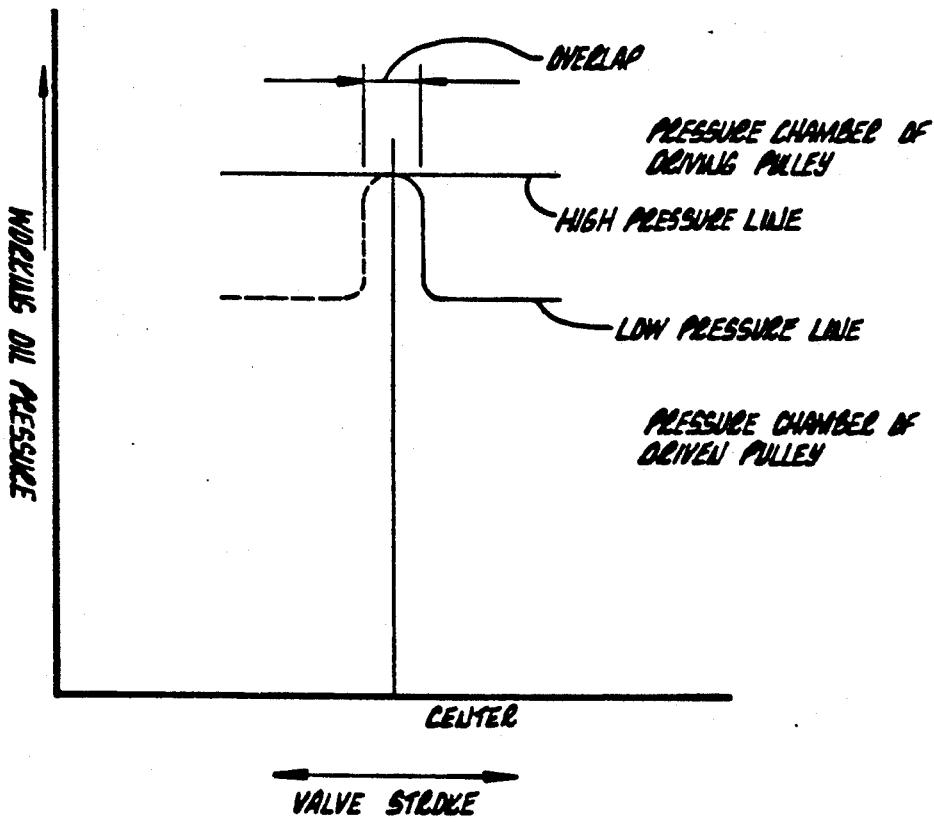
FIG. 23 is an explanatory view of a relationship between the high pressure and the low pressure which are changed over by a change-over valve of the non-stage transmission shown in FIG. 21.

A relationship between these three change-over positions of the change-over valve 291 and sliding movement of the spool 243 is illustrated in FIG. 23.

A clutch change-over valve 361 is connected between the pump 271 and the inlet port 242c for introducing pressure oil into the clutch 256 described above. The clutch change-over valve 361 includes a piston 363 on the lower side in FIG. 21 and another piston 364 on the upper side in the same figure both provided in a casing 362, and the piston 363 is urged upwardly by a spring 364e while the other piston 364 is urged upwardly by another spring 365. The top end of the upper side piston 364 extends outwardly of the casing 362 s that the upper side piston 364 may be moved downwardly by pivotal motion of an arm 366 which is interlocked with a clutch lever (not shown). In a condition shown in the figure, the pistons 363 and 364 are positioned at limit positions in the upward direction, and the pistons 363 and 364 are positioned in a vertically spaced relationship by a predetermined distance.

In the condition shown in the figure, the clutch 256 is engaged. In particular, pressure oil supplied from the pump 271 by way of an inlet port 362a is introduced into the inlet port 242c of the clutch 256 successively passing through an opening 363a of the lower side piston 363, an oil passage 364a in the upper side piston 364, an opening 364b of the piston 364 and an outlet port 362b, and consequently, the friction plates 258 and 260 are contacted strongly with each other to engage the clutch 256. Contrarily, when the clutch 256 is to be disengaged, the clutch lever will be operated to pivot the arm 366 downwardly. In particular, the upper side piston 364 is moved downwardly by such pivotal motion of the arm 366 so that the opening 364b of the piston 364 is displaced from the opposing position to the outlet port 362b to interrupt supply of pressure oil to the clutch 256. Then, an oil relief hole 364c formed in the piston 364 comes into an opposing relationship to the outlet port 362b and, consequently, pressure oil in the clutch 256 is removed to disengage the clutch 256. When the clutch 256 is to be engaged again, the operation of the clutch lever should be canceled to restore the condition shown in the figure.

It should be noted that the clutch change-over valve 361 in the present example is constructed such that it may maintain the pressure of oil to be introduced into the clutch 256 at a predetermined pressure. In particular, in case the pressure of oil to be introduced from the pump 271 is excessively high, the pressure within the oil passage 363b of the lower side piston 363 is increased to move the piston 363 downwardly against the spring 364. Consequently, the opening 363a of the piston 363 is displaced out of the opposing position to the inlet port 362a to automatically control introduction of pressure oil. It should be noted that reference numeral 367 in FIG. 21 denotes an orifice provided in a pressure oil passage between the clutch change-over valve 361 and the clutch 256, and the orifice 367 restricts the flow rate of pressure oil.

Operation of such a mechanical section as described above will now be described in summary.

The mechanical section makes an adjusting operation of the transmission gear ratio of the non-stage transmission 241 as the spool 293 of the change-over valve 291 is adjustably moved by the stepping motor 371. The stepping motor 371 itself is controlled by the electric section which will be described below. The electric section calculates, in response to a throttle opening, an ideal engine speed from data stored in advance therein, and then compares the ideal engine speed with an actual engine speed to develop a driving signal for the stepping motor 371 in accordance with a difference between the ideal and actual engine speeds. The spool 293 of the change-over valve 291 is moved in the leftward or rightward direction in response to the driving signal.

Consequently, oil pressures of a low pressure and a high pressure are selectively supplied to the driving pulley 244 side and the driven pulley 246 side to change the transmission gear ratio of the non-stage transmission 241. As the transmission gear ratio is changed in this manner, the load applied to the engine is varied to adjust the engine speed to the ideal engine speed.

Then, when the actual engine speed reaches the ideal engine speed, the spool 293 assumes the neutral position shown in the figure, and the high oil pressure is supplied to both of the driving pulley 244 side and the driven pulley 246 side. Consequently, predetermined lateral pressures are applied to the pulleys 244 and 246 so that the transmission gear ratio of the non-stage transmission is maintained as it is. Contrarily, by operating the clutch lever to pivot the arm 366 of the clutch change-over valve 361 upwardly or downwardly, the clutch 256 is engaged or disengaged in whichever gear position the non-stage transmission 241 is set.

Further, in addition to such operation as described above, control is also executed such that the actual transmission gear ratio may coincide with a predetermined target transmission gear ratio, as will now be described. The construction of a fourth embodiment wherein a non-stage transmission as described above is controlled will now be described.

Figure 24:
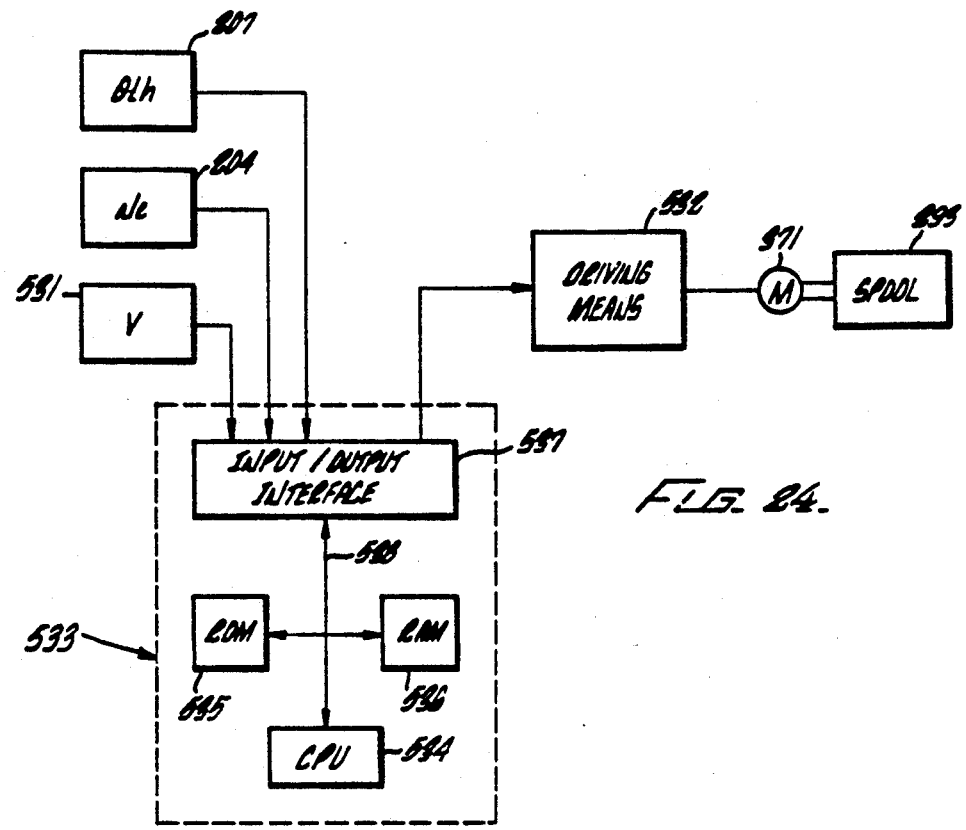
FIG. 24 is a block diagram showing construction of the fourth embodiment of the present invention.

FIG. 24 is a block diagram showing the construction of the fourth embodiment of the present invention.

Referring to FIG. 24, an engine speed Ne sensor 204 detects a rotational speed of the driving pulley 244 while a car speed V sensor (hereafter referred to as "V sensor") 531 detects a rotational speed of the driven pulley 246. The Ne sensor 204 and the V sensor 531 as well as a throttle opening Θth sensor 207 are connected to a microcomputer 533 which controls the vehicle. The microcomputer 533 has, as is well known in the art, a CPU 534, a ROM 535, a RAM 536, an input/output interface 537 and a common bus 538 which interconnects the components. The stepping motor 371 for controlling the position of the spool 293 is connected to the microcomputer 533 by way of a driving means 532.

Figure 25:
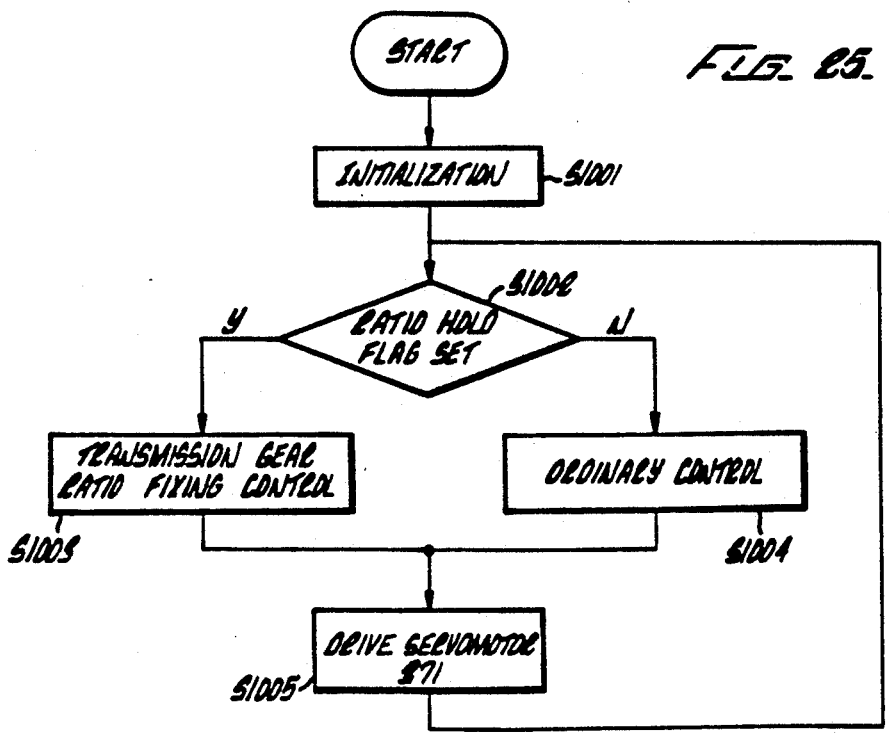
FIGS. 25 and 26 are flow charts illustrating operation of the fourth embodiment of the present invention.
Figure 26:
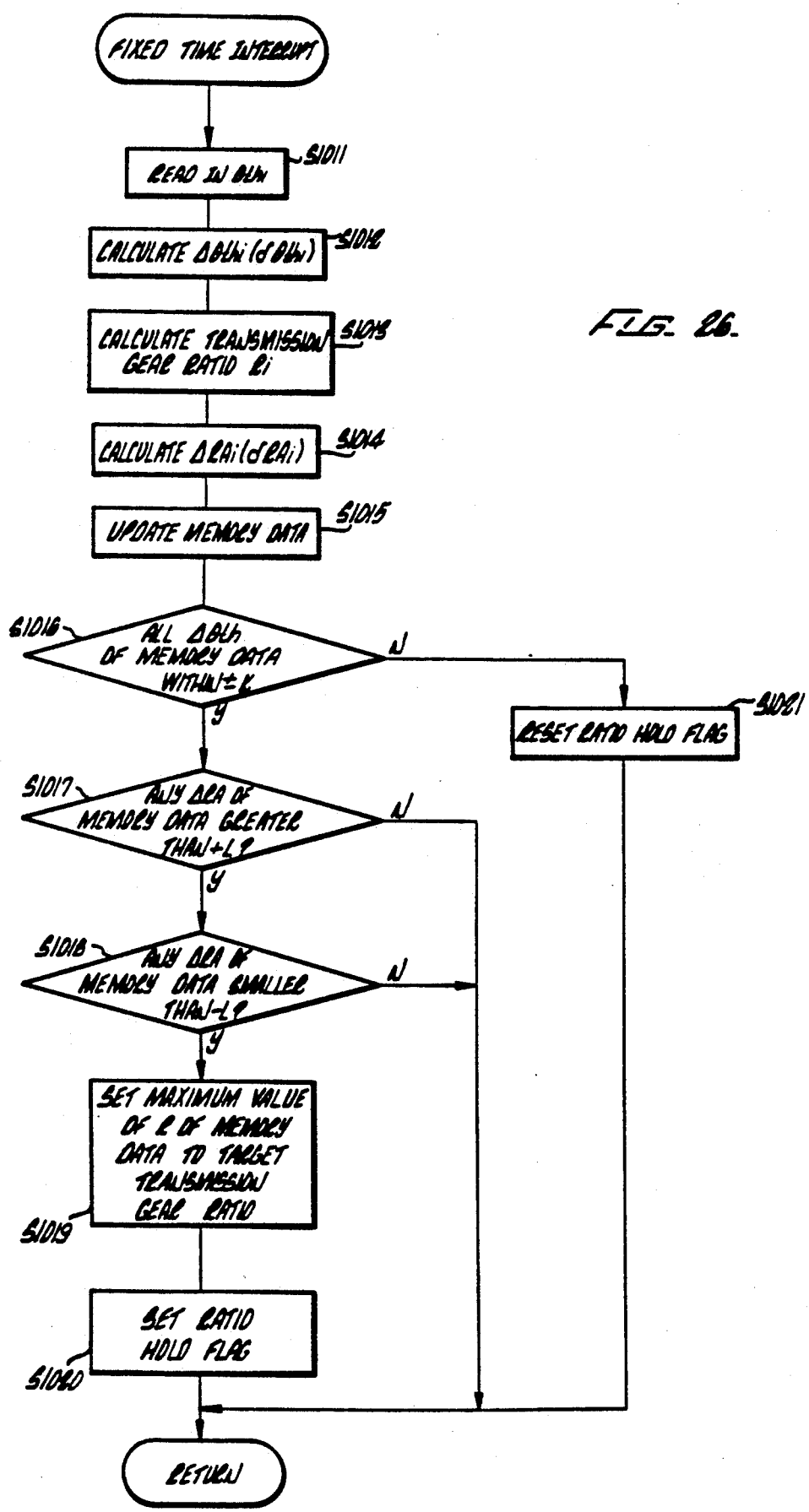

FIGS. 25 and 26 are flow charts illustrating operation of the fourth embodiment of the present invention.

At first, referring to FIG. 25, initialization of the microcomputer 533 is executed at step S1001.

At step S1002, it is determined whether or not a ratio hold flag which will be hereafter described with reference to FIG. 26 is in a set state. In case the flag is in a set state, the process advances to step S1003 where a transmission gear ratio fixing control is executed according to the present invention. The transmission gear ratio fixing control involves control of the non-stage transmission such that the transmission gear ratio of the non-stage transmission may coincide with a target transmission gear ratio which is set as described in FIG. 26. However, if the flag is not in a set state, the process advances to step S1004 at which a target engine speed of the non-stage transmission is set by a known technique.

After completion of the processing at step S1003 or S1004, the stepping motor 371 is driven so that the actual transmission gear ratio of the non-stage transmission or the actual engine speed Ne will coincide with the set target transmission gear ratio or the set target engine speed. Consequently, the position of the spool 293 is controlled. Then, the process returns to step S1002.

Operation of the process shown in FIG. 26 will now be described. The control illustrated in FIG. 26 is fixed time interrupt control and is executed for each predetermined interval of time by the microcomputer 533 (FIG. 24).

At first at step S1011, a throttle valve opening Θthi is read in. The suffix i is incremented by one each time the process is completed, and after it becomes equal to n, it is reset to 1. This similarly applies to steps S1012 to S1014.

At step S1012, a throttle opening which was read in during the process in the preceding control cycle or several preceding control cycles is subtracted from the thus read in throttle opening Θthi to calculate δΘthi. At step S1013, an actual transmission gear ratio Ri of the vehicle is calculated. In particular an output signal of the Ne sensor 204 is divided by an output signal of the V sensor 531 to calculate an actual transmission gear ratio Ri of the non-stage transmission. At step S1014, an actual transmission gear ratio which was calculated in the process in the preceding control cycle or several preceding control cycles is subtracted from the thus calculated actual transmission gear ratio Ri in order to calculate δRAi. At step S1015, the values of δΘthi, δRAi and Ri are stored into a memory which has areas for storing δΘthi, δRAi and Ri therein, as shown in FIG. 27. Here, if the suffix of each value becomes equal to the predetermined number n, the locations of the suffix equal to 1 are restored, and data are overwritten at the storage locations.

At step S1016, it is judged whether or not n values of δΘth stored in the memory all remain within a range of ±K (i.e., a predetermined value). If any one of the absolute values of δΘth exceeds K, then the ratio hold flag is reset at step S1021. After step S1021, the process comes to an end. In case the values of δΘth stored in the memory all remain within ±K, then it is judged at step S1017 whether or not any of n values of δRA stored in the memory is greater than a predetermined value, +L. If none of the values of δRA is greater than +L, then the process comes to an end. If any one of the values of δRA is greater than +L, then it is judged at step S1018 whether or not any of the n values of δRA stored in the memory is smaller than −L. If none of the values of δRA is smaller than −L, then the process comes to an end. If at step S1018 it is determined that any one of the values of δRA is smaller than −L, then one of the n values of Ri stored in the memory which represents a maximum value Ri ("Rmax") is set as a target transmission gear ratio of the non-stage transmission at step S1019. Then, at step S1020, the ratio hold flag is set, after which the process comes to an end.

It should be noted that either one of steps S1017 and S1018 can be omitted.

Figure 28:
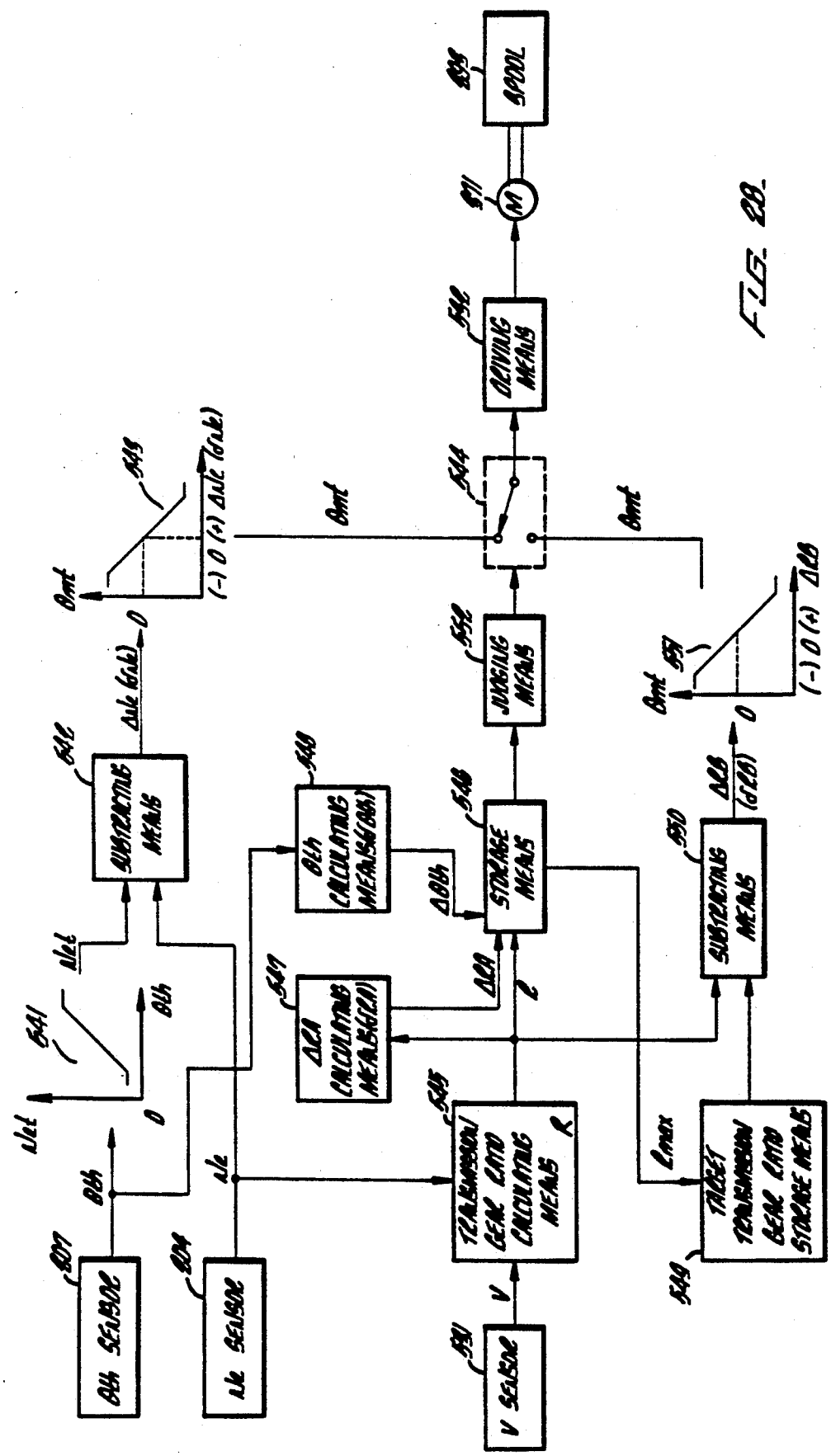
FIG. 28 is a functional block diagram of a fourth embodiment of the present invention.

FIG. 28 is a functional block diagram of the fourth embodiment of the present invention. In FIG. 28, like reference numerals to those of other figures denote like or equivalent portions, as discussed above.

Referring to FIG. 28, the Θth sensor 207 is connected to an Net setting means 541 and a δΘth calculating means 548. The Net setting means 541 has stored therein throttle openings Θth and target engine speeds Net which correspond to such Θth. The Net setting means 541 has stored therein such a function as illustrated in FIG. 28. The δΘth calculating means 548 calculates, in response to throttle openings Θth received, a deviation δΘth between them. The Net setting means 541 and the Ne sensor 204 are connected to a subtracting means 542. The subtracting means 542 subtracts a target engine speed Net delivered from the Net setting means 541 from an actual engine speed Ne delivered from the Ne sensor 204 to calculate a deviation δNe therebetween.

Deviations δNe of the engine speed and driving angles Θmt of the stepping motor 371 corresponding to the values of such δNe are stored in a Θmt setting means 543. When a deviation δNe of the engine speed Ne is received from the subtracting means 542, the Θmt setting means 543 delivers a driving angle Θmt of the stepping motor 371 corresponding to the deviation δNe to the driving means 532 by way of a switching means 544. It should be noted that the Θmt setting means 543 may be constructed so as to store therein such a function as shown in FIG. 28. As a result, the stepping motor 371 is rotated by a predetermined angle in a predetermined direction so that the spool 293 is moved in a predetermined direction. Then, the non-stage transmission is controlled so that the actual engine speed Ne may coincide with the target engine speed Net.

A feedback controlling means which is composed of the aforementioned Ne sensor 204, Θth sensor 207, Net setting means 541, subtracting means 542 and Θmt setting means 543 is a conventional controlling device for a non-stage transmission for a vehicle, and with only the construction described so far, the actual engine speed will fluctuate even if Θth is fixed and the target engine speed is fixed, and accordingly, Θmt and the actual transmission gear ratio, will fluctuate. Accordingly, there is the possibility that the vehicle may suffer from hunting with the conventional controlling means.

The switching means 544 normally interconnects the Θmt setting means 543 and the driving means 532, but when a control signal is delivered from a judging means 552 which will be described below, the switching means 544 interconnects another Θmt setting means 551 and the driving means 532.

The V sensor 531 and the Ne sensor 204 are connected to a transmission gear ratio R calculating means 545. The transmission gear ratio R calculating means 545 divides a rotational speed of the driving pulley 244 (that is, an actual engine speed Ne) delivered from the Ne sensor 204 by a rotational speed of the driven pulley 246 delivered from the V sensor 531 to calculate an actual transmission gear ratio R of the non-stage transmission. The transmission gear ratio R is transmitted to a δRA calculating means 547 by which a deviation δRA of the transmission gear ratio R is calculated.

A transmission gear ratio R, δRA and a throttle opening ratio δΘth of change which are delivered from the transmission gear ratio R calculating means 545, δRA calculating means 547 and δΘth calculating means 548, respectively, are stored into a storage means 546. A maximum value Rmax of the transmission ratios R stored in the storage means 546 is transferred to and stored into a target transmission gear ratio storage means 549. A subtracting means 550 subtracts a transmission gear ratio R delivered from the transmission gear ratio R calculating means 545 from a maximum transmission gear ratio Rmax stored in the target transmission gear ratio storage means 549 to calculate δRB and delivers the value δRB to the Θmt setting means 551. The Θmt setting means 551 has stored therein values of δRB and driving angles Θmt of the stepping motor 371 corresponding to such values of δRB. The Θmt setting means 551 may otherwise be constructed so as to store therein such a function as is shown in FIG. 28.

If δRB is received from the subtracting means 550, the Θmt setting means 551 delivers a driving angle Θmt of the stepping motor 371 to the switching means 544. The judging means 552 energizes the switching means 544 to switch the connection between the Θmt setting means 543 and the driving means 532 to the connection between the Θmt setting means 551 and the driving means 532 only when values of δΘth stored in the storage means 546 all remain within a predetermined range of ±K and any one of the values of δRA stored in the storage means 546 is outside a predetermined range ±L.

If the Θmt setting means 551 is connected to the driving means 532, the stepping motor 371 is rotated by a predetermined angle in a predetermined direction so that the spool 293 is moved in a predetermined direction. Thus, the non-stage transmission is controlled so that the actual transmission gear ratio of the non-stage transmission may coincide with a target transmission gear ratio stored in the target transmission gear ratio storage means 549.

In this manner, in the case of the present embodiment, when the change in throttle opening Θth is small and the actual transmission gear ratio R of the non-stage transmission presents a great fluctuation, the transmission gear ratio of the non-stage transmission is fixed to a maximum value Rmax among the values of R stored in the storage means 546 (that is, the lowest transmission gear ratio).

In short, in an ordinary running condition, the non-stage transmission is feedback controlled so that the actual engine speed may coincide with a target engine speed which is set in accordance with a throttle opening Θth, but when it is judged that the fluctuation of the actual transmission gear ratio R of the non-stage transmission is great and the vehicle is running on a rough road, the normal feedback control of the engine speed is stopped, and now the non-stage transmission is feedback controlled so that the actual transmission gear ratio may coincide with a maximum transmission gear ratio Rmax stored in the storage means 546. As a result, even when the vehicle runs on an uneven rough road, there is no possibility that the vehicle may suffer from hunting. However, when the change in throttle opening Θth is great, that is, when the driver is performing accelerator control, the transmission gear ratio will not be brought into a fixed condition. Accordingly, a will of the driver can be reflected in the operation of the vehicle.

In the fixed time interrupt control, as shown at step S1015 of FIG. 26, data in the storage means 546 (FIG. 28) are updated for each control cycle. Accordingly, when the vehicle runs on a very uneven rough road after a maximum transmission gear ratio Rmax in the storage means 546 has been set as a target transmission gear ratio, the value of the maximum transmission gear ratio may be further increased, and in this instance, the value of the target transmission gear ratio may be further increased. In other words, control of the non-stage transmission according to the present embodiment is such that a so-called filter means by which the target transmission gear ratio is always set only to the low side is added to a conventional control system. However, the present invention is not particularly limited to this, and such a construction is also possible that, once a maximum transmission gear ratio Rmax is set to a target transmission gear ratio, even if a greater transmission gear ratio than the maximum transmission gear ratio Rmax is detected, the greater transmission gear ratio is not adopted as a target transmission gear ratio.

Further, while in the description in connection with FIG. 28 Θmt read out from the Θmt setting means 543 or 551 is described as delivered as read out to the driving means 532, such construction may otherwise be employed that, for example, a sensor for detecting a position of the spool 293 or an inclination angle of the stepping motor 371 is provided and a comparison means is provided for comparing an output signal of the sensor and an output signal of the Θmt setting means 543 or 551, and an output of the comparison means is transmitted to the driving means 532 so that the driving means 532 may be energized in response to a present position of the spool 293 or a present inclination angle of the stepping motor 371.

A fifth embodiment of the present invention will now described.

Figure 29A:
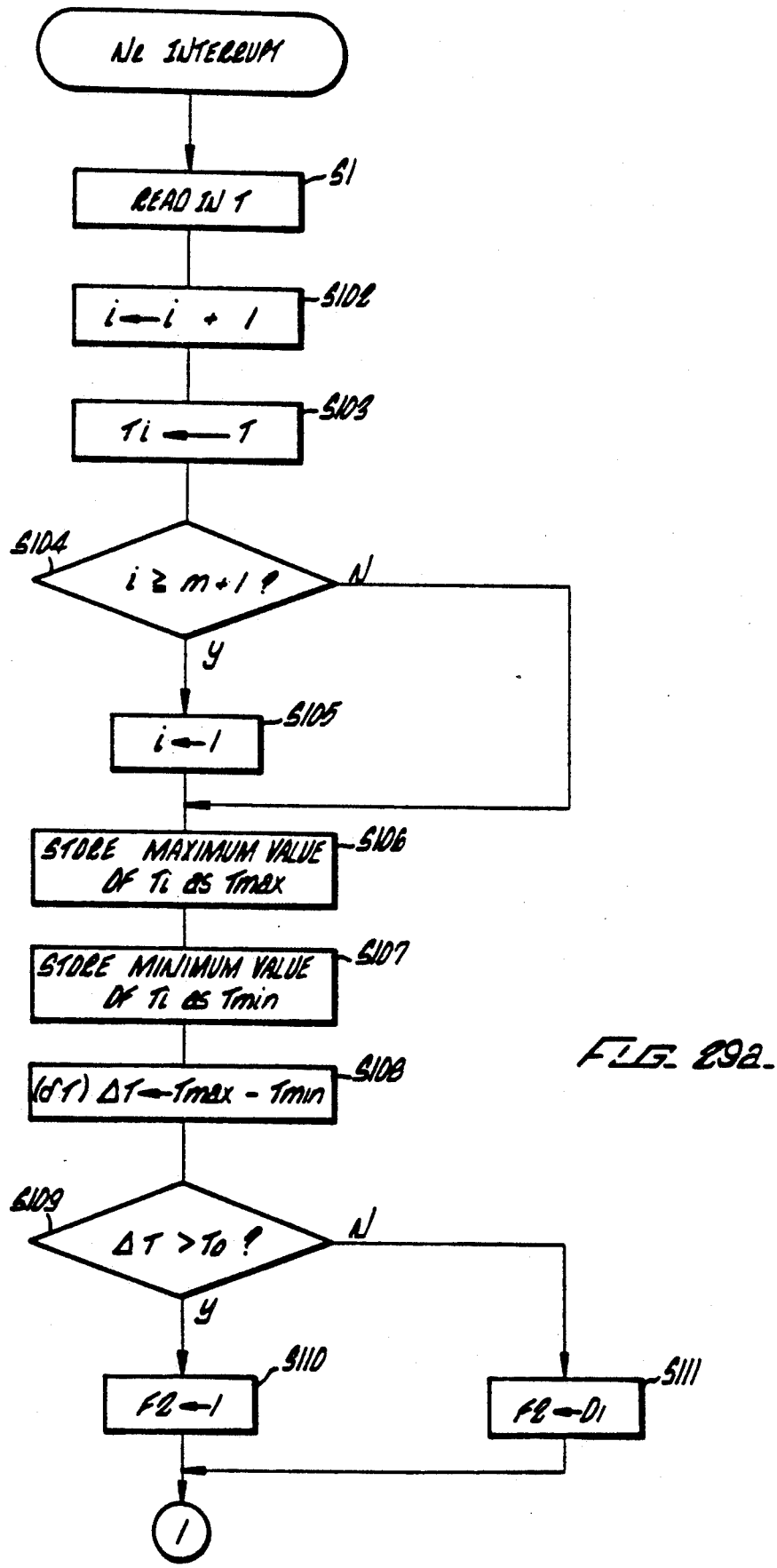
FIGS. 29A & 29B and 30 are flow charts illustrating operation of the fifth embodiment of the present invention.
Figure 29B:
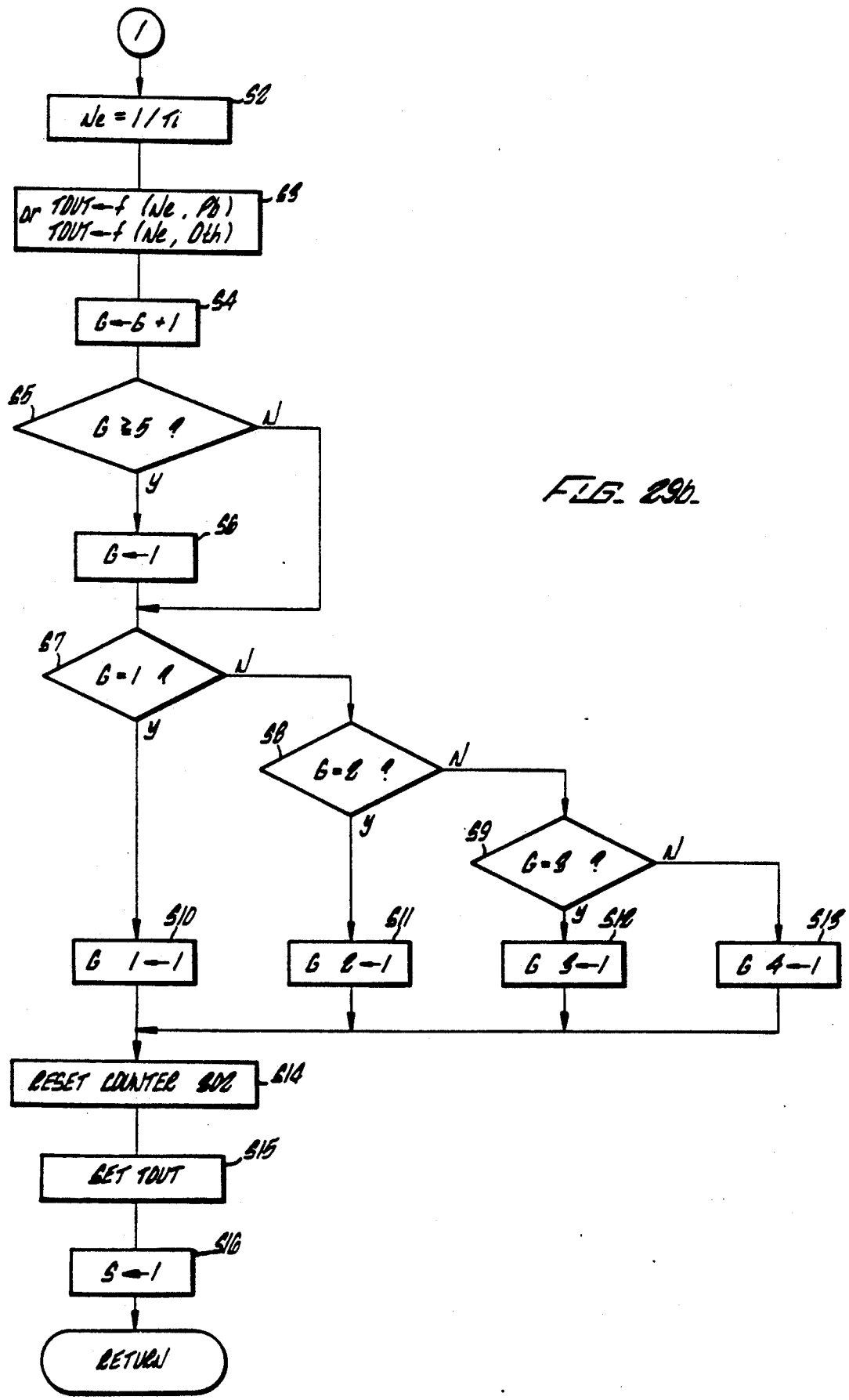
Figure 30:
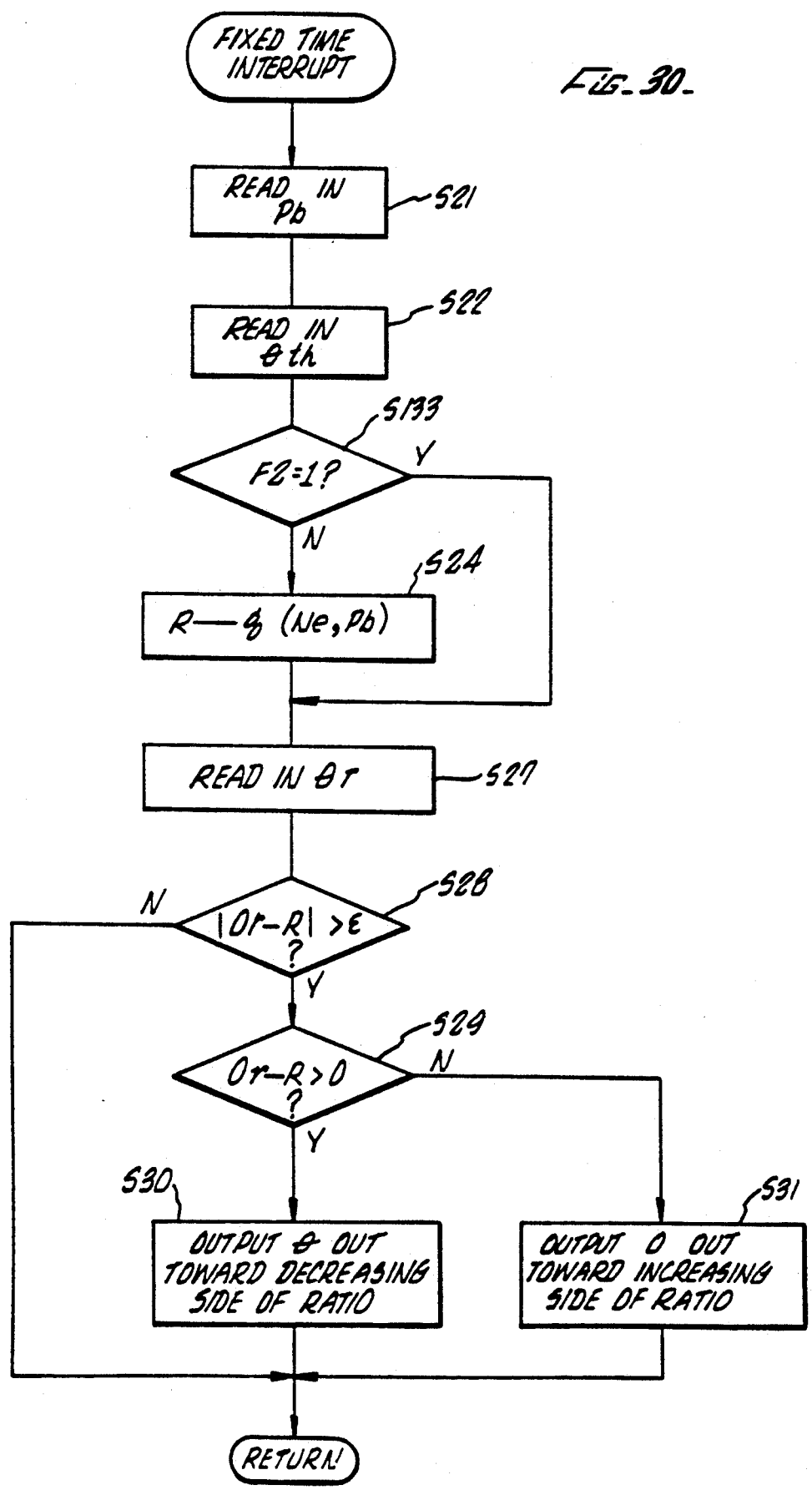

FIGS. 29 and 30 are flow charts illustrating operation of the fifth embodiment of the present invention. The Ne interrupt control is illustrated in FIG. 29 while the fixed time interrupt control is illustrated in FIG. 30. Like reference numerals to those appearing in other figures, for example FIGS. 7 or 8, represent like or equivalent features, as discussed above.

First, in the Ne interrupt control of FIG. 29, a detected time T is read in at first at step S1, as discussed above in relation to FIG. 6. Then at step S102, i is incremented by one. The value i is initialized (set to 0) when an ignition switch of the vehicle is turned on. At step S103, the detected time T of the distance of between the pawls is set to Ti. At step S104, it is judged whether or not the value i is equal to or greater than m+1. If i is equal to or greater than m+1, then the process advances to step S105 at which i is reset to 1. However, if i is equal to or smaller than m, then the process advances to step S106. In short, T (which is detected by execution of the process) is set between T1 to Tm each time the process is executed. The T1 to Tm are stored in a register having such a construction as shown in FIG. 31. The register is provided in the microcomputer 201 of FIG. 5.

At step S106, one of the values of Ti stored in the register which has a maximum value is set and stored as Tmax. At step S107, one of the values of Ti stored in the register which has a minimum value is set and stored as Tmin. At step S108, Tmin is subtracted from Tmax to calculate $\delta T$. At step S109, it is judged whether or not the $\delta T$ is greater than a predetermined value To. If $\delta T$ is greater than the predetermined value To, then a flag F2 is set to 1 at step S110. However, if $\delta T$ is not greater than the predetermined value To, then the flag F2 is set to 0 at step S111. If the flag F2 is set to 1, this is a case wherein the fluctuation in detected time of the distance between the pawls is great, and in other words, this is a case wherein the fluctuation in engine speed is great. That is, such is a case wherein the vehicle is running on a very uneven rough road.

It should be noted that such modification may be employed wherein, when it is judged at step S109 that $\delta T$ is greater than the predetermined value To, it is further judged whether or not the fluctuation of the throttle opening $\Theta th$ remains within a predetermined range, and when the fluctuation of $\Theta th$ remains within such a predetermined range, the process proceeds to step S110.

In case it is judged that the vehicle is running on a rough road and consequently the flag is set to 1, the transmission gear ratio R of the non-stage transmission is fixed in the fixed time interrupt control which will be hereafter described with reference to FIG. 30.

After step S110 or S111, the flow proceeds to step S2 and steps following step S2, as discussed above with respect to FIG. 6.

In the fixed time interrupt control of FIG. 30, an intake pipe internal negative pressure Pb is read in at step S21. At step S22, a throttle opening $\Theta th$ is read in. At step S133, it is judged whether or not the flag F2 described above with reference to steps S110 and S111 of FIG. 29 is equal to 1. In case the flag F2 is equal to 1, the process advances to step S27. However, if the flag F2 is equal to 0, then the process advances to step S24.

At step S24, a target transmission gear ratio R is retrieved from a map wherein the engine speed Ne and the intake pipe internal negative pressure Pb are used as variables. It should be noted that the target transmission gear ratio R may otherwise be retrieved from another ma wherein the engine speed Ne and the throttle opening $\Theta th$ are used as variables or else from a table wherein any one of the engine speed Ne, intake pipe internal negative pressure Pb and throttle opening $\Theta th$ is used as a variable.

After step S24, the flow proceeds to step S27. Steps S27 through S31 and the Return step were discussed above with regard to FIG. 7.

In this manner, if it is judged in the process of FIG. 29 described above that the vehicle is running on a rough road and the flag F2 is set to 1, then retrieval of a target transmission gear ratio R is not executed in the process of FIG. 30, and the target transmission gear ratio is maintained or fixed at a target transmission gear ratio R which was retrieved in the processing at step S24 of FIG. 30 in the preceding control cycle or in any of the preceding control cycles. However, if the flag F2 is equal to 0, retrieval of a target transmission gear ratio R is executed at step S24.

It should be noted that, while in FIG. 30 the process is shown coming to an end after completion of the processing at step S30 or S31, it may be modified such that the process returns to step S28 after completion of either of such steps.

Figure 32:
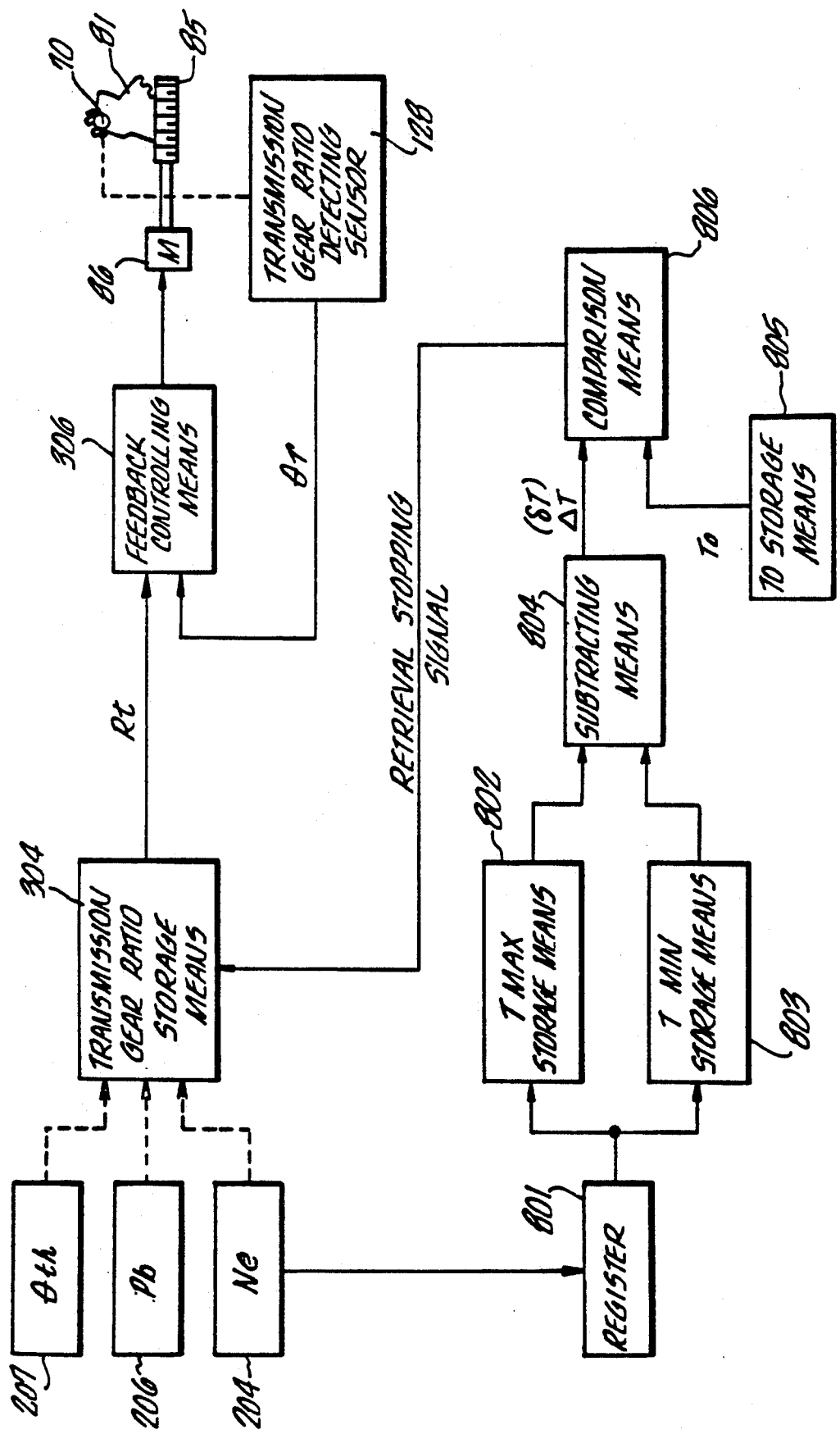
FIG. 32 is a functional block diagram of the fifth embodiment of the present invention.

FIG. 32 is a functional block diagram of the fifth embodiment of the present invention. In FIG. 32, like reference numerals to those of other figures, such as FIGS. 5 or 8, denote like or equivalent portions, as discussed above.

Referring to FIG. 32, a transmission gear ratio storage means 304 has transmission gear ratios Rt stored therein wherein at least one of the engine speed Ne, intake pipe internal negative pressure Pb and throttle opening $\Theta th$ is employed as a variable, and the transmission gear ratio storage means 304 retrieves a target transmission gear ratio Rt in response to data detected by at least one of the Ne sensor 204, Pb sensor 206 and $\Theta th$ sensor 207 connected to the transmission gear ratio storage means 304 and delivers the thus retrieved target transmission gear ratio Rt to a feedback controlling means 306. Such retrieval is executed for each periodic interval of time of the process.

The feedback controlling means 306 compares a target transmission gear ratio Rt thus received and an actual transmission gear ratio $\Theta r$ delivered from the transmission gear ratio detecting sensor 128 with each other and feedback controls the motor 86 in accordance with a result of such comparison. Consequently, the transmission gear ratio of the non-stage transmission coincides with the target transmission gear ratio retrieved from the transmission gear ratio storage means 304.

After the detected time T is read in the value T is stored into a register 801. The register 801 can store up to m values of such T therein. Among the values of T stored in the register 801, a maximum value Tmax is stored into a Tmax storage means 802 while a minimum value Tmin is stored into a Tmin storage means 803. A subtracting means 804 subtracts Tmin from Tmax to calculate $\delta T$. A comparison means 806 compares the value $\delta T$ with a predetermined value To stored in a To storage means 805 and develops a signal for stopping the retrieval of Rt from the transmission gear ratio storage means 304 when $\delta T$ is greater than the predetermined value To. Consequently, the new reading operation of a target value from the transmission gear ratio storage means 304 is inhibited, and the target transmission gear ratio is fixed.

By the way, in the fourth embodiment of the present invention described above, an actual transmission gear ratio of the non-stage transmission is detected, and when the fluctuation of the actual transmission gear ratio is great, running on a rough road is determined to be taking place. On the other hand, in the fifth embodiment, running on a rough road is determined when the fluctuation of the actual engine speed is great. Determination of whether or not the vehicle is running on a rough road is not specifically limited to the methods described, and such means may otherwise be employed that a sensor (torque sensor) for detecting a rotary shaft of a power transmitting system from a non-stage transmission to a driving wheel is provided for the rotary shaft and rough road running is determined when the fluctuation of the value of an output signal of the sensor presents a value greater than a predetermined value. Further, while the fourth embodiment is described as applied to a non-stage transmission which is composed of two pulleys each having a groove the width of which is adjusted by a hydraulic pressure and an endless belt extending between and around the pulleys, the fourth embodiment may be applied to such a non-stage transmission which is composed of a cam plate type fixed delivery hydraulic pump and a cam plate type variable delivery hydraulic motor as is described above, or to such a toroidal non-stage transmission as is disclosed in the official gazette of Japanese Patent Laid-Open No. 62-273189, or the like. Similarly, the fifth embodiment may also be applied such a toroidal non-stage transmission or the like as described above.

As is apparent from the foregoing description, according to the present invention the following effect can be attained. In particular, since the target transmission gear ratio of the non-stage transmission is fixed while the vehicle is running on a rough road, hunting will not take place.

Further embodiments of the present invention will now be described.

Figure 33:
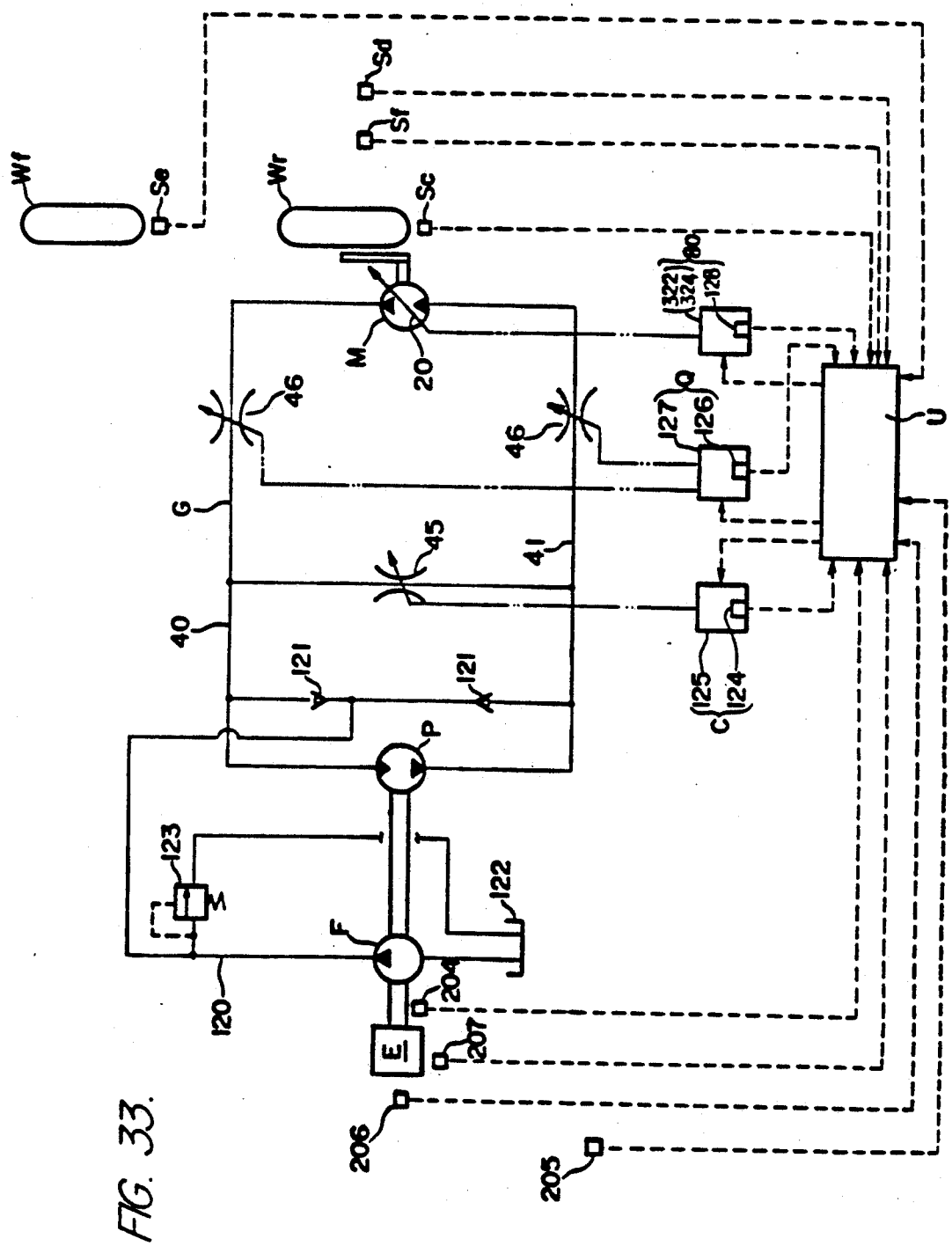
FIG. 33 is a block diagram showing a hydraulic circuit of another example of a non-stage transmission to which the present invention may be applied.

FIG. 33 shows a non-stage transmission similar to the transmission shown in FIG. 2. However, FIG. 33 shows an inclination angle controlling mechanism 80 described above which is constituted from first and second solenoids 322 and 324 as actuators, and a transmission gear ratio detecting sensor (ratio sensor) 128 for detecting a tilted position of a motor cam plate 20. The first and second solenoids 322 and 324 are provided to change the position of a spool valve (not shown) in a pressure oil passage connected to the motor cam plate 20, and as the first or second solenoid 322 or 324 operates, the spool valve is moved so that the motor cam plate 20 is rotated in a predetermined direction. Consequently, the transmission gear ratio of the non-stage transmission is changed. Naturally, instead of the provision of such solenoids 322 and 324, a trunnion shaft which is a rotary shaft for the motor cam plate 20 may be rotated using an electric motor as disclosed in the official gazette of Japanese Patent Laid-Open No. 62-224770.

Figure 34:
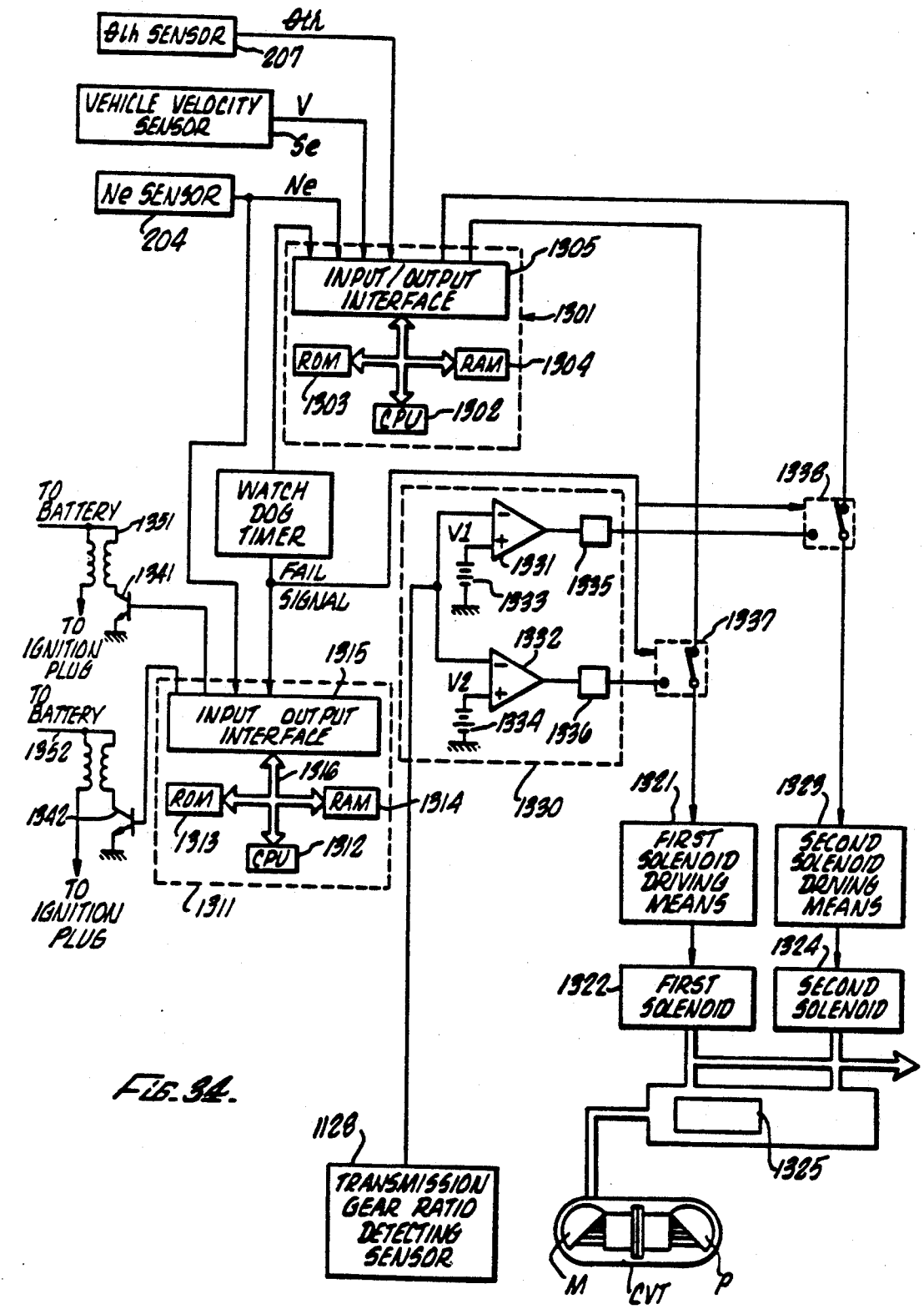
FIG. 34 is a block diagram showing construction of the sixth embodiment of the present invention.

FIG. 34 is a block diagram showing construction of the sixth embodiment of the present invention. Referring to FIG. 34, a microcomputer 1301 is provided for controlling the transmission gear ratio of the non-stage transmission CVT and is composed of a CPU 1302, a ROM 1303, a RAM 1304, an input/output interface 1305, and a common bus 1306 for interconnecting such components, as is well known in the art. Another microcomputer 1311 is provided for controlling ignition of the vehicle and is composed of a CPU 1312, a ROM 1313, a RAM 1314, an input/output interface 1315, and a common bus 1316 for interconnecting such components, as is well known in the art. A Θth sensor 207 and a vehicle velocity sensor Se for detecting a rotational speed V of the driven wheel Wf (FIG. 2) are connected to the input/output interface 1305 of the microcomputer 1301. The Ne sensor 204 is connected to the input-/output interfaces 1305 and 1315 of the microcomputers 1301 and 1311.

A watch dog timer 1320 is connected to the input-/output interfaces 1305 and 1315 of the microcomputer 1301 and 1311. The watch dog timer 1320 counts a clock disposed in the inside thereof and is constructed such that the count value thereof is reset by a reset signal disposed for predetermined steps in a program which is executed by the microcomputer 1301. Then, for example, if the microcomputer 1301 fails and thus develops no reset signal for the predetermined steps until the count value of the clock exceeds a predetermined count value Cs, a signal indicating a failure of the microcomputer 1301 ("fail signal") is generated. Furthermore, in such an instance the watch dog timer 1320 energizes switching means 1337 and 1338 to connect first and second solenoid driving means 1321 and 1323 to a transmission gear ratio fixing circuit 1330.

The non-stage transmission CVT is composed of the hydraulic pump P and the hydraulic motor M as described above, and the motor cam plate 20 (FIG. 33) of the hydraulic motor M is rotated by movement of a spool valve 1325. Such movement of the spool valve 1325 is controlled by operation of the first or second solenoid 322 or 324 by way of a pressure oil passage. The first and second solenoids 322 and 324 are connected to the input/output interface 1305 of the microcomputer 1301 by way of the first solenoid driving means 1321 and the second solenoid driving means 1323 as well as the switching means 1337 and the switching means 1338.

The transmission gear ratio of the non-stage transmission CVT is detected by the transmission gear ratio detecting sensor 128. A voltage signal developed from the transmission gear ratio detecting sensor 128 is coupled to the + input terminal of a comparator 1331 and the − input terminal of another comparator 1332. The − input terminal of the comparator 1331 is connected to a reference power source 1333 having a voltage output of V1 while the + input terminal of the comparator 1332 is connected to another reference power source 1334 having a voltage output of V2. Here, it is assumed that V1>V2. Output terminals of the comparators 1331 and 1332 are connected to switching means 1335 and 1336, respectively. The switching means 1335 and 1336 are connected to the switching means 1338 and 1337, respectively.

The switching means 1337 and 1338 normally connect the microcomputer 1301 to the first solenoid driving means 1321 and the second solenoid driving means 1323, so that operation of the driving means 1321 and 1323 is controlled by the microcomputer 1301. However, when a fail signal is developed, the switching means 1337 and 1338 now connect the switching means 1336 and 1335 to the first solenoid driving means 1321 and the second solenoid driving means 1323, respectively, so that operation of the driving means 1321 and 1323 is controlled by the switching means 1336 and 1335, respectively. It should be noted that the comparators 1331 and 1332 may be constructed so that they develop an output signal corresponding to the input terminal thereof only when a fail signal is delivered from the watch dog timer 1320. Further, the switching means 1335 and 1336 may be omitted and the comparators 1331 and 1332 may be connected directly to the switching means 1338 and 1337, respectively.

Ignition coils 1351, 1352, . . . connected to a battery and ignition plugs (not shown) of the vehicle are connected to the input/output interface 1315 of the microcomputer 1311 by way of transistors 1341, 1342, ... serving as switching means, respectively.

The transmission gear ratio of the non-stage transmission CVT is controlled by the microcomputer 1301 while ignition of the vehicle is controlled by the microcomputer 1311, as described above. In this manner, the transmission gear ratio control is executed for each period of time, but the ignition control is executed each time one of the plurality of pawls provided on the crankshaft of the vehicle and constituting the Ne sensor 204 is detected. In the following description, the control which is executed in response to detection of a pawl will be referred to as Ne interrupt control while the control which is executed for each fixed period of time will be referred to as fixed time interrupt control.

Figure 35:
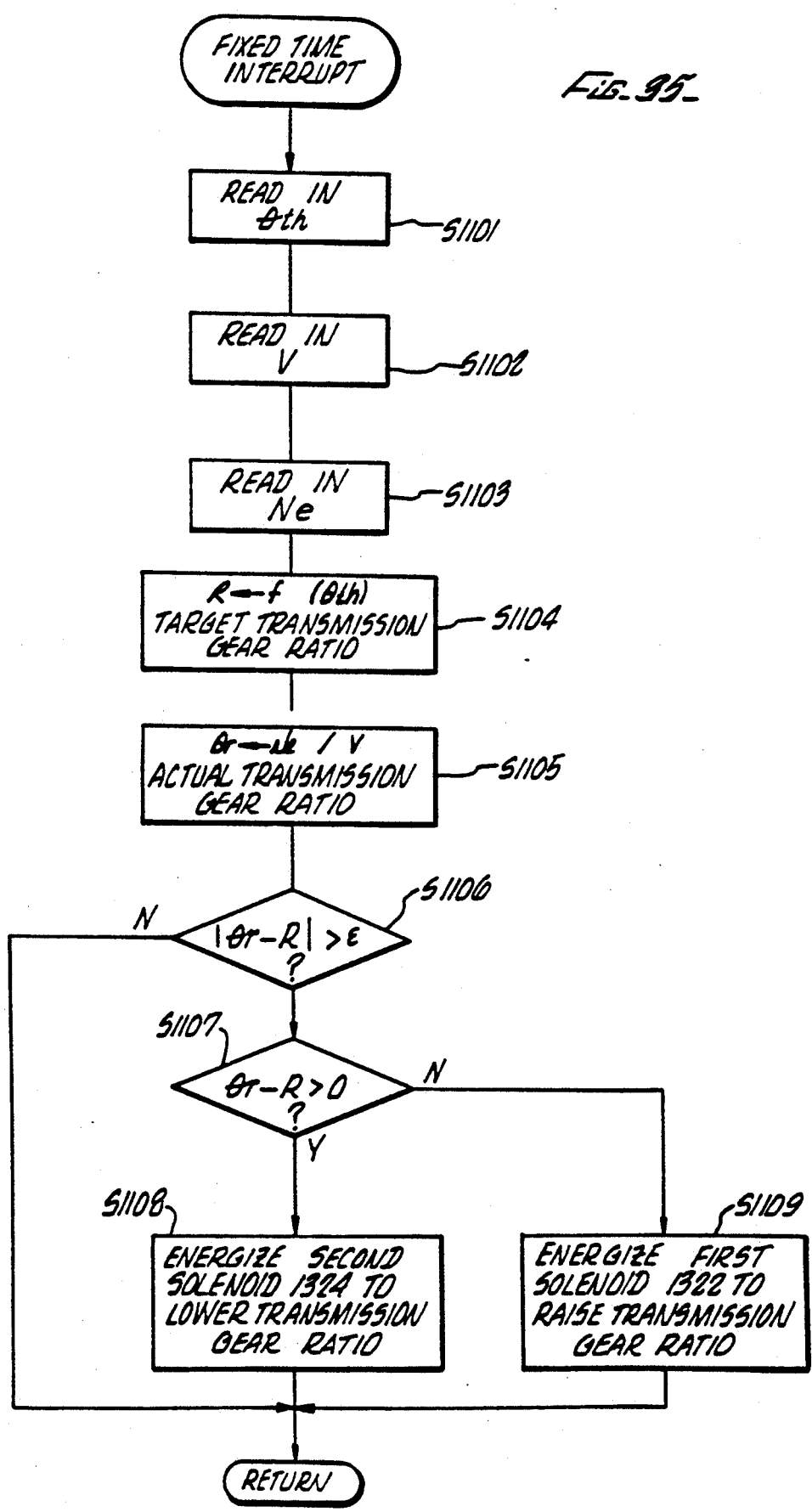
FIG. 35 is a flow chart illustrating the operation of fixed time interrupt control for executing transmission gear ratio control of the non-stage transmission.

FIG. 35 is a flow chart illustrating operation of the fixed time interrupt control for executing transmission gear ratio control of the non-stage transmission CVT. At step S1101, a throttle opening Θth developed from the Θth sensor 207 is read in. At step S1102, a vehicle velocity V developed from the vehicle velocity sensor Se is read in. At step S1103, an engine speed Ne developed from the Ne sensor 204 is read in. At step S1104, a target transmission gear ratio R corresponding to the throttle opening Θth is set. A plurality of data for the target transmission gear ratio R are stored corresponding to several values of the throttle opening Θth in the ROM 1303 in the microcomputer 1301. Thus, a target transmission gear ratio R is read out from the ROM 1303 in response to a throttle opening Θth.

At step S1105, a ratio between the engine speed Ne and the vehicle velocity V is calculated to find out an actual transmission gear ratio Θr of the non-stage transmission CVT.

At step S1106, it is judged whether or not an absolute value of a difference of the target transmission gear ratio R from the actual transmission gear ratio Θr is greater than a predetermined deviation ε. If the absolute value (of Θth−R) is not greater than the predetermined deviation ε, then the process comes to an end. If the absolute value (of Θth−R) is greater than the predetermined deviation ε, then it is judged at step S1107 whether or not the difference of the target transmission gear ratio R from the actual transmission gear ratio Θr is positive.

If the difference of the target transmission gear ratio R from the actual transmission gear ratio Θr is positive, then the second solenoid 324 (FIG. 34) is turned on at step S1108 so that the transmission gear ratio may be decreased, or in other words, so that the transmission gear ratio may be lowered. However, if the difference (Θth−R) is negative, then the first solenoid 322 (FIG. 34) is turned on at step S1109 so that the transmission gear ratio may be increased, or in other words, so that the transmission gear ratio may be raised.

Steps S1106 to S1109 form a routine for feedback controlling the actual transmission gear ratio Θr so that it may coincide with the target transmission gear ratio R.

After the processing at step S1108 or S1109, the process comes to an end.

Figure 36:
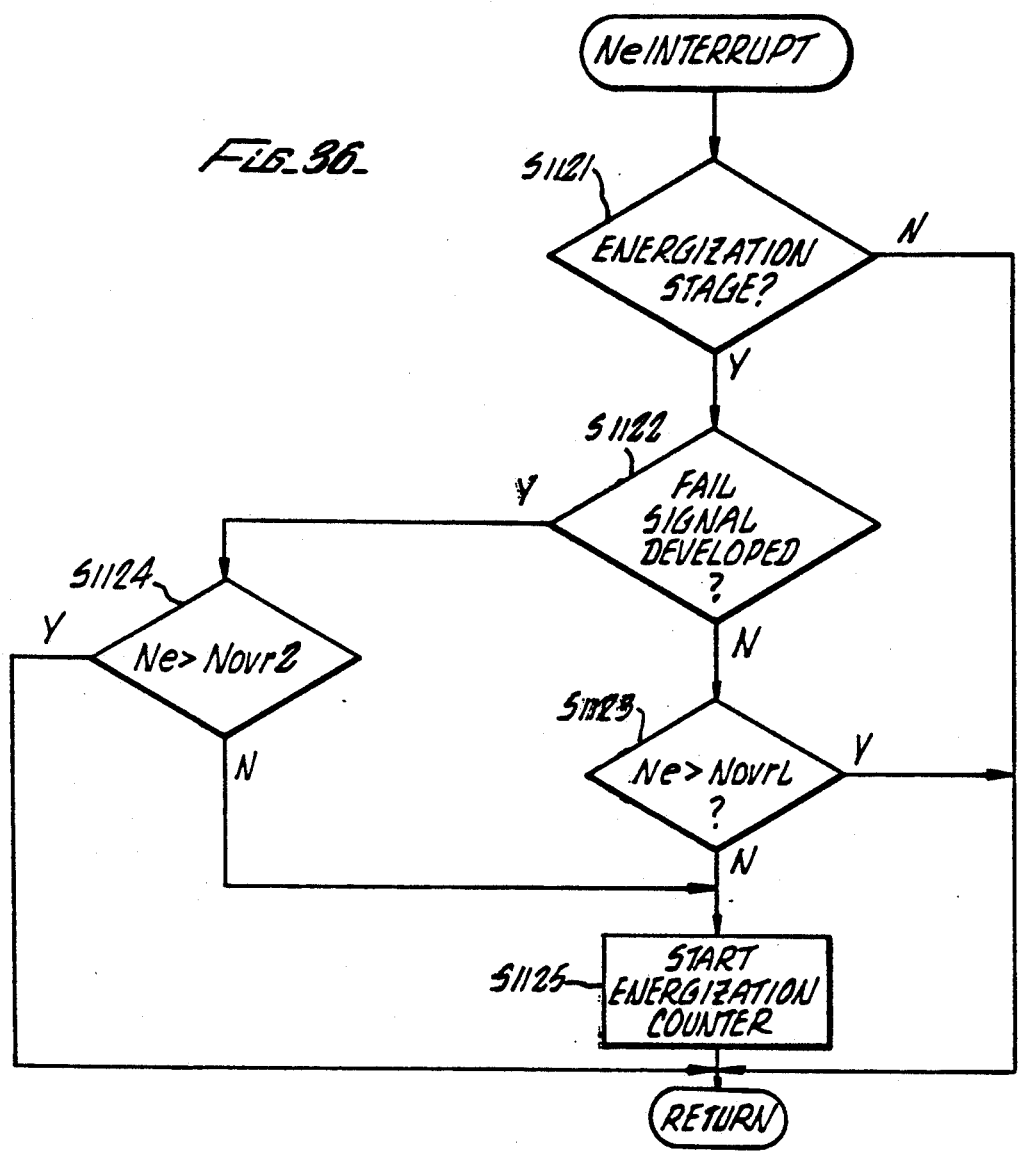
FIG. 36 is a flow chart illustrating operation of Ne interrupt control executing ignition control of the vehicle.

FIG. 36 is a flow chart illustrating operation of the Ne interrupt control for executing ignition control of the vehicle. As described above, the Ne interrupt control is executed each time one of the plurality of pawls provided on the crankshaft of the vehicle is detected during operation of the Ne sensor 204.

In the following description, an Ne interrupt control processing stroke which is executed each time a pawl is detected will be referred to as stage. The starting of energization of a predetermined one of the ignition coils 1351, 1352, ..., the stopping of such energization (that is, ignition), and so forth are executed for each stage.

In FIG. 36, there is shown an energization stage wherein the starting of energization of the ignition coil 1351, 1352, ... is executed. At first at step S1121, it is judged whether or not the present stage is an energization stage. If the present stage is not an energization stage, then the process comes to an end. If the present stage is an energization stage, then it is judged at step S1122 whether or not a fail signal is developed from the watch dog timer 1320. If no fail signal is developed, then it is judged at step S1123 whether or not the engine speed Ne is higher than a first ignition cut rotational speed Novr1 (for example, 12,000 rpm). If the engine speed Ne is higher than the first ignition cut rotational speed Novr1, then the process comes to an end. If the engine speed Ne is not higher than the first ignition cut rotational speed Novr1, then energization of a predetermined one of the ignition coils 1351, 1352, ... is started at step S1125. In particular, an energization counter (not shown) in the microcomputer 1311 starts its counting operation so that a predetermined one of the transistors 1341, 1342, ... (FIG. 34) is turned on. After that, the process comes to an end.

In case it is judged at step S1122 that a fail signal is developed, it is judged at step S1124 whether or not the engine speed Ne is higher than a second ignition cut rotational speed Novr2 (for example, 4,000 rpm). If the engine speed Ne is higher than the second ignition cut rotational speed Novr2, the process comes to an end. If the engine speed Ne is not higher than the second ignition cut rotational speed Novr2, the process advances to step S1125.

The energization counter started at step S1125 is stopped at a predetermined stage so that ignition is performed.

In this manner, if no fail signal is developed from the watch dog timer 1320, then the engine speed Ne of the vehicle is controlled so that it may not exceed the first ignition cut rotational speed Novr1, but if a fail signal is developed, then the engine speed Ne is controlled so that it may not exceed the second ignition cut rotational speed Novr2 (Novr1 > Novr2). In short, if the microcomputer 1301 does not fail and control of the non-stage transmission CVT is executed regularly, it is forecast that the engine of the vehicle will not be used continuously in a high rotation condition. Accordingly, in this instance, the engine speed Ne is controlled so that it may not be raised to a high rotational speed of 12,000 rpm or so. However, in case the microcomputer 1301 fails and the transmission gear ratio of the non-stage transmission CVT is set to a great fixed value on the low side as described below, then it is forecast that the engine of the vehicle may possibly be used continuously in a high rotation condition. Accordingly, in this instance, the engine speed Ne is controlled so that it may not exceed the speed of 4,000 rpm or so. Consequently, overheating of the engine is prevented.

Now, referring back to FIG. 34, operation of the transmission gear ratio fixing circuit 1330 when a fail signal is developed from the watch dog timer 1320 will be described.

At first, an actual transmission gear ratio signal (voltage signal) detected by the transmission gear ratio detecting sensor 128 is supplied to the + input terminal of the comparator 1331. The transmission gear ratio detecting sensor 128 is made such that the output voltage signal thereof increases as the transmission gear ratio of the non-stage transmission CVT increases. Accordingly, if the voltage signal indicative of the actual transmission gear ratio signal exceeds the voltage V1 of the reference power source 1333 which is applied to the − input terminal of the comparator 1331, then the comparator 1331 energizes the switching means 1335 to render the second solenoid driving means 1323 operative. As a result, the second solenoid 324 is turned on, and the non-stage transmission CVT is controlled so that the transmission gear ratio thereof may be decreased.

The actual transmission gear ratio signal (voltage signal) detected by the transmission gear ratio detecting sensor 128 is also supplied to the − input terminal of the comparator 1332. Accordingly, when the voltage signal indicative of the actual transmission gear ratio signal is lower than the voltage V2 of the reference power source 1334 which is applied to the + input terminal of the comparator 1332, the comparator 1332 energizes the switching means 1336 to render the first solenoid driving means 1321 operative. As a result, the first solenoid 322 is turned on, and the non-stage transmission CVT is controlled so that the transmission gear ratio thereof may be increased. In this manner, the transmission gear ratio of the non-stage transmission CVT is controlled to a fixed value on the low side so that the output voltage signal of the transmission gear ratio detecting sensor 128 may be maintained within a range between V2 and V1.

A timing chart of the sixth embodiment of the present invention will now be described.

Figure 37:
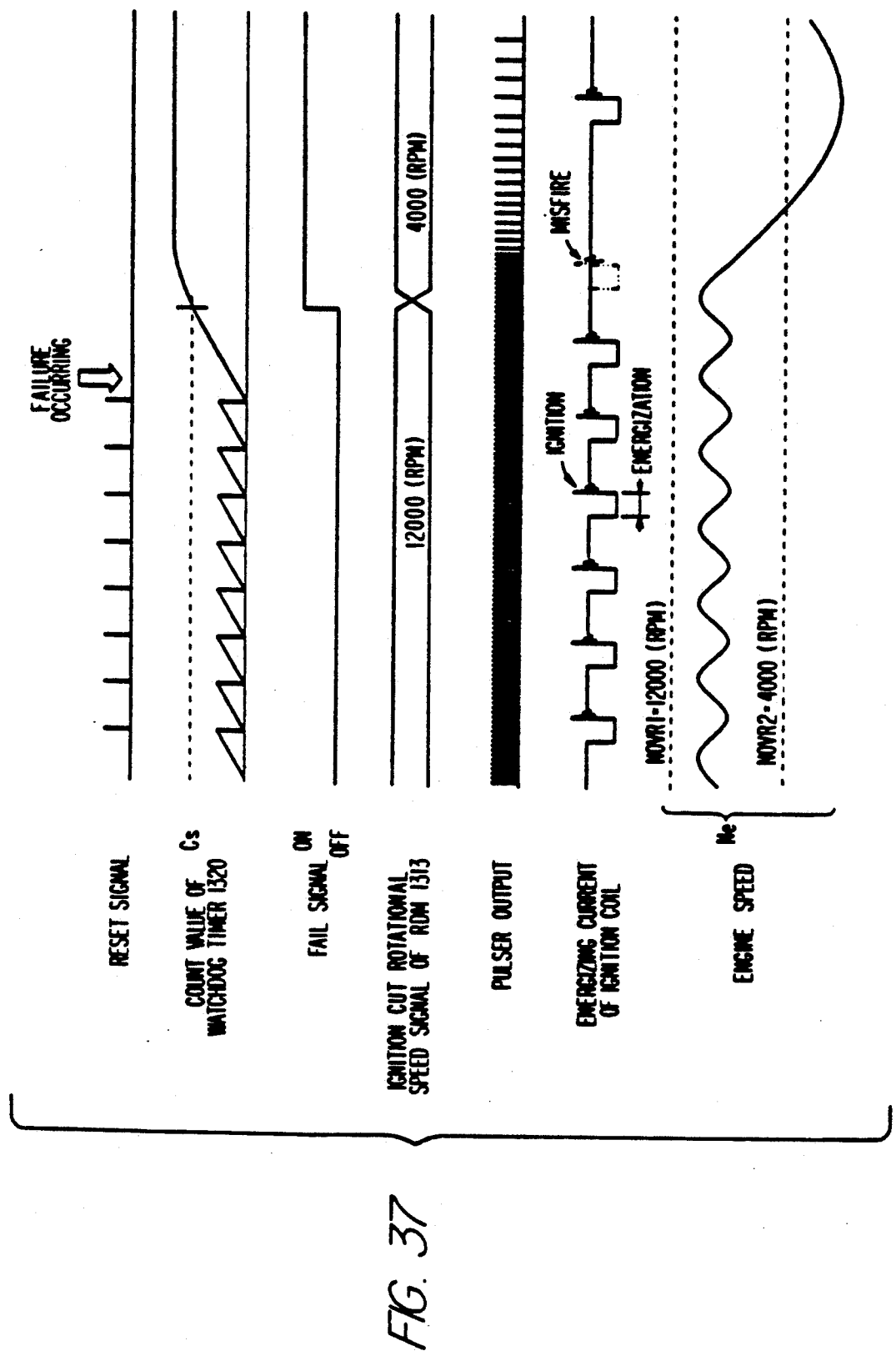
FIG. 37 is a timing chart of principal parts of the sixth embodiment of the present invention.

FIG. 37 is a timing chart of principal parts of the sixth embodiment of the present invention. Referring to FIG. 37, the reset signal shows a reset signal for resetting the count of the clock disposed in the inside of the watch dog timer 1320. Such a reset signal is disposed for each of predetermined steps developed in a program which is executed by the microcomputer 1301. The fail signal is a signal which is developed from the watch dog timer 1320 and indicates a failure of the microcomputer 1301. The pulser output is an output signal of the pulser from the plurality of pawls and the pulser which constitute the Ne sensor 204, that is, a signal which is developed from the pulser when it detects any of the pawls.

As seen from the FIG. 37, if a reset signal is developed at each predetermined timing, the count value of the watch dog timer 1320 does not exceed the predetermined count value Cs, and no fail signal is developed. Accordingly, an ignition cut signal read out from the ROM 1313 of the microcomputer 1311 coincides with the first ignition cut rotational speed Novr1, and ignition of any ignition coil is controlled so that the engine speed Ne may not exceed the first ignition cut rotational speed Novr1. However, if the microcomputer 1301 should fail and no reset signal is developed at a predetermined timing, the count value of the watch dog timer 1320 will exceed the predetermined count value Cs, and a fail signal will be developed. Accordingly, an ignition cut signal read out from the ROM 1313 of the microcomputer 1311 coincides with the second ignition cut rotational speed Novr2, and ignition of any ignition coil is controlled so that the engine speed Ne may not exceed the second ignition cut rotational speed Novr2.

In short, immediately after, for example, the ignition cut rotational speed has been changed from the first ignition cut rotational speed Novr1 to the second ignition cut rotational speed Novr2, energization of any ignition coil does not occur, as shown in FIG. 37. Thus, a misfired condition takes place, and the engine speed Ne is controlled so that it will be lower than the second ignition cut rotational speed Novr2.

Figure 38:
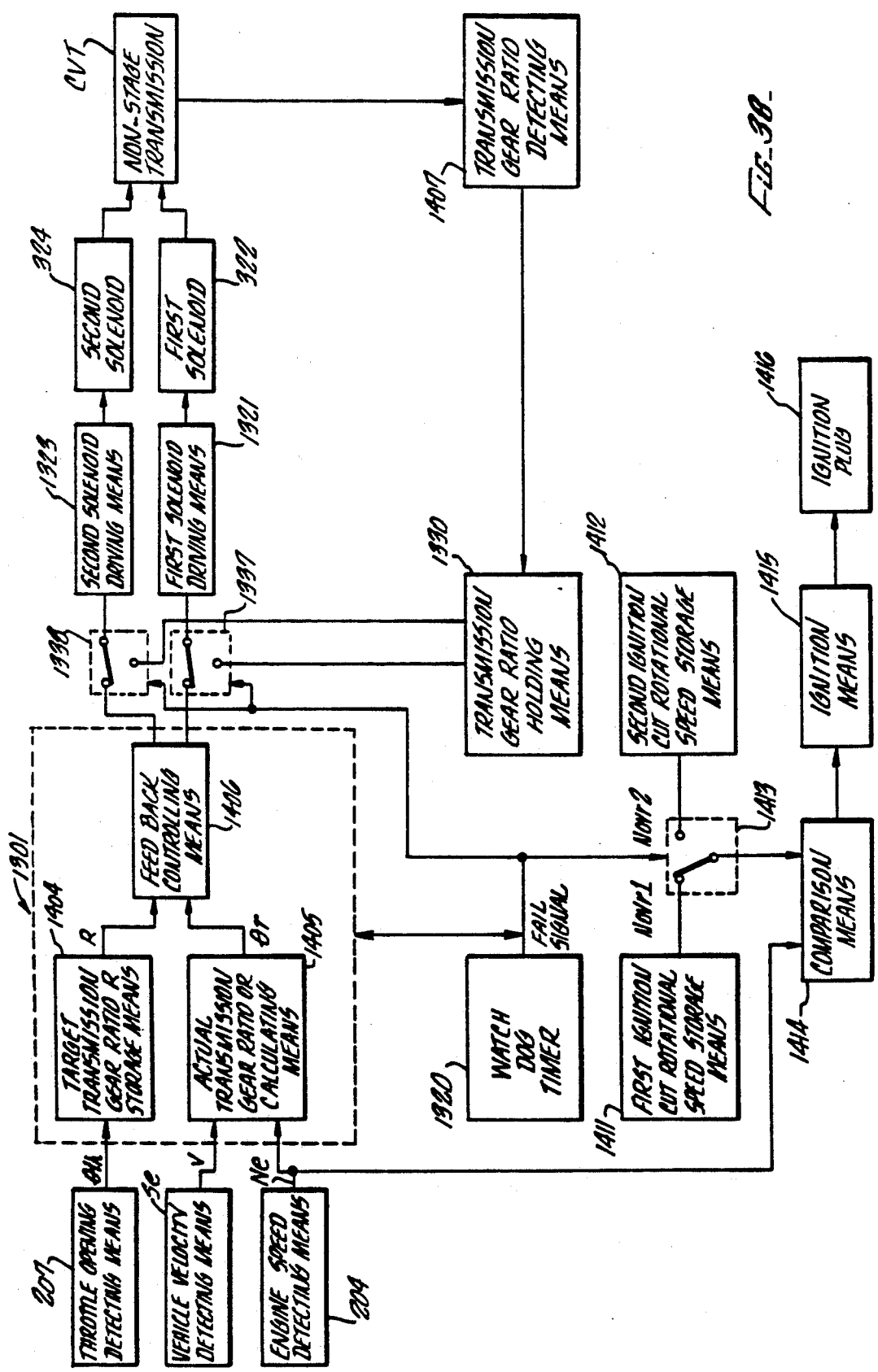
FIG. 38 a functional block diagram of the sixth embodiment of the present invention.

FIG. 38 is a functional block diagram of the sixth embodiment of the present invention. In FIG. 38, like reference numerals to those of other figures, such as FIG. 5, generally denote like or equivalent portions, as discussed above.

Referring to FIG. 38, a throttle opening detecting means 207 is connected to a target transmission gear ratio R storage means 1404. A target transmission gear ratio R corresponding to a throttle opening Θth is delivered from the target transmission gear ratio R storage means 1404 to a feedback controlling means 1406. A vehicle velocity detecting means Se and an engine speed detecting means 204 are connected to an actual transmission gear ratio Θr calculating means 1405. The actual transmission gear ratio Θr calculating means 1405 calculates and forecasts an actual transmission gear ratio Θr of the non-stage transmission CVT using a vehicle velocity V and an engine speed Ne and delivers the thus calculated actual transmission gear ratio Θr to the feedback controlling means 1406. The feedback controlling means 1406 energizes and controls the first and second solenoid driving means 1321 and 1323 by way of the switching means 1337 and 1338 so that the actual transmission gear ratio Θr of the non-stage transmission CVT may substantially coincide with the target transmission gear ratio R. The functions of the target transmission gear ratio R storage means 1404, the actual transmission gear ratio Θr calculating means 1405, and the feedback controlling means 1406 are carried out by the microcomputer 1301.

The watch dog timer 1320 watches operation of the microcomputer 1301, and if the microcomputer 1301 fails, then the watch dog timer 1320 delivers a fail signal to a change-over means 1413 and to the switching means 1337 and 1338. The switching means 1337 and 1338 are switched in response to such a fail signal so that the first or second solenoid driving means 1321 and 1323 is controlled by the transmission gear ratio fixing circuit 1330 so that an actual transmission gear ratio Θr of the non-stage transmission CVT developed from a transmission gear ratio detecting means 1407 may substantially coincide with a predetermined transmission gear ratio.

The change-over means 1413 normally connects a first ignition cut rotational speed storage means 1411 to a comparison means 1414, but when a fail signal is received, the change-over means 1413 connects a second ignition cut rotational speed storage means 1412 to the comparison means 1414. The comparison means 1414 compares the first ignition cut rotational speed Novr1 or the second ignition cut rotational speed Novr2 developed from the first or second ignition cut rotational speed storage means 1411 or 1412 with the engine speed Ne developed from the engine speed detecting means 204. When the engine speed Ne is lower than the first ignition cut rotational speed Novr1 or the second ignition cut rotational speed Novr2, the comparison means 1414 energizes an ignition means 1415 to effect ignition by means of an ignition plug 1416 at a predetermined timing.

However, if the engine speed Ne is higher than the first ignition cut rotational speed Novr1 or the second ignition cut rotational speed Novr2, the comparison means 1414 will not energize the ignition means 1415.

As a result, if the microcomputer 1301 is functioning regularly, that is, if the transmission gear ratio control of the non-stage transmission CVT is being executed regularly, then the engine speed Ne is controlled so that it may not exceed the first ignition cut rotational speed Novr1. However, if microcomputer 1301 or the like fails, then the transmission gear ratio of the non-stage transmission CVT is set to a predetermined fixed transmission gear ratio, and the engine speed Ne is controlled so that it may not exceed the second ignition cut rotational speed Novr2.

While in the foregoing description such control so as to restrict the engine speed Ne to a value which does not exceed the first ignition cut rotational speed Novr1 or the second ignition cut rotational speed Novr2 is accomplished by stopping an ignition spark, the present invention is not particularly limited to only such control. Control of the engine speed can also be effected by cutting fuel to be supplied from an injector or a carburetor to the engine or by preventing a throttle valve from being opened beyond a predetermined opening.

In the foregoing description, when the transmission gear ratio control of the non-stage transmission CVT is executed normally, the engine speed Ne is controlled so that it may not exceed the first ignition cut rotational speed Novr1. As a result, deterioration in engine toughness, overheating and so forth which may arise from instantaneous over-rotation of the engine can be prevented. However, the present invention is not particularly limited to this. In particular, such means may otherwise be employed that, when transmission gear ratio control of the non-stage transmission is executed normally, no upper limit for the engine speed Ne is set, and only when such transmission gear ratio control cannot be executed normally is an ignition cut rotational speed (second ignition cut rotational speed Novr2) applied and the engine speed Ne so controlled that it may not exceed the second ignition cut rotational speed Novr2.

While the target transmission gear ratio R of the non-stage transmission CVT is described as being set in accordance with a throttle opening Θth, it may otherwise be set in accordance with an engine speed Ne, an intake pipe internal negative pressure Pb or the like.

While the actual transmission gear ratio Θr of the non-stage transmission CVT which is used in ordinary feedback control is described as calculated from a vehicle velocity V and an engine speed Ne, a transmission gear ratio of the non-stage transmission which is detected directly may be used. In particular, an output signal of the transmission gear ratio detecting sensor 128 (or transmission gear ratio detecting means 1407) may be used.

While transmission gear ratio control of the non-stage transmission CVT is described as being executed so that the actual transmission gear ratio Θr may coincide with a target transmission gear ratio R, transmission gear ratio control of the non-stage transmission CVT may otherwise be executed so that an actual engine speed Ne may coincide with a target engine speed which is set in accordance with an engine load determined by a throttle opening Θth or the like.

Further, while in the foregoing description the present invention is described as applied to an engine having a non-stage transmission which is composed of a cam plate type fixed delivery hydraulic pump and a cam plate type variable delivery hydraulic motor, the present invention is not particularly limited to this and may naturally be applied to a non-stage transmission which is composed of two pulleys the width of grooves of which is adjusted by a hydraulic pressure and an endless belt stretched between and around the pulleys, or to such an engine having a toroidal non-stage transmission or the like as described above.

While in the foregoing description the transmission gear ratio fixing circuit is energized so that the transmission gear ratio is set to a fixed value when a fault in transmission gear ratio control of the non-stage transmission occurs, the present invention is not particularly limited only to this, and the transmission gear ratio fixing circuit may otherwise be energized when the vehicle moves in reverse, for example, in order to control the engine speed so that it not may exceed the second ignition cut rotational speed Novr2.

As is apparent from the foregoing description, according to the present invention, the following effects can be attained. In particular, since the engine speed is controlled so that it may not exceed a predetermined rotational speed when the transmission gear ratio of the non-stage transmission is set to a fixed value in a special running condition, the engine will not suffer from overheating even if running is continued for a long period of time. Further, since fixation of the transmission gear ratio is executed when the controlling device for the non-stage transmission is in a fault condition, running of the vehicle can be accomplished normally in a non-fault condition.

Figure 39:
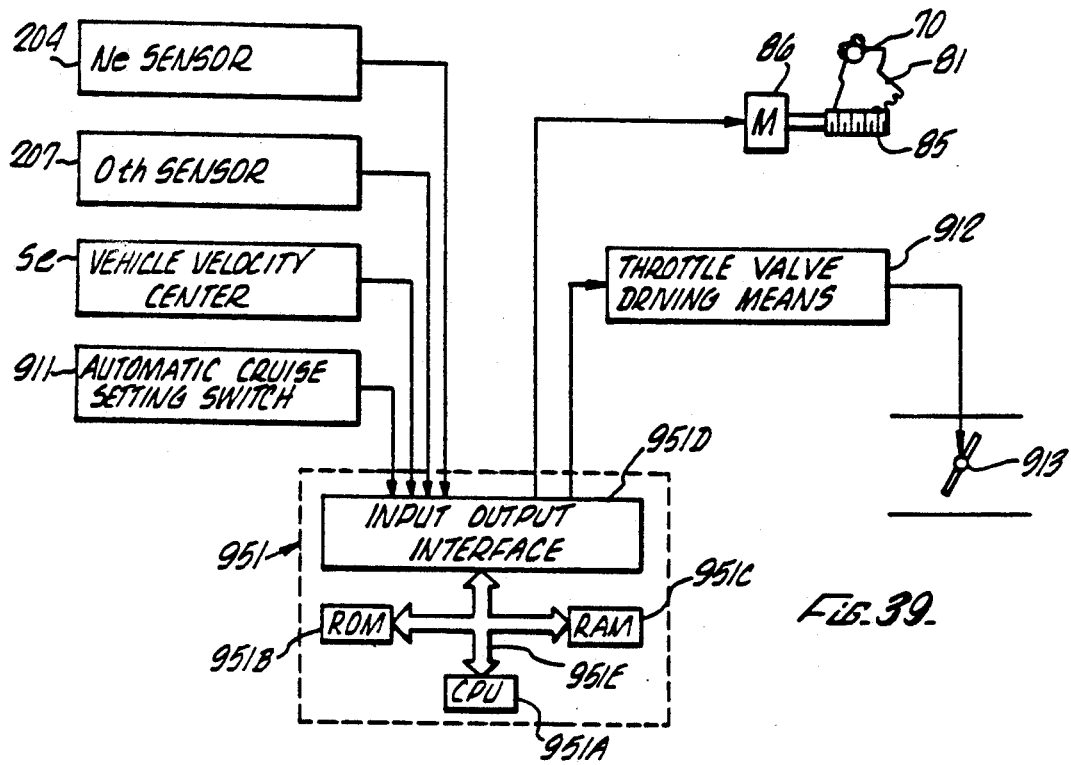
FIG. 39 is a block diagram showing construction of the seventh embodiment of the present invention.

FIG. 39 is a block diagram showing construction of a seventh embodiment of the present invention. Referring to FIG. 39, a microcomputer 951 is composed of a CPU 951A, a ROM 951B, a RAM 951C, an input/output interface 951D, and a common bus 951E for interconnecting such components, as is well known in the art. The Ne sensor 204, the Θth sensor 207, the vehicle velocity sensor Se and an automatic cruise setting switch 911 are connected to the microcomputer 951. The automatic cruise setting switch 911 is provided to set or cancel automatic fixed velocity running (hereafter referred to as "automatic cruise running") control of the vehicle.

Reference numerals 70, 81, 85 and 86 denote a trunnion shaft 70 connected to the cam plate of the hydraulic motor M, a sectoral sector gear 81 connected to the trunnion shaft, a worm gear 85 held in meshing engagement with the sector gear and a motor 86 for driving the worm gear to rotate. The motor 86 is also connected to the microcomputer 951. A throttle valve driving means 912 for driving a throttle valve 913 is also connected to the microcomputer 951.

Figure 40:
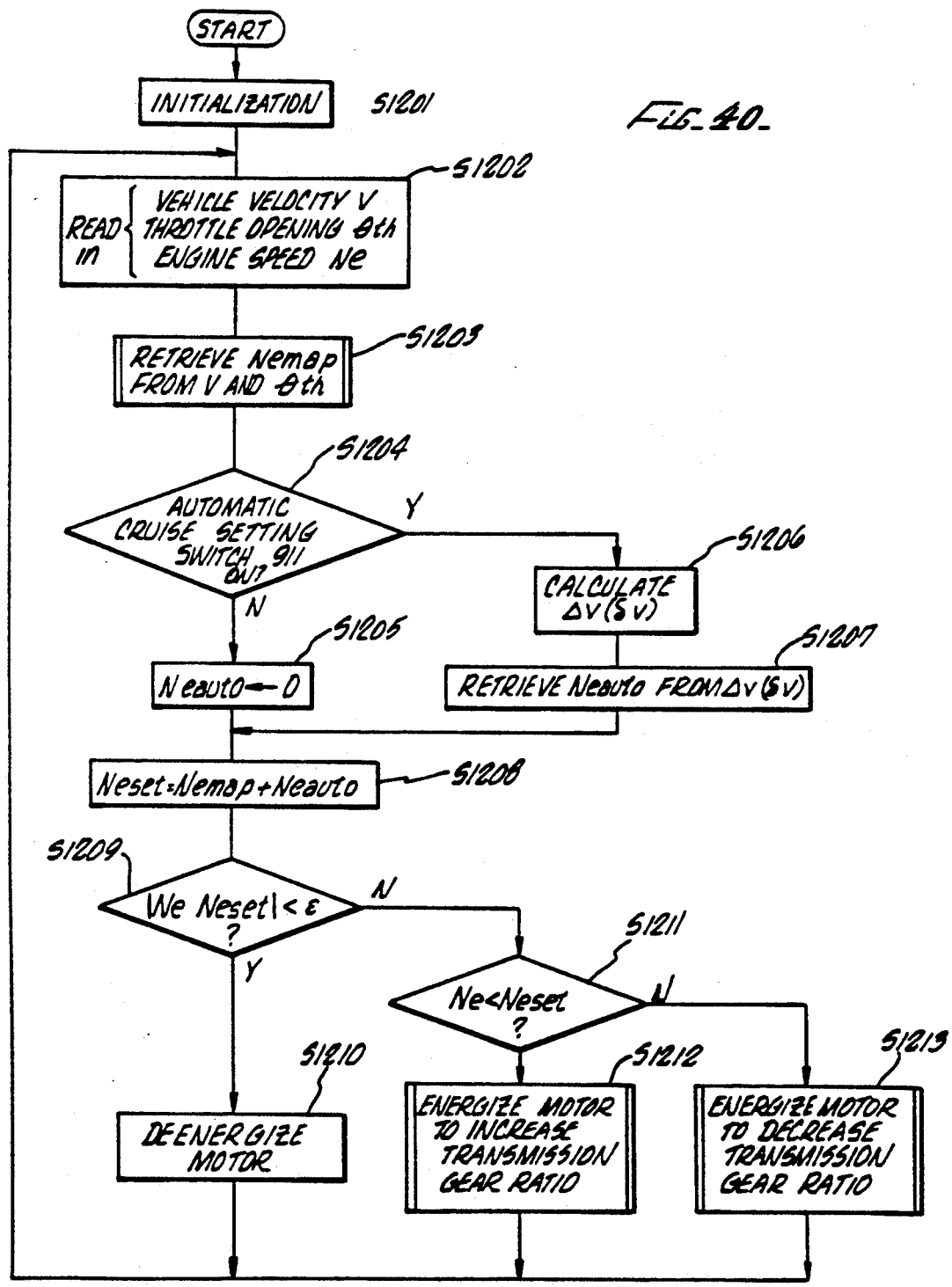
FIG. 40 is a flow chart illustrating operation of the seventh embodiment of the present invention.

FIG. 40 is a flow chart illustrating operation of the seventh embodiment of the present invention. Turning to FIG. 40, initialization is executed at step S1201. Then at step S1202, a vehicle velocity v, a throttle opening Θth and an engine speed Ne are read in from the vehicle velocity sensor Se, Θth sensor 207 and Ne sensor 204, respectively.

At step S1203, a basic engine speed Nemap is retrieved in response to the vehicle velocity v and throttle opening Θth. Basic engine speeds Nemap are registered in a map stored in advance in the microcomputer 951 (FIG. 39) wherein the vehicle velocity v and throttle opening Θth are employed as parameters, and a basic engine speed Nemap is read out from the map. It should be noted that, in case no basic engine speed Nemap is stored which corresponds to the vehicle velocity v and throttle opening Θth thus read in, a value of Nemap is read out which corresponds to values near the read-in values of v and Θth, and a basic engine speed Nemap is calculated by an interpolation calculation.

Figure 41:
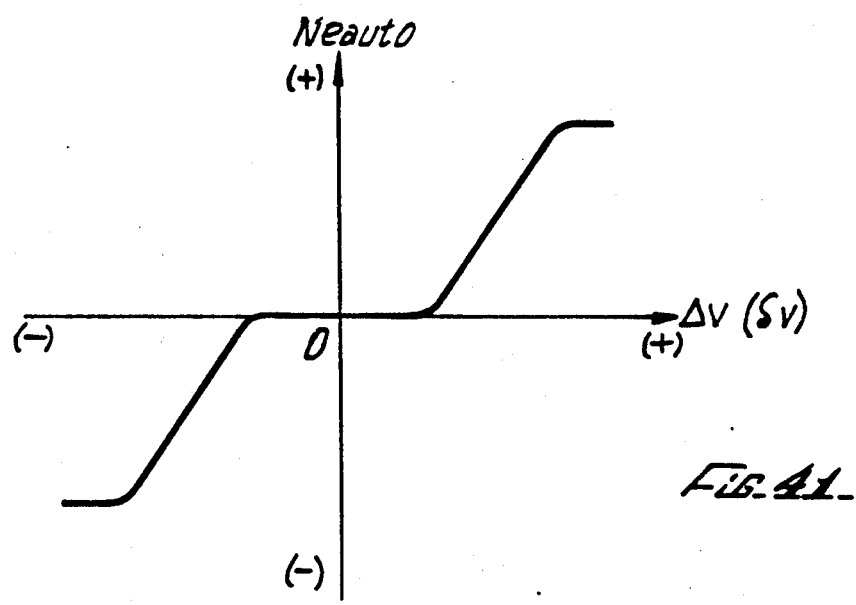
FIG. 41 is a graph showing a relationship between δv and a correction term Neauto.

At step S1204, it is judged whether or not the automatic cruise setting switch 911 is in an on-state, that is, whether or not the vehicle is making automatic cruise running. If the vehicle is not making automatic cruise running, a correction term Neauto is set to zero. (Such correction term Neauto will be described with reference to step S1208, below.) If the vehicle is making automatic cruise running, then the vehicle velocity v read in at step S1202 is subtracted from a vehicle velocity at a point of time when automatic cruise running was set (automatic cruise setting vehicle velocity) to calculate a deviation δv at step S1206. At step S1207, a correction term Neauto is retrieved using the deviation δv. FIG. 41 is a graph illustrating a relationship between δv and the correction term Neauto. A table of such a relationship as shown in FIG. 41 is stored in advance in the microcomputer 951 (FIG. 39), and a correction term Neauto corresponding to δv is retrieved from the table. In case no correction term Neauto corresponding to δv is stored, Neauto corresponding to a value of δv near the value of δv is read out, and a correction term Neauto is calculated by an interpolation calculation. It should be noted that, instead of provision of the table in which such data as shown in FIG. 41 are stored, Neauto may otherwise be set from a function which is stored in advance and has such a characteristic as shown in FIG. 41.

After completion of the processing at step S1205 or S1207, the process advances to step S1208. At step S1208, the basic engine speed Nemap and the correction term Neauto are added, as represented by an equation (1) below, to calculate a target engine speed Neset.

$$Neset = Nemap + Neauto \quad (1)$$

A step S1209, it is judged whether or not an absolute value of a difference of the target engine speed Neset from the actual engine speed N read in at step S1202 is smaller than a predetermined value ε, that is, whether or not the engine speed Ne substantially coincides with the target engine speed Neset. If the absolute value is smaller than the predetermined value ε, then the output power of the motor 86 (FIG. 39) is reduced to zero, at step S1210, so that the transmission gear ratio of the non-stage transmission may not be varied. Then, the process returns to step S1202.

However, if the difference of the target engine speed Neset from the engine speed Ne is not smaller than the predetermined value ε, then it is judged at step S1211 whether or not the engine speed Ne is smaller than the target engine speed Neset. If the engine speed Ne is smaller than the target engine speed Neset, a predetermined signal is delivered, at step S1212, to the motor 86 to rotate the driving shaft of the motor 86 in a predetermined direction so that the transmission gear ratio of the non-stage transmission may be changed to a high side value (to decrease the transmission gear ratio).

On the other hand, if the engine speed Ne is equal to or higher than the target engine speed Neset, a predetermined signal is delivered, at step S1213, to the motor 86 to rotate the driving shaft of the motor 86 in a direction opposite to the predetermined direction so that the transmission gear ratio of the non-stage transmission may be changed to a low side value (to increase the transmission gear ratio).

By the processing at step S1212 or S1213, the non-stage transmission is controlled so that the engine speed Ne may approach the target engine speed Neset. After completion of the processing at step S1212 or S1213, the process returns to step S1202.

Figure 42:
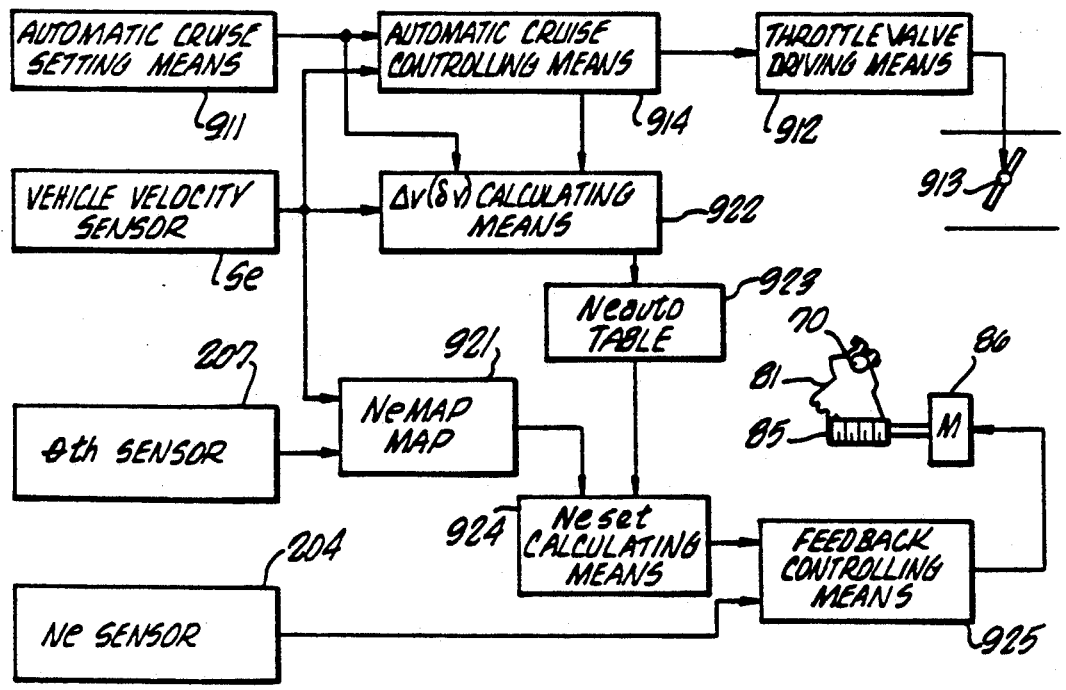
FIG. 42 a functional block diagram of the seventh embodiment of the present invention.

FIG. 42 is a functional block diagram of the seventh embodiment of the present invention. In FIG. 42, like reference numerals to those of FIG. 39 denote like or equivalent portions.

Referring to FIG. 42, the automatic cruise setting switch 911 and the vehicle velocity sensor Se are connected to an automatic cruise controlling means 914. The automatic cruise controlling means 914 controls the throttle valve driving means 912 so that, when the automatic cruise setting switch 911 is turned on (i.e., set), automatic cruise running may thereafter be effected at a velocity equal to that when the automatic cruise controlling means 914 is set. The throttle valve driving means 912 drives the throttle valve 913.

A δv calculating means 922 is connected to the vehicle velocity sensor Se and the automatic cruise controlling means 914 and subtracts a actual vehicle velocity v detected by the vehicle velocity sensor Se from the vehicle velocity at the point of time when automatic cruise running was set, to calculate δv. Such calculation of δv by the δv calculating means 922 is executed when the automatic cruise setting switch 911 is in an on-state.

An Neauto table 933 is a table which represents such a relationship between δv and the correction term Neauto as shown in FIG. 41. While the calculation of δv is being executed by the δv calculating means 922, a correction term Neauto corresponding to the value of δv is read out from the Neauto table 923 and transmitted to an Neset calculating means 924.

An Nemap map 921 is a map in which basic engine speeds Nemap are registered in advance employing the vehicle velocity v and the throttle opening Θth as parameters as described above in connection with step S1203 of FIG. 40. An engine speed Nemap corresponding to the vehicle velocity v and the throttle opening Θth is read out from the Nemap map 921 and transmitted to the Neset calculating means 924. The Neset calculating means 924 executes a calculation represented by the equation (1) to calculate a target engine speed Neset.

A feedback controlling means 925 controls the motor 86 for modifying the transmission gear ratio of the non-stage transmission so that an actual engine speed Ne delivered from the Ne sensor 204 may coincide with the target engine speed Neset. As the motor 86 is driven, the trunnion shaft 70 is rotated by way of the worm gear 85 and the sector gear 81 so that the transmission gear ratio of the non-stage transmission is controlled.

In the foregoing description, it is described that a basic engine speed Nemap is calculated and, when the vehicle is making automatic cruise running, a correction term Neauto is set, and then Nemap and Neauto are added to yield a target engine speed Neset, whereafter the non-stage transmission is controlled so that an actual engine speed Ne may coincide with the target engine speed Neset. However, the present invention is not particularly limited to this, and such measures may naturally be employed that a target transmission gear ratio is calculated and the non-stage transmission is controlled so that an actual transmission gear ratio may coincide with the target transmission gear ratio. In particular, such measures may be employed that a basic transmission gear ratio Rmap is calculated and, when the vehicle is making automatic cruise running, a correction term Rauto is set, and then such Rmap and Rauto are added to find out a target transmission gear ratio Rset, whereafter the non-stage transmission is controlled so that an actual transmission gear ratio R may coincide with the target transmission gear ratio Rset. A controlling device in this instance can be constructed readily from the foregoing description, and accordingly, description thereof will be omitted herein. Detection of an actual transmission gear ratio R can be accomplished by detecting a rotational angle of the trunnion shaft 70 or the motor 86 by means of a potentiometer or the like.

Furthermore, while in the embodiment described above it is described that, as shown at steps S1204 to S1208 of FIG. 40, Neauto is retrieved in automatic cruise control and added to a basic engine speed Nemap to calculate a target engine speed Neset, such means may naturally be employed that, for example, a map of target engine speeds Neset to which values of Neauto are added is produced in advance, and in automatic cruise control, a target engine speed Neset is retrieved from the map. Further, while the transmission gear ratio controlling means of the non-stage transmission which is applied to the present invention is described as being the motor 86 for rotating the trunnion shaft 70 connected to the cam plate of the hydraulic motor M as shown in FIGS. 42, 2, and 39, such modification may naturally be employed wherein two oil passages for a high pressure and a low pressure, a spool valve for changing over between the oil passages, a solenoid valve for controlling sliding movement of the spool valve and so forth are provided in place of the motor, and the solenoid valve is controlled to control sliding movement of the spool valve to change over between the two oil passages for a high pressure and a low pressure to rotate the trunnion shaft 70.

While in the foregoing description the present invention is described as being applied to a non-stage transmission which is composed of a cam plate type fixed delivery hydraulic pump and a cam plate type variable delivery hydraulic motor, the present invention is not particularly limited to this and may naturally be applied to a non-stage transmission which is composed of two pulleys the width of grooves of which is adjusted by a hydraulic pressure and an endless belt stretched between and around the pulleys, or to such a toroidal non-stage transmission as discussed above.

As apparent from the foregoing description, according to the present invention the following effects can be attained.

Upon automatic fixed velocity running, since the transmission gear ratio can be increased only when a change in running condition of the vehicle is great, the vehicle can follow a wide change of the running condition, and reduction of the fuel cost of the vehicle can be attained.

Since automatic fixed velocity running control is executed in both the opening control of a throttle valve and the control of the transmission gear ratio of the non-stage transmission, hunting of the vehicle can be essentially eliminated, and a smooth running feeling can be attained.

Although certain preferred embodiments have been shown and described, it should be understood that many changes and modifications may be made therein without departing from the scope of the appended claims.

What is claimed is:

1. An engine controlling device having a target value setting means for setting one of a target transmission gear ratio and a target engine speed as a target value from an engine parameter, an actual vehicle data detecting means for detecting an actual vehicle data corresponding to a target value set by said target value setting means, and a feedback controlling means for controlling a non-stage transmission so that a set target value may coincide with an actual vehicle data corresponding to the target data, comprising transmission gear ratio holding means for holding the transmission gear ratio of said non-stage transmission, and engine speed controlling means for controlling engine speed so that the engine speed may not exceed a predetermined ignition cut rotational speed when the transmission gear ratio of said non-stage transmission is held by said transmission gear ratio holding means, wherein said engine speed controlling means comprises first ignition cut rotational speed storage means for storing a first ignition cut rotational speed therein, second ignition cut rotational speed storage means for storing therein a second ignition cut rotational speed which is lower than the first ignition cut rotational speed, and comparison means for comparing an engine speed with one of the first ignition cut rotational speed and the second ignition cut rotational speed and for stopping ignition by an ignition plug when the engine speed is higher than that one of the first ignition cut rotational speed and the second ignition cut rotational speed.

2. An engine controlling device according to claim 1, wherein the second ignition cut rotational speed stored in said second ignition cut rotational speed storage means is transmitted to said comparison means when the transmission gear ratio of said non-stage transmission is fixed by said transmission gear ratio fixing means.

3. An engine controlling device having a target value setting means for setting one of a target transmission gear ratio and a target engine speed as a target value from an engine parameter, an actual vehicle data detecting means for detecting an actual vehicle data corresponding to a target value set by said target value setting means, and a feedback controlling means for controlling a non-stage transmission so that a set target value may coincide with an actual vehicle data corresponding to the target data, comprising transmission gear ratio holding means for holding the transmission gear ratio of said non-stage transmission.

engine speed controlling means for controlling engine speed so that the engine speed may not exceed a predetermined ignition cut rotational speed when the transmission gear ratio of said non-stage transmission is held by said transmission gear ratio holding means, and fault detecting means for detecting whether or not control of said non-stage transmission by said feedback controlling means is proceeding without a detected fault, wherein said transmission gear ratio holding means holds the transmission gear ratio when a fault in said feedback controlling means is detected by said fault detecting means, wherein said engine speed controlling means comprises first ignition cut rotational speed storage means for storing a first ignition cut rotational speed therein, second ignition cut rotational speed storage means for storing therein a second ignition cut rotational speed which is lower than the first ignition cut rotational speed, and comparison means for comparing an engine speed with one of the first ignition cut rotational speed and the second ignition cut rotational speed and for stopping ignition by an ignition plug when the engine speed is higher than that one of the first ignition cut rotational speed and the second ignition cut rotational speed.

4. An engine controlling device according to claim 3, wherein the second ignition cut rotational speed stored in said second ignition cut rotational speed storage means is transmitted to said comparison means when the transmission gear ratio of said non-stage transmission is held by said transmission gear ratio holding means.

* * * * *

UNITED STATES PATENT AND TRADEMARK OFFICE
CERTIFICATE OF CORRECTION

PATENT NO. : 5,214,983
DATED : June 1, 1993
INVENTOR(S) : KOBAYASHI et al.

It is certified that error appears in the above-identified patent and that said Letters Patent is hereby corrected as shown below:

In claim 2 (col. 44, l. 43) delete "fixed" and insert -- held -- therefor.

In claim 2 (col. 44, l. 43) delete "fixing" and insert -- holding -- therefor.

Signed and Sealed this

Twenty-second Day of February, 1994

Attest:

BRUCE LEHMAN

Attesting Officer

Commissioner of Patents and Trademarks